United States Patent [19]

Katsuragawa

[11] Patent Number: 5,731,920
[45] Date of Patent: Mar. 24, 1998

[54] CONVERTING ADAPTER FOR INTERCHANGEABLE LENS ASSEMBLY

[75] Inventor: Mitsuhiro Katsuragawa, Yokohama, Japan

[73] Assignee: Canon Kabushiki Kaisha, Tokyo, Japan

[21] Appl. No.: 613,727

[22] Filed: Dec. 14, 1995

[30] Foreign Application Priority Data

Dec. 22, 1994 [JP] Japan .................. 6-335308
Feb. 28, 1995 [JP] Japan .................. 7-040269
Feb. 28, 1995 [JP] Japan .................. 7-040270

[51] Int. Cl.⁶ .................................................. G02B 7/02
[52] U.S. Cl. .................. 359/827; 359/823; 348/39; 348/383; 396/71; 396/297
[58] Field of Search .................... 359/823, 827, 359/694; 348/39, 383; 396/161, 170, 297, 71, 300, 529

[56] References Cited

U.S. PATENT DOCUMENTS

| | | | |
|---|---|---|---|
| 4,104,649 | 8/1978 | Tanaka et al. | 396/297 |
| 5,130,794 | 7/1992 | Ritchey | 348/39 |
| 5,278,604 | 1/1994 | Makamura | 396/71 |

FOREIGN PATENT DOCUMENTS

| | | |
|---|---|---|
| 0266793A2 | 5/1988 | European Pat. Off. . |
| 0424678A2 | 5/1991 | European Pat. Off. . |
| 0483822A2 | 5/1992 | European Pat. Off. . |

*Primary Examiner*—Loha Ben
*Attorney, Agent, or Firm*—Morgan & Finnegan, L.L.P.

[57] ABSTRACT

A lens 2 is mechanically connected to an image processor 3 having a different mount from that of the lens 2 via a converting adapter 1. A computer 4 is electrically connected to the converting adapter 1 and the lens 2 via electrical terminals 6 and 7. A command transmitted from the computer 4 is converted by an internal converter 8 of the converting adapter 1. The computer 4 controls an internal actuator 2c of the lens 2 by transmitting a command through communication.

23 Claims, 50 Drawing Sheets

FIG. 3

| 15-a | 15-b | TRANSFER RATE |
|---|---|---|
| ON | ON | 1200 bps |
| OFF | ON | 2400 bps |
| ON | OFF | 4800 bps |
| OFF | OFF | 9600 bps |

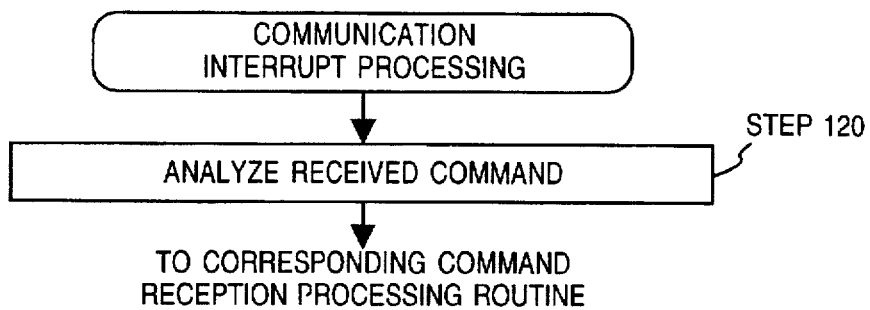
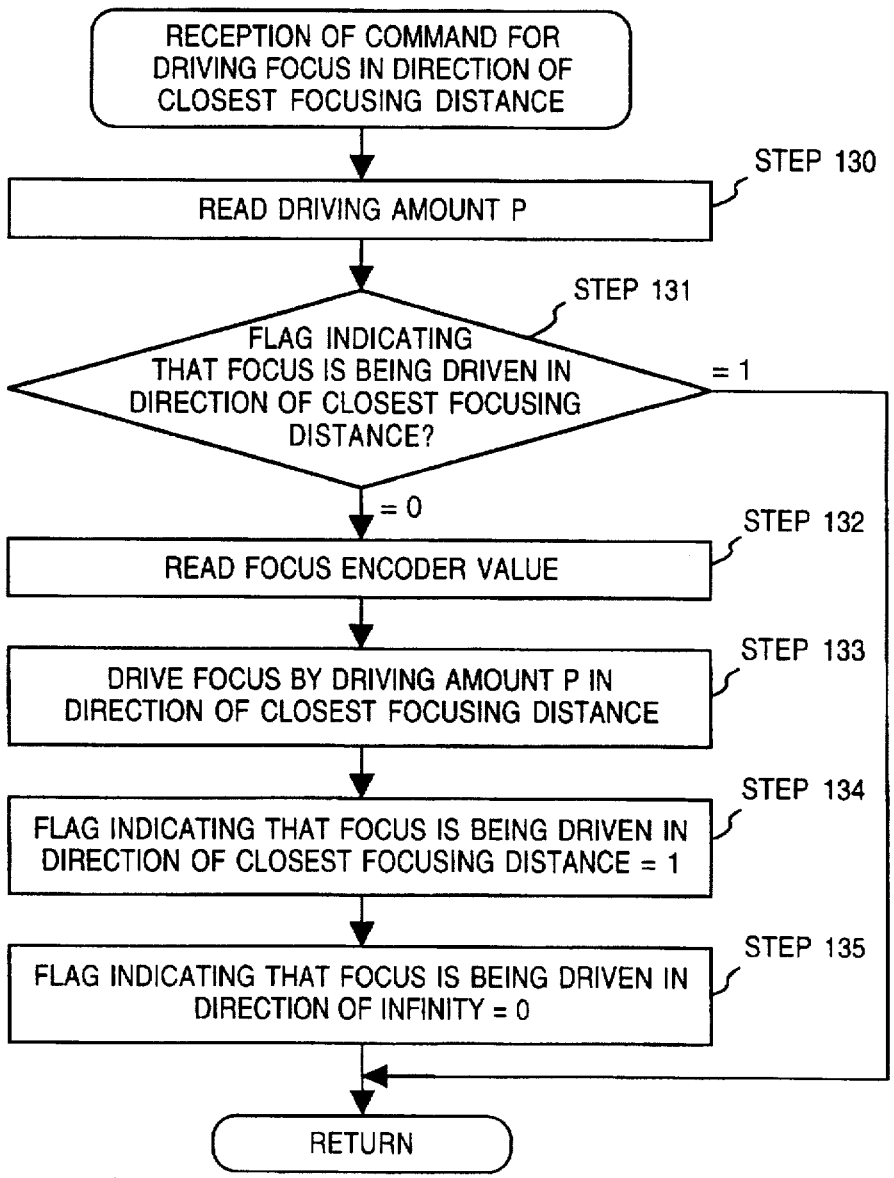

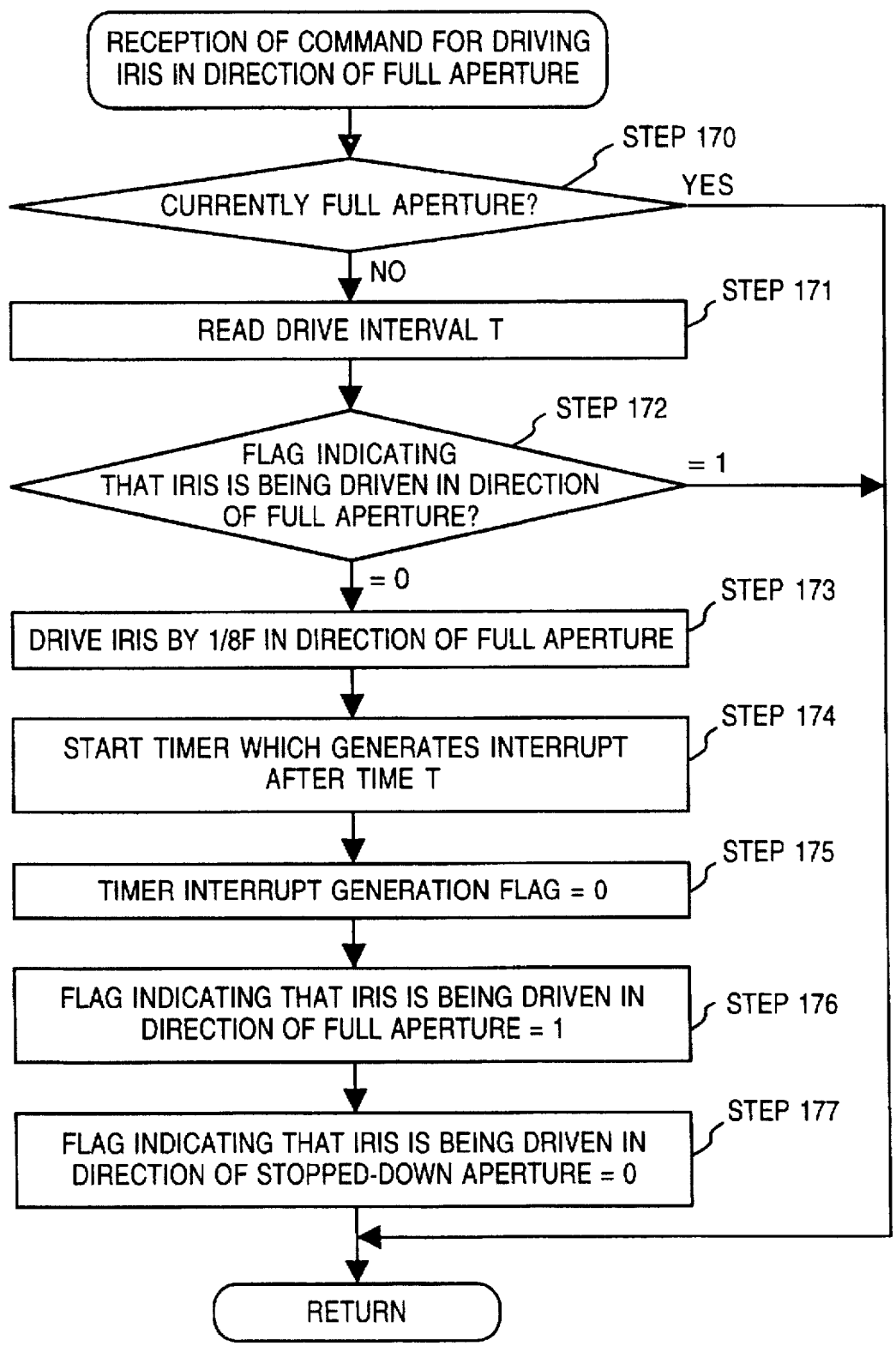

FIG. 10

| NAME | MEANING |
|---|---|
| F_MEMO 0 | FOCUS POSITION DATA 0 |
| F_MEMO 1 | FOCUS POSITION DATA 1 |
| F_MEMO 2 | FOCUS POSITION DATA 2 |
| F_MEMO 3 | FOCUS POSITION DATA 3 |
| F_MEMO 4 | FOCUS POSITION DATA 4 |
| F_MEMO 5 | FOCUS POSITION DATA 5 |
| F_MEMO 6 | FOCUS POSITION DATA 6 |
| F_MEMO 7 | FOCUS POSITION DATA 7 |
| F_SPD 0 | FOCUS SPEED DATA 0 |
| F_SPD 1 | FOCUS SPEED DATA 1 |
| F_SPD 2 | FOCUS SPEED DATA 2 |
| F_SPD 3 | FOCUS SPEED DATA 3 |
| I_SPD 0 | IRIS SPEED DATA 0 |
| I_SPD 1 | IRIS SPEED DATA 1 |
| I_SPD 2 | IRIS SPEED DATA 2 |
| I_SPD 3 | IRIS SPEED DATA 3 |

FIG. 18

| NAME | MEANING |
|---|---|
| F_MEMO 0 | FOCUS POSITION DATA 0 |
| F_MEMO 1 | FOCUS POSITION DATA 1 |
| F_MEMO 2 | FOCUS POSITION DATA 2 |
| F_MEMO 3 | FOCUS POSITION DATA 3 |
| F_MEMO 4 | FOCUS POSITION DATA 4 |
| F_MEMO 5 | FOCUS POSITION DATA 5 |
| F_MEMO 6 | FOCUS POSITION DATA 6 |
| F_MEMO 7 | FOCUS POSITION DATA 7 |
| U_MEMO 0 | PANHEAD POSITION DATA 0 |
| U_MEMO 1 | PANHEAD POSITION DATA 1 |
| U_MEMO 2 | PANHEAD POSITION DATA 2 |
| U_MEMO 3 | PANHEAD POSITION DATA 3 |
| U_MEMO 4 | PANHEAD POSITION DATA 4 |
| U_MEMO 5 | PANHEAD POSITION DATA 5 |
| U_MEMO 6 | PANHEAD POSITION DATA 6 |
| U_MEMO 7 | PANHEAD POSITION DATA 7 |
| F_SPD 0 | FOCUS SPEED DATA 0 |
| F_SPD 1 | FOCUS SPEED DATA 1 |
| F_SPD 2 | FOCUS SPEED DATA 2 |
| F_SPD 3 | FOCUS SPEED DATA 3 |
| I_SPD 0 | IRIS SPEED DATA 0 |
| I_SPD 1 | IRIS SPEED DATA 1 |
| I_SPD 2 | IRIS SPEED DATA 2 |
| I_SPD 3 | IRIS SPEED DATA 3 |
| U_SPD 0 | PANHEAD SPEED DATA 0 |
| U_SPD 1 | PANHEAD SPEED DATA 1 |
| U_SPD 2 | PANHEAD SPEED DATA 2 |
| U_SPD 3 | PANHEAD SPEED DATA 3 |

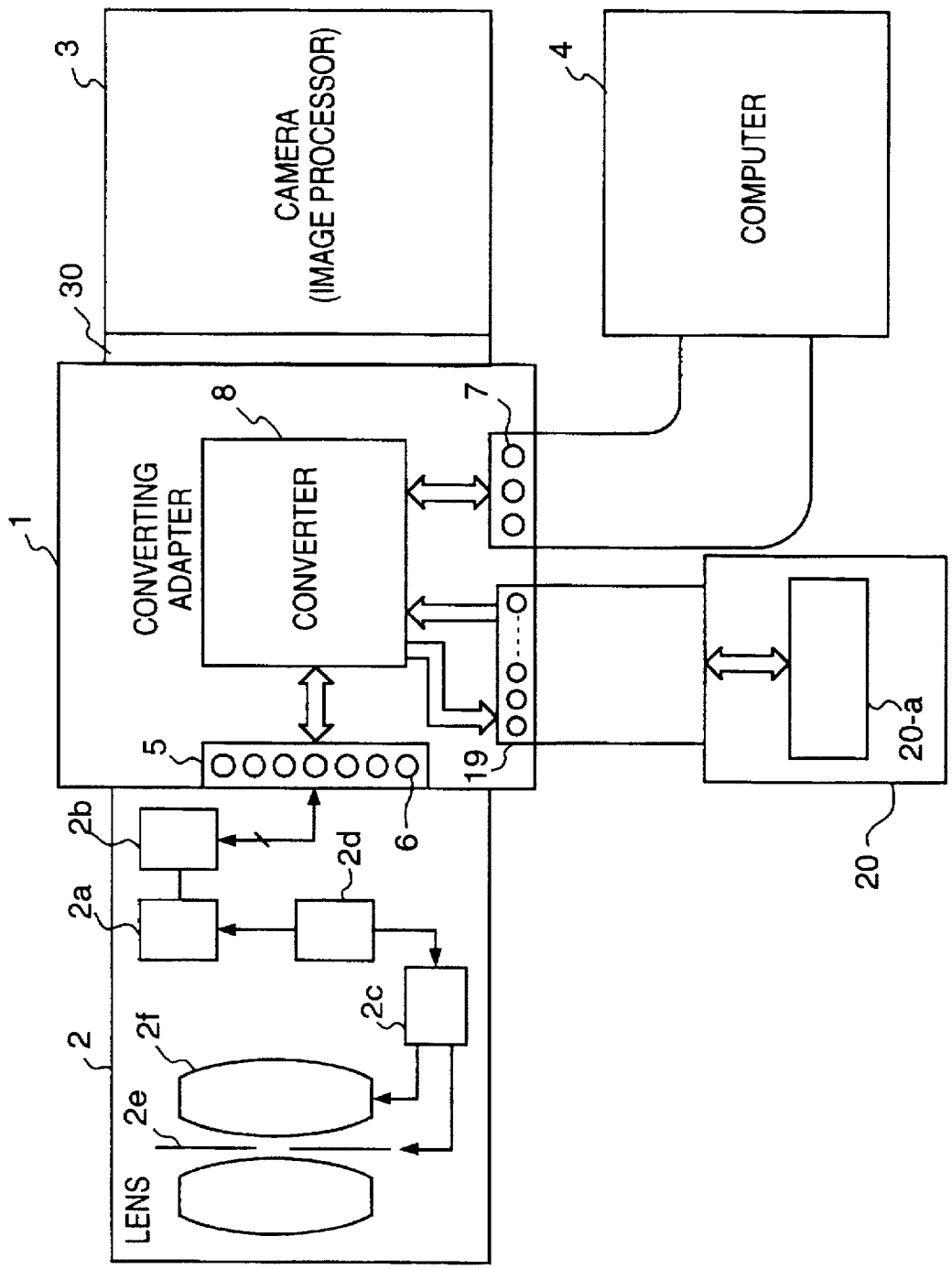

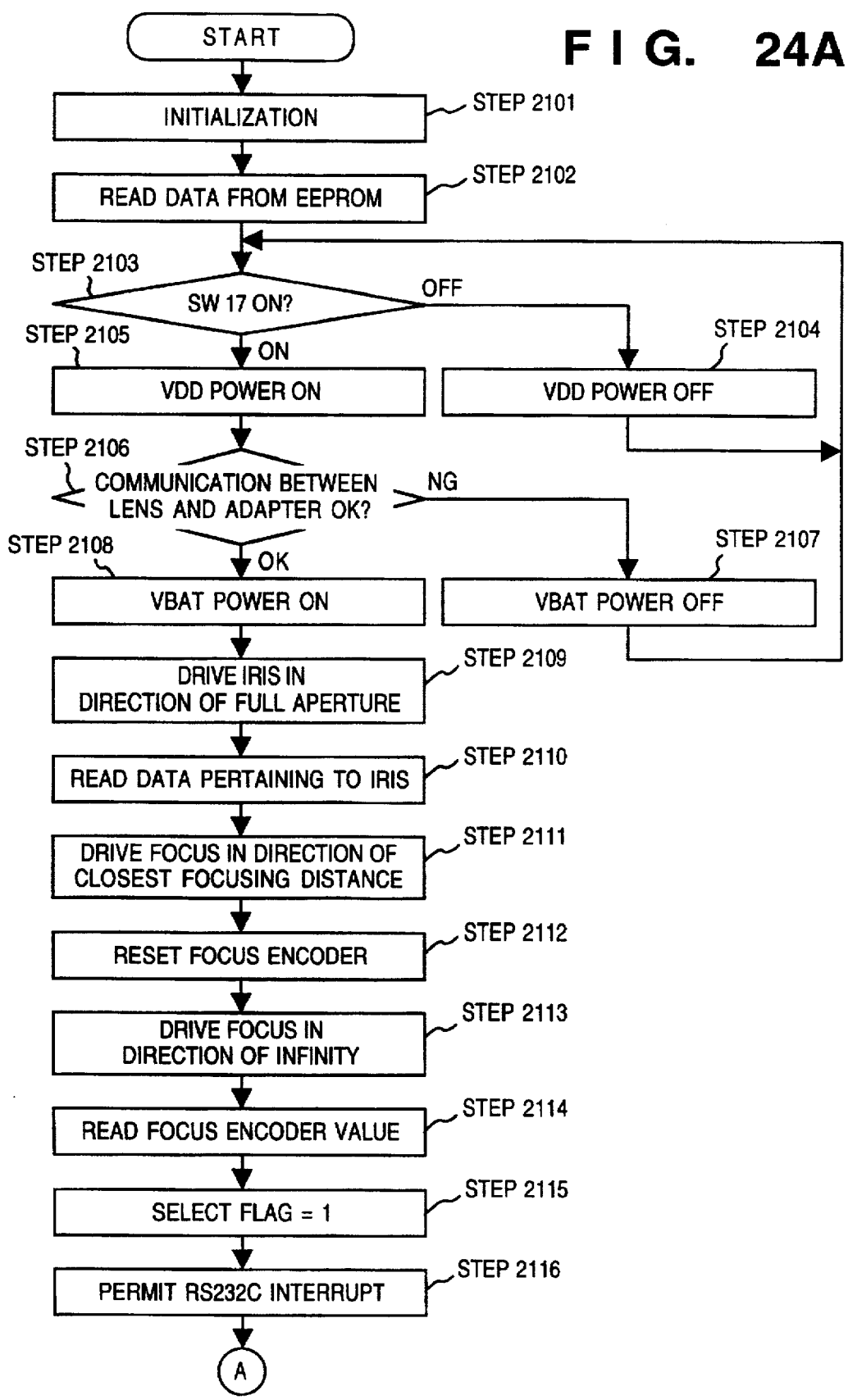

FIG. 33

| NAME | MEANING |
|---|---|
| MODE | CONTROL MODE |
| F_MEMO 0 | FOCUS POSITION DATA 0 |
| F_MEMO 1 | FOCUS POSITION DATA 1 |
| F_MEMO 2 | FOCUS POSITION DATA 2 |
| F_MEMO 3 | FOCUS POSITION DATA 3 |
| F_MEMO 4 | FOCUS POSITION DATA 4 |
| F_MEMO 5 | FOCUS POSITION DATA 5 |
| F_MEMO 6 | FOCUS POSITION DATA 6 |
| F_MEMO 7 | FOCUS POSITION DATA 7 |
| F_SPD 0 | FOCUS SPEED DATA 0 |
| F_SPD 1 | FOCUS SPEED DATA 1 |
| F_SPD 2 | FOCUS SPEED DATA 2 |
| F_SPD 3 | FOCUS SPEED DATA 3 |
| I_SPD 0 | IRIS SPEED DATA 0 |
| I_SPD 1 | IRIS SPEED DATA 1 |
| I_SPD 2 | IRIS SPEED DATA 2 |
| I_SPD 3 | IRIS SPEED DATA 3 |

CONVERTING ADAPTER FOR INTERCHANGEABLE LENS ASSEMBLY

BACKGROUND OF THE INVENTION

The present invention relates to a converting adapter for interchangeable lens assemblies of optical devices.

Automatization of production installations has advanced in the manufacturing sites in various industries, and accordingly a large number of image formation apparatuses are used in the individual manufacturing steps such as the assembly step and the quality control step.

On the other hand, with the recent progress of technologies, sensors having a higher resolution than that of conventional sensors have been developed. These sensors are becoming used in the manufacturing sites, ad so camera lenses of, e.g., a 35-mm format whose scanning area is larger than that of C-mount lenses are beginning to be used extensively. However, these 35-mm camera lenses have a moat different in the standards from that of the C-mount lenses. Accordingly, it is necessary to connect the 35-mm camera lenses to the image formation apparatuses described above via an adapter for converting the mount.

Unfortunately, the recent camera systems of, e.g., a 35-mm format have poor interchangeability because they are equipped with many electronic functions such as an automatic focusing function. If a lens is used in different camera systems, therefore, it is in many instances impossible to fully utilize the performance of the lens. For example, if a control operation such as focusing control or aperture control of a lens is done by using only an electrical signal, rather than by a mechanical manipulation from the outside of an image formation apparatus or a camera, a manual operation itself is difficult to perform.

SUMMARY OF THE INVENTION

The present invention has been made in consideration of the above situation and has as its object to provide a converting adapter for an interchangeable lens assembly, which controls an interchangeable lens assembly controlled only by an electrical signal in a control system different from a system which the interchangeable lens assembly belongs to.

To achieve the above object, the configurational characteristic features of the present invention are as follows.

That is, a converting adapter for an interchangeable lens assembly comprises a first mount for mounting an interchangeable lens assembly, a second mount for mounting an optical device which uses the interchangeable lens assembly mounted on the first mount as a scanning optical system, a first terminal provided in the first mount to exchange an electrical signal with the interchangeable lens assembly, a second terminal connected to an external control device to exchange an electrical signal with the external control device, and signal converting means for outputting a predetermined lens control signal to the first terminal in accordance with an input electrical signal from the second terminal, wherein the signal converting means controls driving of a lens of the interchangeable lens assembly.

More preferably, in order to control the lens at a speed within a predetermined speed range, the signal converting means outputs an electrical signal, as a control amount corresponding to the speed, to the interchangeable lens assembly at each predetermined control period.

Also, the converting adapter further comprises lens characteristic detecting means for detecting a characteristic of the interchangeable lens assembly mounted on the first mount by causing the interchangeable lens assembly to perform a predetermined operation.

A converting adapter for an interchangeable lens assembly comprises a first mount for mounting an interchangeable lens assembly, a second mount for mounting an optical device which uses the interchangeable lens assembly mounted on the first mount as a scanning optical system, a first terminal provided in the first mount to exchange an electrical signal with the interchangeable lens assembly, a second terminal connected to a first external control device to exchange an electrical signal with the first external control device, a third terminal connected to a second external control device to exchange an electrical signal with the second external control device, first signal converting means for outputting a predetermined lens control signal to the first terminal in accordance with an input electrical signal from the second terminal, and second signal converting means for outputting a predetermined lens control signal to the first terminal in accordance with an input electrical signal from the third terminal.

More preferably, the converting adapter further comprises signal selecting means for selecting one or both of the first and second signal converting means.

A converting adapter for an interchangeable lens assembly comprises a first mount for mounting an interchangeable lens assembly, a second mount for mounting an optical device which uses the interchangeable lens assembly mounted on the first mount as a scanning optical system, a first terminal provided in the first mount to exchange an electrical signal with the interchangeable lens assembly, a second terminal connected to an external control device to exchange an electrical signal with the external control device, a third terminal connected to an external device to exchange an electrical signal with the external device, first signal converting means for outputting a predetermined lens control signal to the first terminal in accordance with an input electrical signal from the second terminal, and second signal converting means for outputting a predetermined external device control signal to the third terminal in accordance with an input electrical signal from the second terminal.

More preferably, a converting adapter for an interchangeable lens assembly comprises a first mount for mounting an interchangeable lens assembly, a second mount for mounting an optical device which uses the interchangeable lens assembly mounted on the first mount as a scanning optical system, a first terminal provided in the first mount to exchange an electrical signal with the interchangeable lens assembly, a second terminal connected to an external control device to exchange an electrical signal with the external control device, a third terminal connected to an external device to exchange an electrical signal with the external device, first signal converting means for outputting a predetermined lens control signal to the first terminal in accordance with an input electrical signal from the second terminal, second signal converting means for outputting a predetermined external device control signal to the third terminal in accordance with an input electrical signal from the second terminal, and signal selecting means for selecting one of the first and second signal converting means.

Moreover, as the characteristic feature of the outer appearance of each converting adapter of the present invention, the first terminal is provided on the same side surface as the first mount, and the second terminal is provided on the same side surface as the second mount.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view showing the relationship between a switch 15 and the baud rate of an RS232C in the first embodiment of the present invention;

FIGS. 5A to 5E are flow charts showing the operation of the converting adapter according to the first embodiment of the present invention;

FIGS. 7A to 7D are flow charts showing the operation of the converting adapter according to the first embodiment of the present invention;

FIG. 10 is a view showing data stored in a nonvolatile memory in the first embodiment of the preset invention;

FIG. 18 is a view showing data stored in a nonvolatile memory in the second embodiment of the present invention;

FIG. 19 is a block diagram showing the system configuration of a converting adapter as a modification of the second embodiment of the present invention;

FIGS. 24A and 24B are main flow charts showing the operation of the converting adapter according to the third embodiment of the present invention;

FIG. 33 is a view showing data stored in a nonvolatile memory in the second modification of the third embodiment of the present invention.

DETAILED DESCRIPTION OF THE PREFERRED EMBODIMENTS

Preferred embodiments of the present invention will be described in detail below with reference to the accompanying drawings.

First Embodiment

Figure 1:
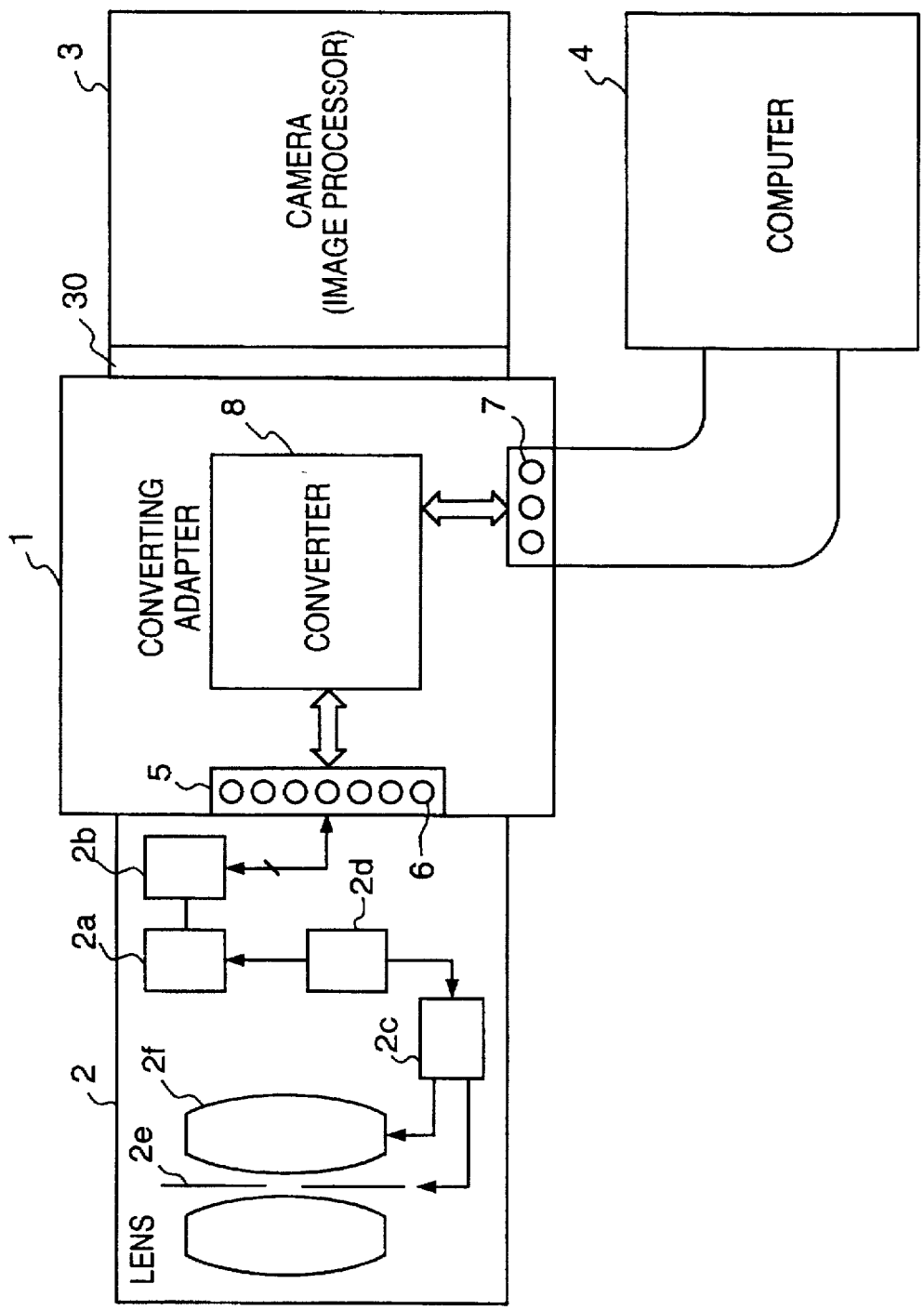
FIG. 1 is a block diagram showing the system configuration of a converting adapter according to the first embodiment of the present invention.

FIG. 1 illustrates a system using a converting adapter according to the first embodiment of the present invention. In FIG. 1, reference numeral 1 denotes the converting adapter; 2, an interchangeable lens (to be abbreviated as a lens hereinafter) for, e.g., a single-lens reflex camera; 3, a camera (image processor), such as a video camera, a scanner camera, or a film camera, which uses the lens 2 as a scanning optical system; 30, a mount for mounting the camera 3; 4, a general-purpose computer for controlling the lens 2; 5, a mount for mounting the lens 2; 6, electrical contacts attached to the mount 5; and 7, general-purpose electrical terminals for computer communication, which perform serial communication with the computer. 4. Although an RS232C interface is used as the electrical terminals 7 in this embodiment, a centronics interface or a SCSI interface, for example, also can be used. A converter 8 converts a serial control signal from the computer 4 into a control signal receivable by the lens 2 or converts a signal from the lens 2 into a serial signal receivable by the computer 4. In the system with the above configuration, an internal microcomputer 2a of the single-lens reflex camera interchangeable lens 2 can be controlled by the computer 4 via an interface 2b and the converting adapter 1. The lens microcomputer 2a causes a controller 2d to control a lens actuator 2c, thereby driving, e.g., a focusing lens stop mechanism (to be referred to as an IRIS hereinafter) 2e.

Figure 2:
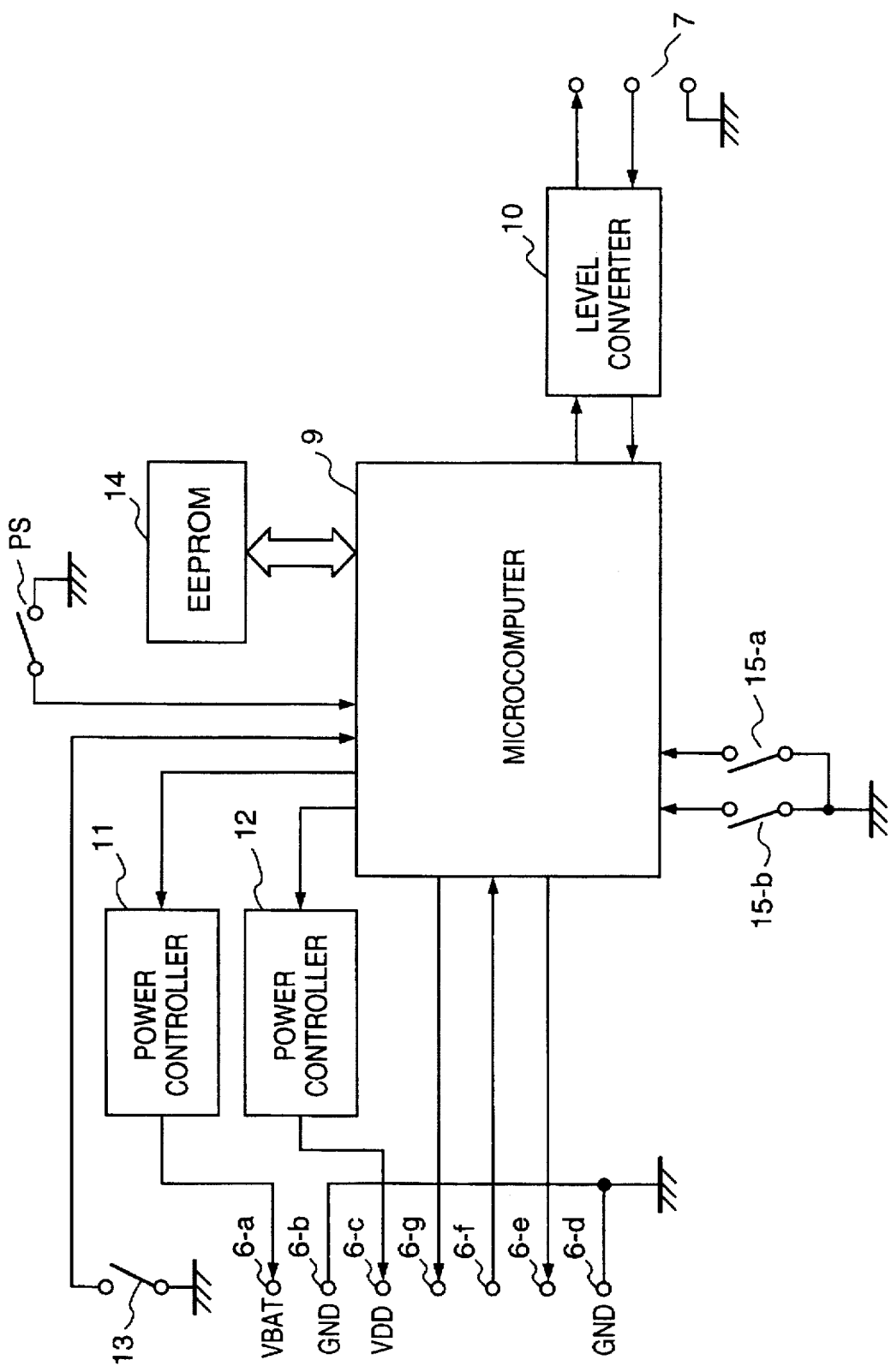
FIG. 2 is a circuit diagram showing the circuit configuration of the converting adapter according to the first embodiment of the present invention.

FIG. 2 is a circuit diagram for explaining the details of the adapter 1 shown in FIG. 1. In FIG. 2, reference numeral 6-a denotes a power terminal (for supplying a power VBAT) which drives the internal lens actuator of the lens 2; 6-b, a ground terminal for the power terminal 6-a; 6-c, a power terminal (for supplying a power VDD) which operates an internal circuit system of the lens 2; and 6-d, a ground contact for the power contact 6-c. Reference numeral 6-e denotes a clock terminal for serial communication between the microcomputer 2a in the lens 2 and the converting adapter 1; 6-f, a contact for serial data reception from the microcomputer 2a in the lens 2 to the converting adapter 1; 6-g, a contact for serial data transmission from the converting adapter 1 to the microcomputer 2a in the lens 2; 9, a microcomputer; and 10, a level converter for converting the level of an RS232C serial signal connected from an external computer into a logic level of +5 volts or 0 volt.

A power controller 11 controls supply of power for driving the actuator 2c in the lens 2. The power controller 11 switches on or off the power supply to the power terminal 6-a in accordance with a control signal from the microcomputer 9. A power controller 12 controls supply of power for operating the controller 2d in the lens 2. The power controller 12 switches on or off the power supply to the power terminal 6-c in accordance with a control signal from the microcomputer 9. Reference symbol PS denotes a power switch (main switch).

An interchangeable lens mount detection switch 13 is closed only when the lens 2 is mounted on the mount 5 and becomes controllable by the adapter 1 via the electrical signal contacts 6. The switch 13 is connected to the microcomputer 9. A nonvolatile memory 14 also is connected to the microcomputer 9, so erase, write, and read actions to data in the memory 14 are controlled by the microcomputer 9. The transfer rate of the RS232C interface is set as illustrated in FIG. 3 in accordance with the states of mode switches 15-a and 15-b.

FIGS. 4A to 9C are flow charts for explaining the operation of the microcomputer 9 in the adapter. Individual steps of the flow charts in FIGS. 4A to 9C will be described below.

Note that "set" and "clear" of a flag in the following description are indicated by "1" and "0", respectively, in these flow charts.

<Step 101> When the main switch PS in FIG. 2 is turned on, the microcomputer 9 initializes the memory, the I/O ports, and the like components. At the same time, the microcomputer 9 sets the transfer rate of the RS232C serial communication in accordance with the states of the switches 15.

<Step 102> The microcomputer 9 reads out the contents of the nonvolatile memory 14 and stores them in internal memories of the microcomputer 9. Note that data having the contents illustrated in FIG. 10 is stored in the nonvolatile memory 14. Referring to FIG. 10, F_MEMO0 to F_MEMO7 are focus position data in which output values from an internal focus encoder (not shown) of the lens 2 are set; F_SPD0 to F_SPD3 are focus speed data in which focus driving amounts in the lens 2 are set; and I_SPD0 to I_SPD3 are IRIS speed data in which time intervals during which the diaphragm (IRIS) in the lens 2 is driven are set. Note that the data F_MEMM00 to F_MEMO7, F_SPD0 to F_SPD3, and I_SPD0 to I_SPD3 are stored in memories MF_MEMO0 to MF_MEMO7, MF_SPD0 to MF_SPD3, and MI_SPD0 to MI_SPD3 (none of the memories is shown), respectively, of the microcomputer 9.

<Step 103> The microcomputer 9 checks the state of the switch 13. If the switch 13 is ON, this indicates that the lens 2 is mounted on the adapter 1, so the flow advances to step 105. If the switch 13 is OFF, the flow advances to step 104.

<Step 104> Since the microcomputer 9 determines in step 103 that the lens 2 is not mounted on the adapter 1, the microcomputer 9 so controls the power controller 12 that the power VDD is not supplied to the power terminal 6-c, and the flow returns to step 103.

<Step 105> Since the microcomputer 9 determines in step 103 that the lens 2 is mounted on the adapter 1, the microcomputer 9 so controls the power controller 12 that the power VDD is supplied to the power terminal 6-c, and the flow advances to step 106. That is, in steps 103 to 105, the power VDD is not supplied until the lens 2 is mounted and is supplied when the lens 2 is mounted.

<Step 106> Since the circuit power VDD is supplied to the lens 2 in step 105, the microcomputer 9 performs bidirectional serial communication with the microcomputer 2a in the lens 2 via-the electrical contacts 6-e, 6-f, and 6-g. If this serial communication does not terminate normally, the flow advances to step 107. If the serial communication terminates normally, the flow advances to step 108.

<Step 107> Since the communication with the microcomputer 2a in the lens 2 terminates abnormally, the microcomputer 9 controls the power controller 11 so that the power VBAT is not supplied to the power terminal 6-a, and the flow returns to step 103.

<Step 108> Since the communication with the microcomputer 2a in the lens 2 terminates normally, the microcomputer 9 controls the power controller 11 so that the power VBAT is supplied to the power terminal 6-a, and the flow advances to step 109. In steps 106 to 108, the power VBAT is supplied only when the communication with the microcomputer 2a in the lens 2 terminates normally.

<Step 109> The microcomputer 9 controls the mounted lens 2 via the electrical contacts 6 so that the IRIS of the lens 2 is driven in the direction of a full aperture.

<Step 110> The microcomputer 9 reads information pertaining to the IRIS of the mounted lens 2, such as the full-aperture f-number and the minimum-aperture f-number, via the electrical contacts 6, and stores the information in memories AV_O and AV_MAX (not shown), respectively.

<Step 111> The microcomputer 9 controls the mounted lens 2 via the electrical contacts 6 so that the focus of the lens 2 is driven in the direction of a closest focusing distance.

<Step 112> The microcomputer 9 controls the mounted lens 2 via the electrical contacts 6 so that the value of the focus encoder (not shown) is reset to 0.

<Step 113> The microcomputer 9 controls the mounted lens 2 via the electrical contacts 6 so that the focus of the lens 2 is driven in the direction of infinity.

<Step 114> The microcomputer 9 reads the focus encoder value of the mounted lens 2 via the electrical contacts 6 and stores the value in a memory ENC_MAX (not shown).

In steps 109 to 114 described above, the microcomputer 9 drives the IRIS and the focus of the mounted lens 2 to their respective initial positions. Also, the microcomputer 9 reads, from the lens 2, the full-aperture f-number and the minimum-aperture f-number, as inherent data of the lens, and the focus encoder value at the infinity mark assuming the value at the closest focusing distance is 0, and stores these data in the memories, thereby reading the characteristics of the interchangeable lens.

<Step 115> The microcomputer 9 permits a communication via the RS232C interface. If a communication is received, the microcomputer 9 permits an interrupt to occur, and the flow advances to step 200.

FIG. 5A explains the interrupt processing when the RS232C communication described above is received.

<Step 120> The microcomputer 9 analyzes the received command, and the flow advances to a corresponding command reception processing routine. Steps 130 to 135 in FIG. 5B explain the processing when a command for driving the focus in the direction of the closest focusing distance is received.

Referring to FIG. 5B,

<Step 130> The microcomputer 9 copies data of a focus speed number currently being set from the memories MF_SPD0 to MF_SPD3 (not shown) into a memory P (not shown).

<Step 131> If a flag indicating that the focus is being driven in the direction of the closest focusing distance is set, this means that the focus is already being driven in the direction of the closest focusing distance. Accordingly, the microcomputer 9 terminates the communication interrupt routine without performing any processing.

<Step 132> The microcomputer 9 reads a focus encoder value immediately before the focus is driven via the electrical contacts 6 and stores the value in a memory ENC_0 (not shown).

<Step 133> The microcomputer 9 controls the mounted lens 2 via the electrical contacts 6 so that the focus of the lens 2 is driven by the driving amount P in the direction of the closest focusing distance.

<Step 134> The microcomputer 9 sets the flag indicating that the focus is being driven in the direction of the closest focusing distance.

<Step 135> The microcomputer 9 clears the flag indicating that the focus is being driven in the direction of infinity, and completes the communication interrupt routine.

Figure 5C:
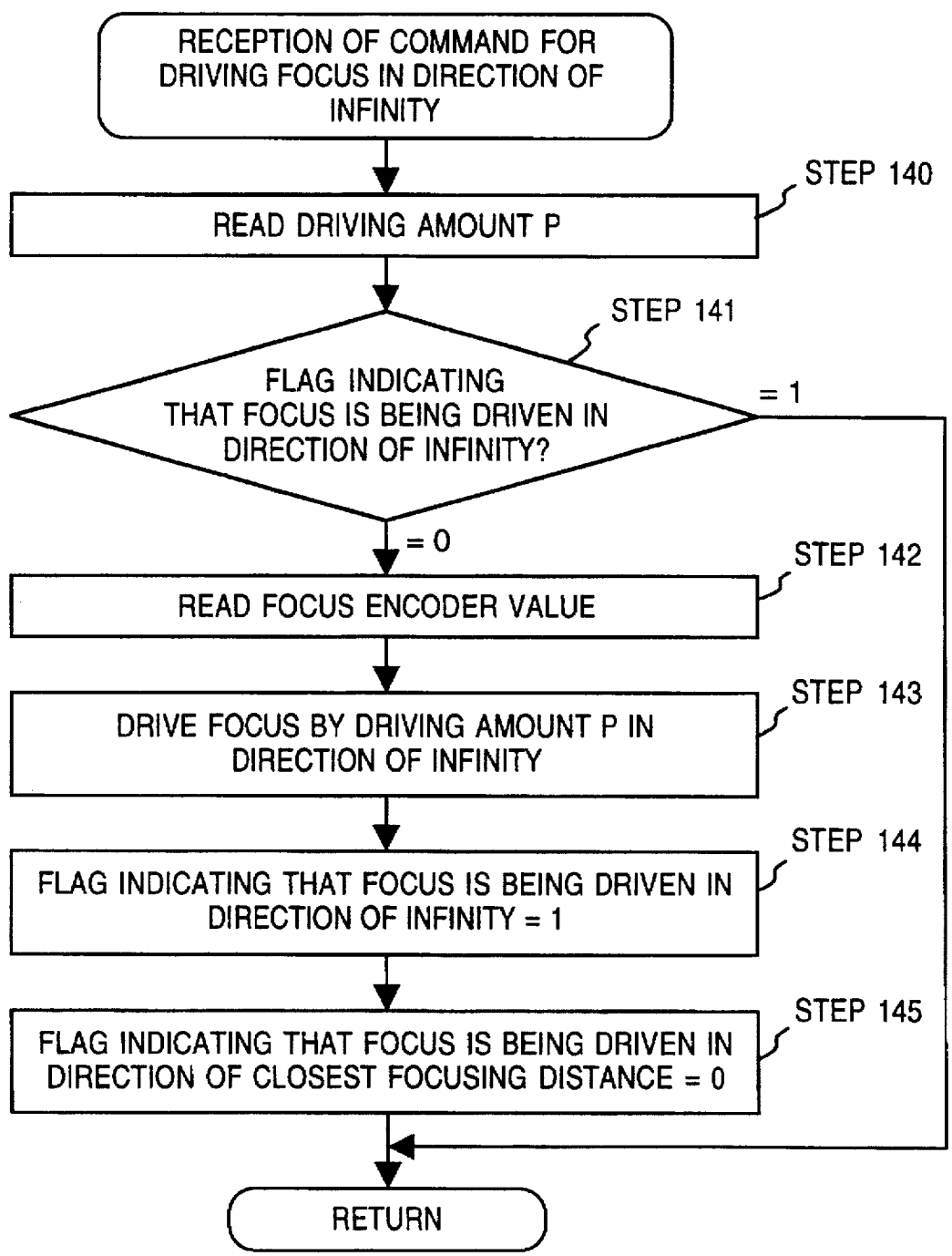

Steps 140 to 145 in FIG. 5C explain the processing when a command for driving the focus in the direction of infinity is received.

<Step 140> The microcomputer 9 copies data of a focus speed number currently being set from the memories MF_SPD0 to MF_SPD3 (not shown) into the memory P (not shown).

<Step 141> If the flag indicating that the focus is being driven in the direction of infinity is set, this means that the focus is already being driven in the direction of infinity. Accordingly, the microcomputer 9 terminates the communication interrupt routine without performing any processing.

<Step 142> The microcomputer 9 reads a focus encoder value immediately before the focus is driven via the electrical contacts 6 and stores the value in the memory ENC_0 (not shown).

<Step 143> The microcomputer 9 controls the mounted lens 2 via the electrical contacts 6 so that the focus of the lens 2 is driven by the driving amount P in the direction of infinity.

<Step 144> The microcomputer 9 sets the flag indicating that the focus is being driven in the direction of infinity.

<Step 145> The microcomputer 9 clears the flag indicating that the focus is being drive in the direction of the closest focusing distance, and completes the communication interrupt processing.

Figure 5D:
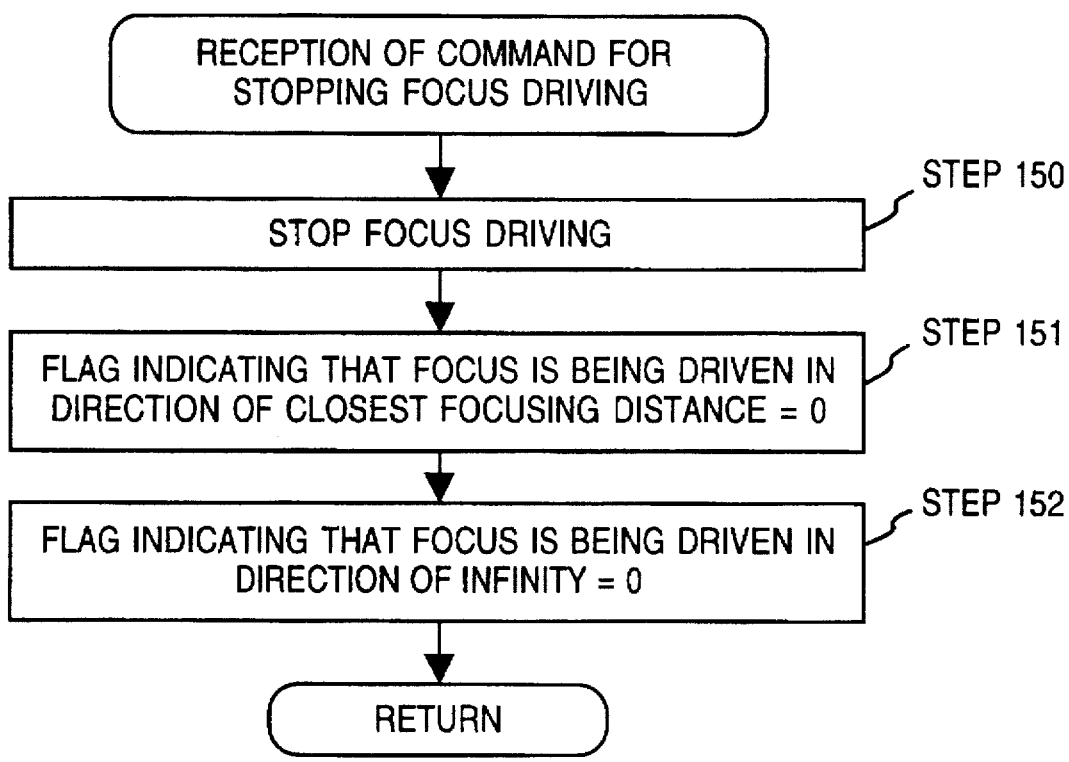

Steps 150 to 152 in FIG. 5D explain the processing when a command for stopping the focus is received.

<Step 150> The microcomputer 9 controls the mounted lens 2 via the electrical contacts 6 so that the focus of the lens 2 is stopped.

<Step 151> The microcomputer 9 clears the flag indicating that the focus is being-driven in the direction of the closest focusing distance, and <Step 152> The microcomputer 9 clears the flag indicating that the focus is being driven in the direction of infinity, and completes the communication interrupt routine.

Figure 5E:
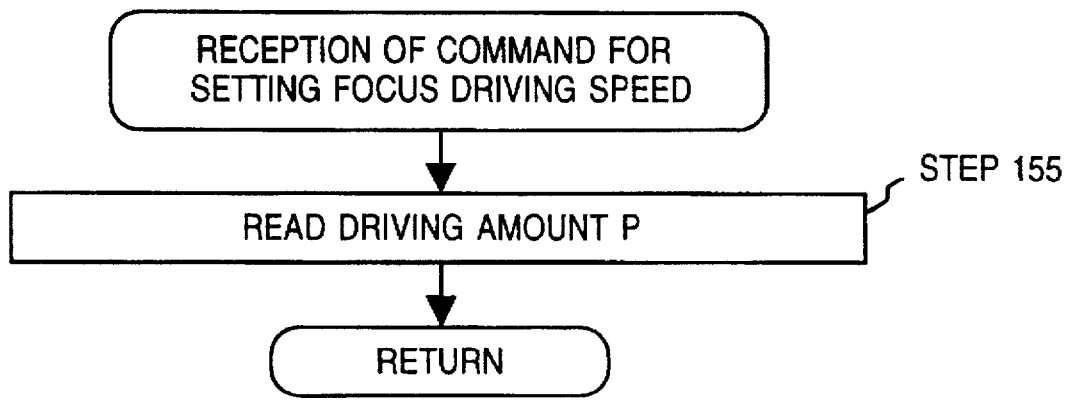

Step 155 in FIG. 5E explains the processing when a command for setting the focus speed is received.

<Step 155> In accordance with the received focus speed number, the microcomputer 9 copies the speed data from the memories MF_SPD0 to MF_SPD3 into the memory P and completes the communication interrupt routine.

Figure 6A:
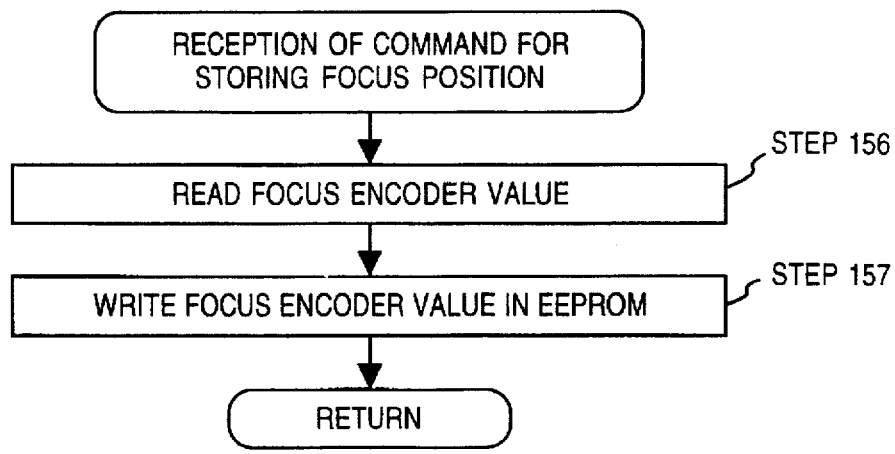
FIGS. 6A and 6B are flow charts showing the operation of the converting adapter according to the first embodiment of the present invention.

Steps 156 and 157 in FIG. 6A explain the processing when a command for storing the focus position is received.

<Step 156> The microcomputer 9 reads the focus encoder value from the lens 2 via the electrical contacts 6 and stores the value in the memories MF_MEMO0 to MF_MEMO7 (not shown) in accordance with the received storage number.

<Step 157> The microcomputer 9 reads the focus encoder value from the lens 2 via the electrical contacts 6, stores the value in the nonvolatile memories F_MEMO0 to F_MEMO7 (not shown) in accordance with the received storage number, and completes the communication interrupt routine.

Figure 6B:
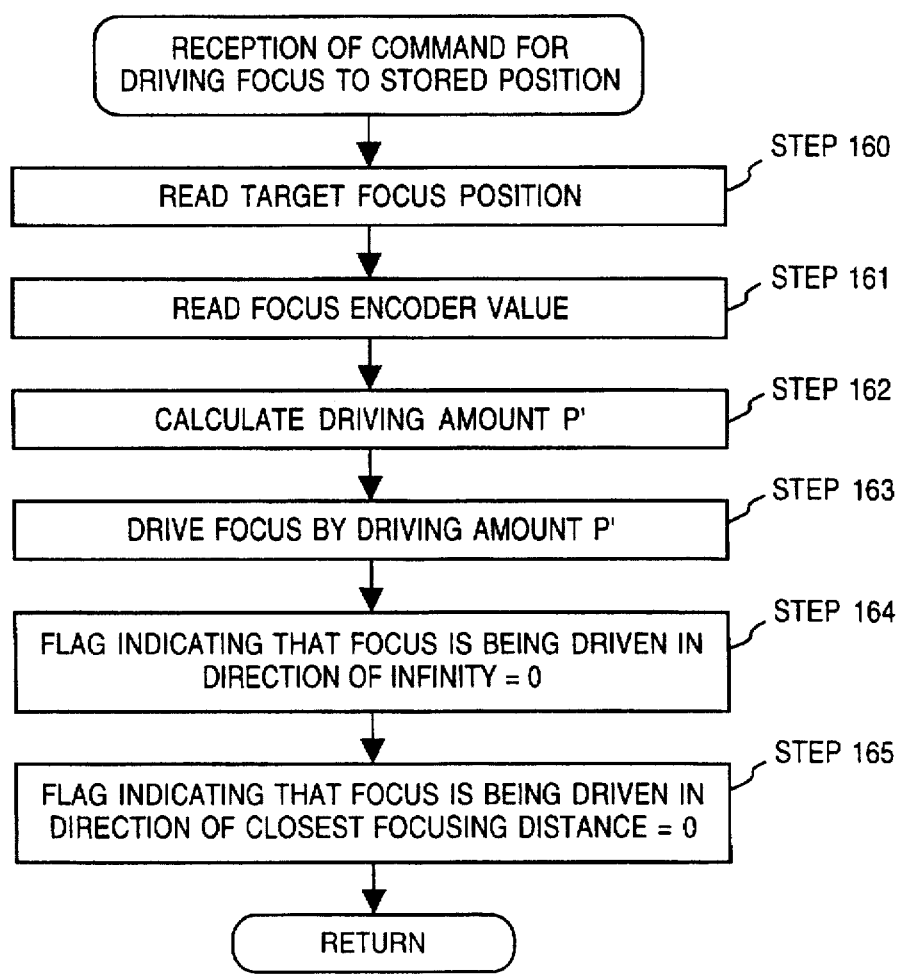

Steps 160 to 165 in FIG. 6B explain the processing when a command for driving the focus to the stored focus position is received.

<Step 160> In accordance with the received storage number, the microcomputer 9 stores the data from the memories MF_MEMO0 to MF_MEMO7 (not shown) into a memory ENC_2 (not shown). That is, the data stored in the memory ENC_2 indicates the target encoder value to which the focus is to be driven.

<Step 161> The microcomputer 9 reads the focus encoder value from the lens 2 via the electrical contacts 6 and stores the value in the memory ENC_0 (not shown).

<Step 162> The microcomputer 9 calculates a driving amount from the memories ENC_0 and ENC_2 and stores the calculated value in a memory P' (not shown). Note that this calculation is represented by P'=ENC_2 − ENC_0.

<Step 163> The microcomputer 9 controls the mounted lens 2 via the electrical contacts 6 so that the focus of the lens 2 is driven by the driving amount P'.

<Step 164> The microcomputer 9 clears the flag indicating that the focus is being driven in the direction of infinity.

<Step 165> The microcomputer 9 clears the flag indicating that the focus is being driven in the direction of the closest focusing distance, and completes the communication interrupt routine.

Steps 170 to 177 in FIG. 7A explain the processing when a command for driving the IRIS in the direction of the full aperture is received.

<Step 170> The microcomputer 9 reads information indicating whether the IRIS is currently at the full aperture from the lens 2 via the electrical contacts 6. If YES in step 170, the IRIS cannot be further driven in the direction of the full aperture, so the microcomputer 9 immediately terminates the communication interrupt routine. If NO in step 170, the flow advances to step 171.

<Step 171> The microcomputer 9 copies data of an IRIS speed number currently being set from the memories MI_SPD0 to MI_SPD3 (not shown) into a memory T (not shown).

<Step 172> If a flag indicating that the IRIS is being driven in the direction of the full aperture is set, this means that the IRIS is already being driven in the direction of the full aperture. Accordingly, the microcomputer 9 terminates the communication interrupt routine without performing any processing.

<Step 173> The microcomputer 9 controls the mounted lens 2 via the electrical contacts 6 so that the IRIS of the lens 2 is driven by a ⅛ step in the direction of the full aperture.

<Step 174> The microcomputer 9 starts a timer so as to generate an interrupt after elapse of a time T.

<Step 175> The microcomputer 9 clears a timer interrupt generation flag.

<Step 176> The microcomputer 9 sets the flag indicating that the IRIS is being driven in the direction of the full aperture.

<Step 177> The microcomputer 9 clears a flag indicating that the IRIS is being driven in the direction of a stopped-down aperture, and completes the communication interrupt routine.

Figure 7B:
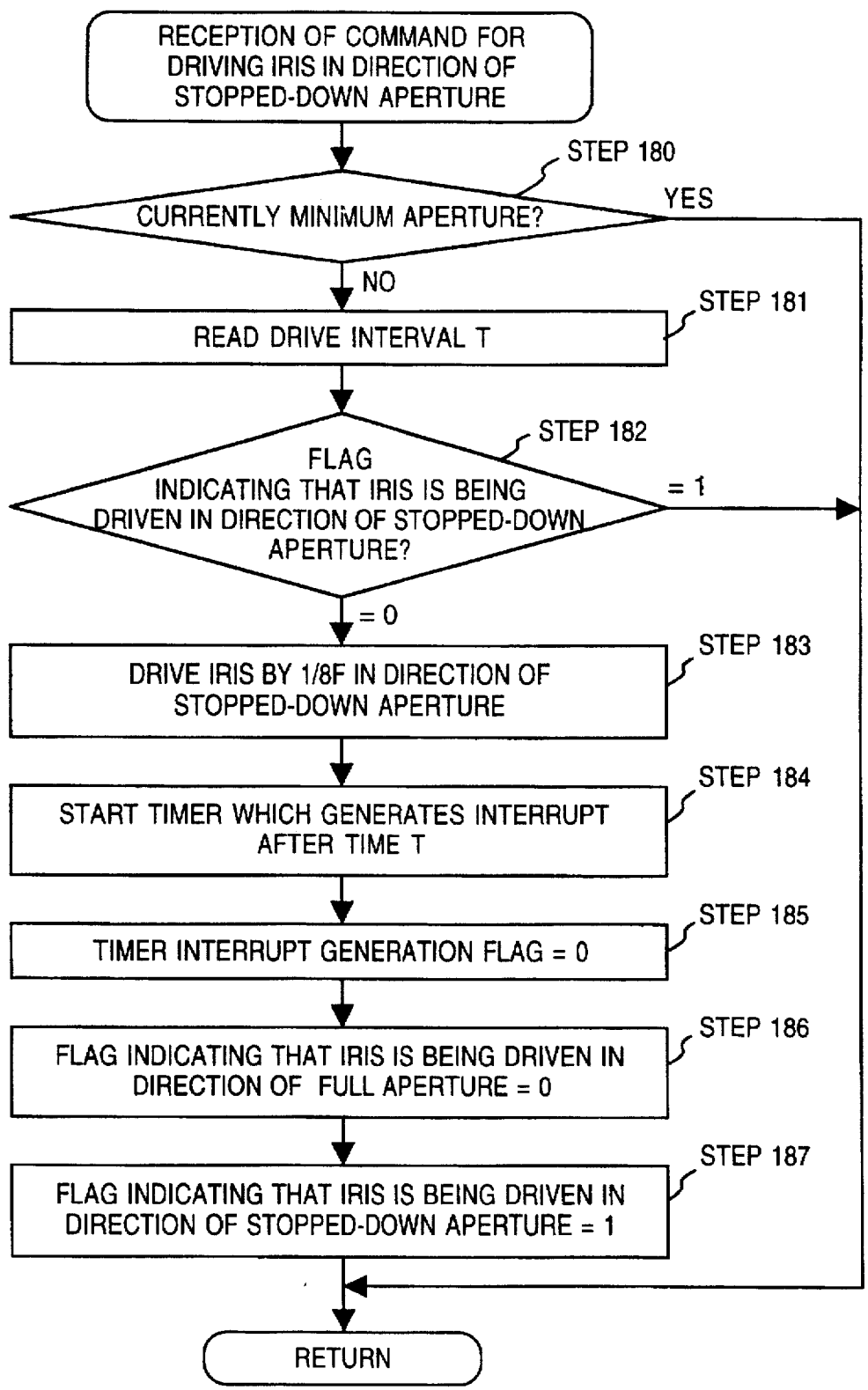

Steps 180 to 187 in FIG. 7B explain the processing when a command for driving the IRIS in the direction of the stopped-down aperture is received.

<Step 180> The microcomputer 9 reads information indicating whether the IRIS is currently at the minimum aperture from the lens 2 via the electrical contacts. If YES in step 180, the IRIS cannot be further driven in the direction of the stopped-dom aperture, so the microcomputer 9 immediately terminates the communication interrupt routine. If NO in step 180, the flow advances to step 181.

<Step 181> The microcomputer 9 copies data of an IRIS speed number currently being set from the memories MI_SPD0 to MI_SPD3 (not shown) into the memory T (not shown).

<Step 182> If the flag indicating that the IRIS is being driven in the direction of the stopped-down aperture is set, this means that the IRIS is already being driven in the direction of the stopped-down aperture. Accordingly, the microcomputer 9 terminates the communication interrupt routine without performing any processing.

<Step 183> The microcomputer 9 controls the mounted lens 2 via the electrical contacts 6 so that the IRIS of the lens 2 is driven by a ⅛ step in the direction of the stopped-down aperture.

<Step 184> The microcomputer 9 starts the timer so as to generate an interrupt after elapse of a time T.

<Step 185> The microcomputer 9 clears the timer interrupt generation flag.

<Step 186> The microcomputer 9 clears the flag indicating that the IRIS is being driven in the direction of the full aperture.

<Step 187> The microcomputer 9 sets the flag indicating that the IRIS is being driven in the direction of the stopped-down aperture, and completes the communication interrupt routine.

Figure 7C:
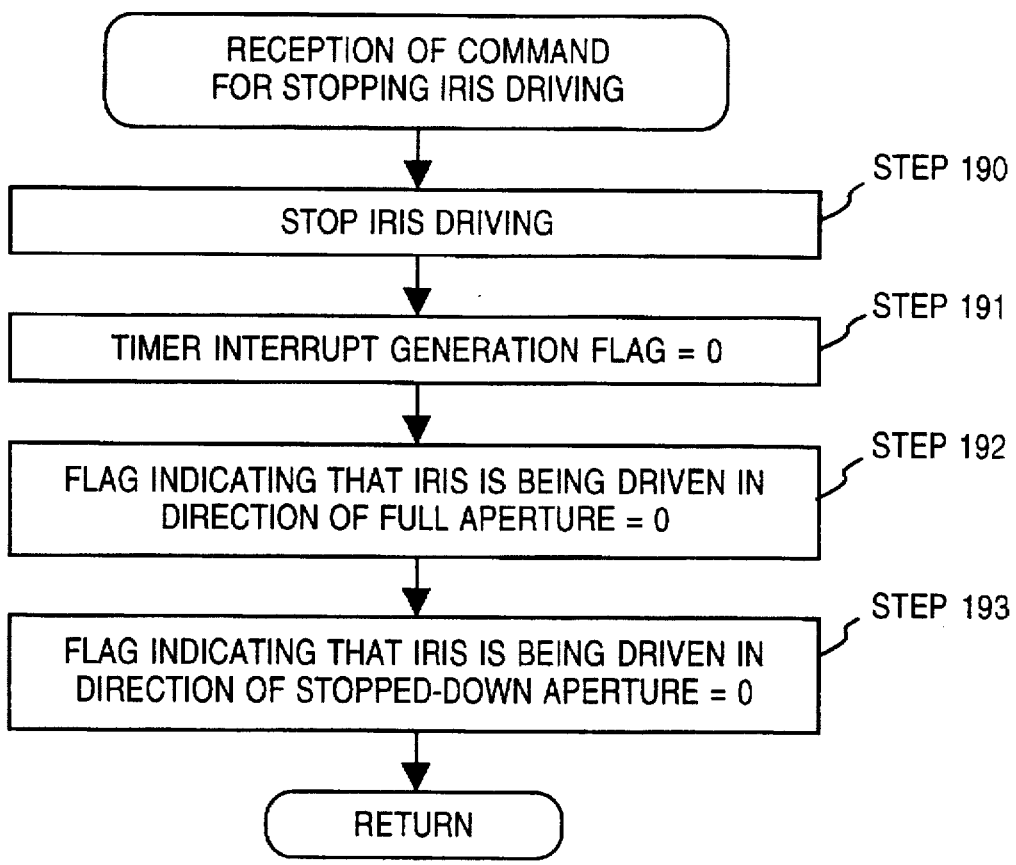

Steps 190 to 193 in FIG. 7C explain the processing when a command for stopping IRIS driving is received.

<Step 190> The microcomputer 9 controls the mounted lens 2 via the electrical contacts 6 so that IRIS driving of the lens 2 is stopped.

<Step 191> The microcomputer 9 clears the timer interrupt generation flag.

<Step 192> The microcomputer 9 clears the flag indicating that the IRIS is being driven in the direction of the full aperture.

<Step 193> The microcomputer 9 clears the flag indicating that the IRIS is being driven in the direction of the stopped-down aperture, and completes the communication interrupt routine.

Figure 7D:
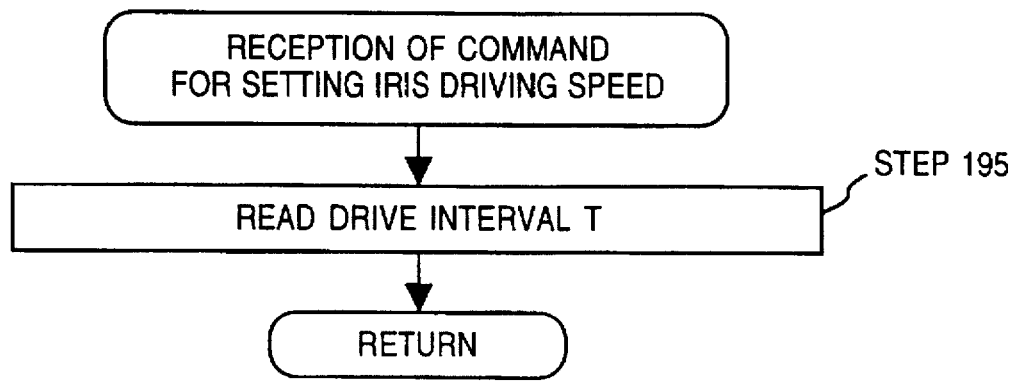

Step 195 in FIG. 7D explains the processing when a command for setting the IRIS driving speed is received.

<Step 195> In accordance with the received IRIS driving speed number, the microcomputer 9 copies the speed data from the memories MI_SPD0 to MI_SPD3 (not shown) into the memory T (not shown) and completes the communication interrupt routine.

Referring back to FIGS. 4A and 4B, after step 115 the microcomputer 9 must receive various commands and cause the lens 2 to perform the respective corresponding operations of the received commands, since the microcomputer 9 has permitted an RS232C communication in step 115. In steps 200 to 207, the microcomputer 9 checks whether focus driving or IRIS driving needs to be performed, and executes each corresponding processing.

<Step 200> If the flag indicating that the focus is being driven in the direction of the closest focusing distance is set, in step 201 the microcomputer 9 performs processing of driving the focus in the direction of the closest focusing distance.

<Step 202> If the flag indicating that the focus is being driven in the direction of infinity is set, in step 203 the microcomputer 9 performs processing of driving the focus in the direction of infinity.

<Step 204> If the flag indicating that the IRIS is being driven in the direction of the full aperture is set, in step 205 the microcomputer 9 performs processing of driving the IRIS in the direction of the full aperture.

<Step 206> If the flag indicating that the IRIS is being driven in the direction of the stopped-down aperture is set, in step 207 the microcomputer 9 performs processing of driving the IRIS in the direction of the stopped-down aperture.

Figure 4A:
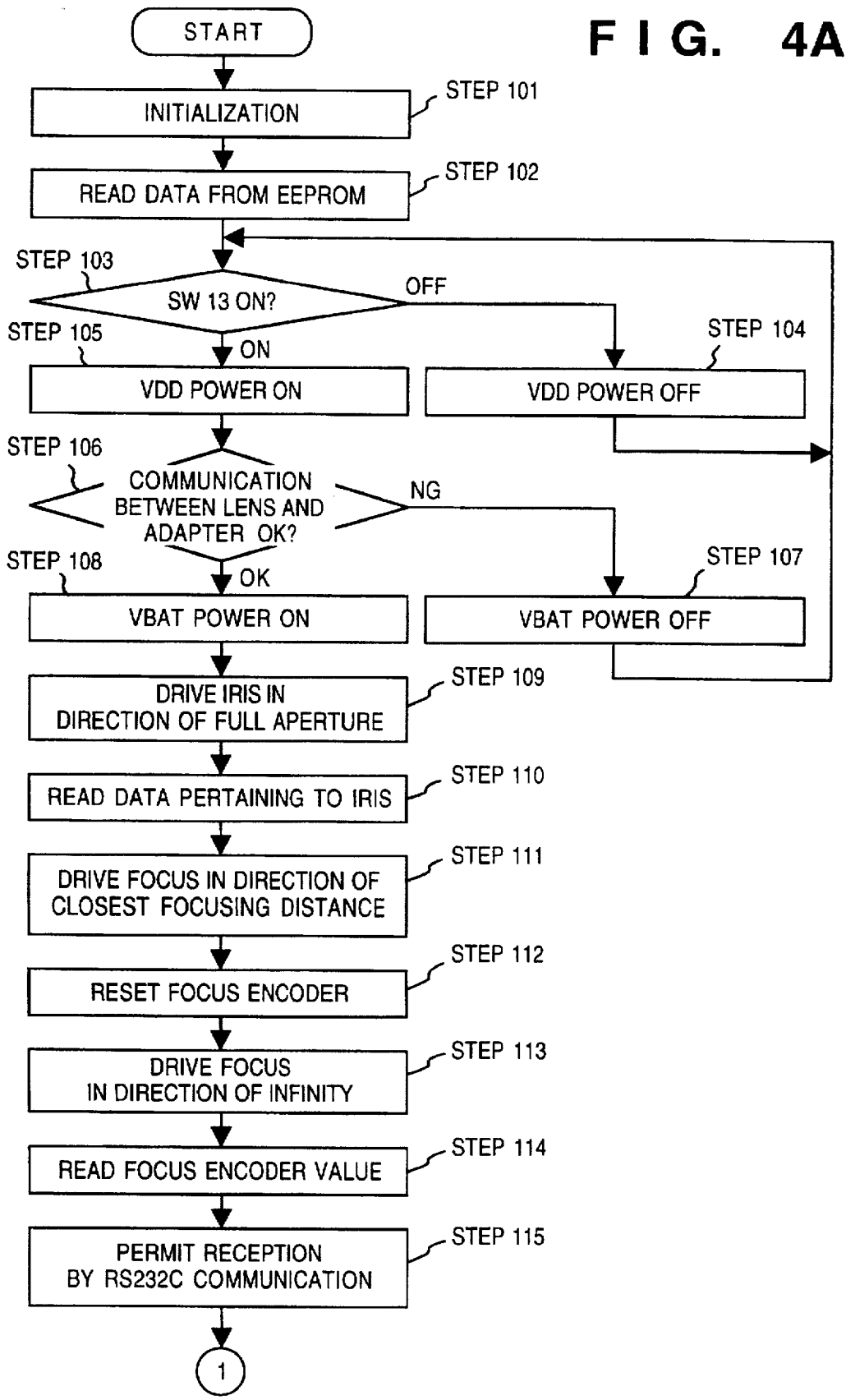
FIGS. 4A and 4B are main flow charts showing the operation of the converting adapter according to the first embodiment of the present invention.
Figure 4B:
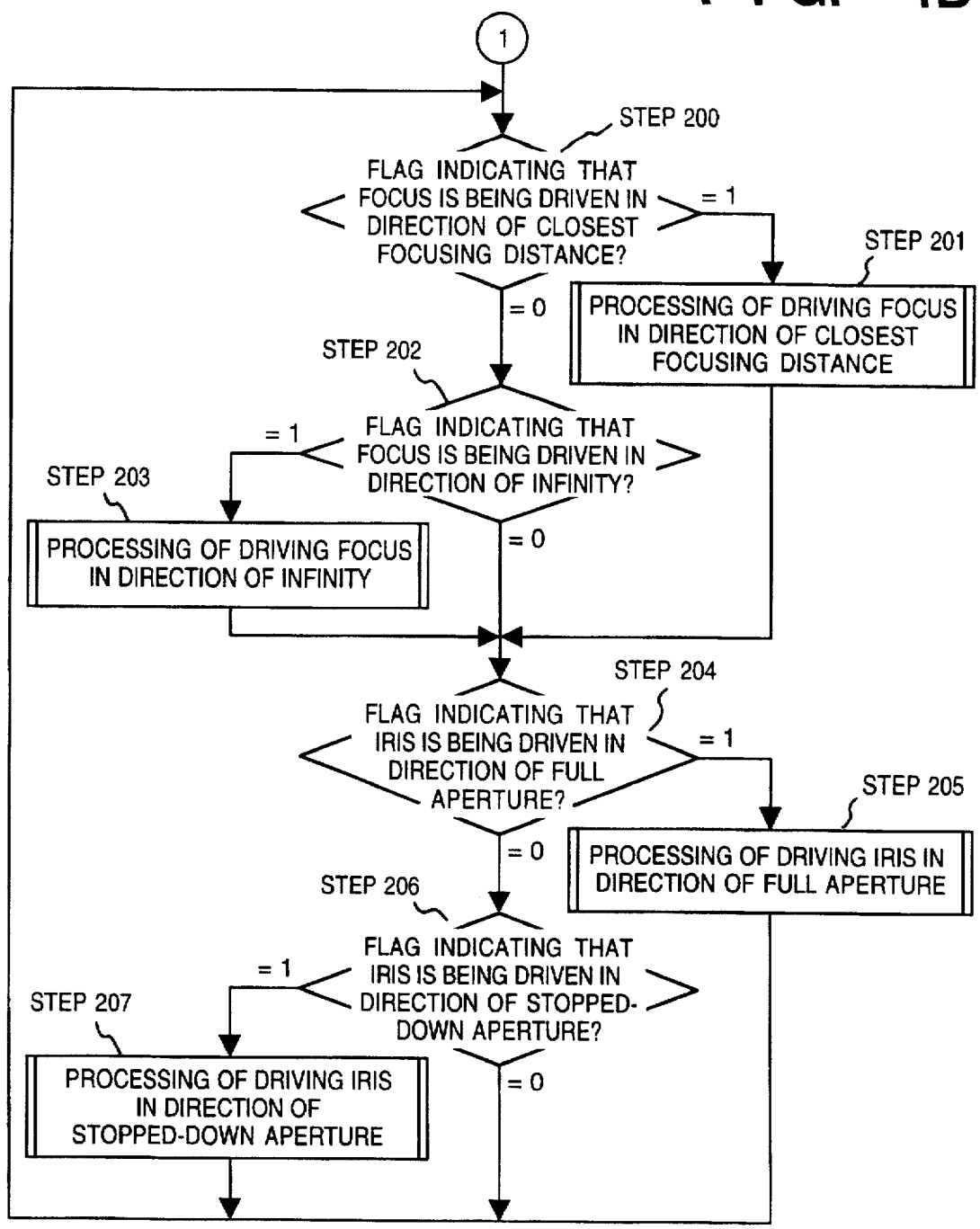
Figure 8A:
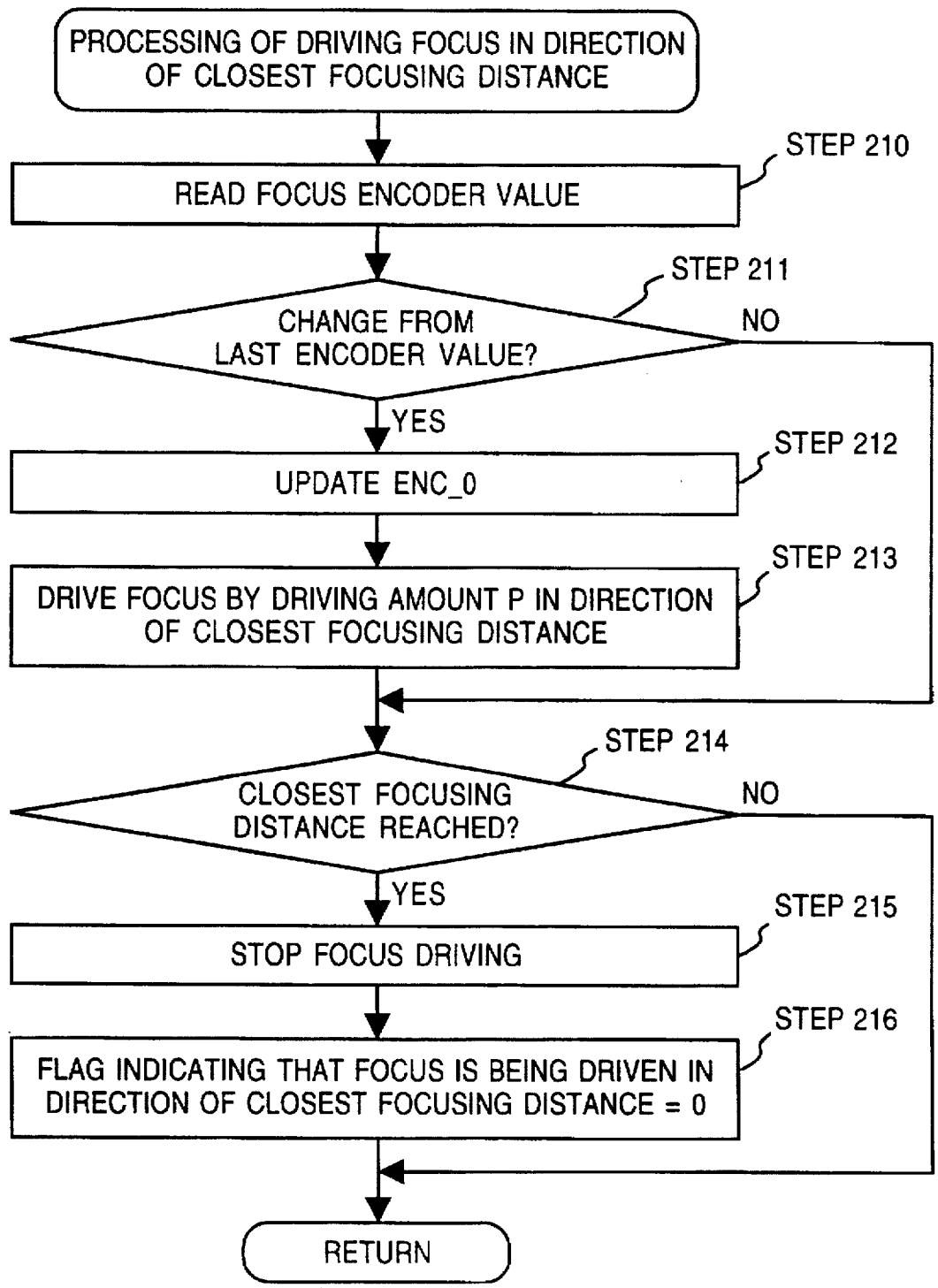
FIGS. 8A and 8B are flow charts showing the operation of the converting adapter according to the first embodiment of the present invention.

Steps 210 to 216 in FIG. 8A represent the subroutine of driving the focus in the direction of the closest focusing distance in step 201, FIG. 4B.

<Step 210> The microcomputer 9 reads the focus encoder value from the lens 2 via the electrical contacts 6 and stores the value in a memory ENC_1 (not shown).

<Step 211> The microcomputer 9 compares the last focus encoder value ENC_0 with the current focus encoder value ENC_1. If the values are equal, the flow advances to step 214. If the values are different, the flow advances to step 212.

<Step 212> The microcomputer 9 copies the contents of the current focus encoder value ENC_1 in EMC_0, thereby updating ENC_0.

<Step 213> The microcomputer 9 controls the mounted lens 2 via the electrical contacts 6 so that the focus of the lens 2 is driven by the driving amount P in the direction of the closest focusing distance.

<Step 214> The microcomputer 9 reads information indicating whether the focus has reached the closest focusing distance from the lens 2 via the electrical contacts 6. If NO in step 214, the microcomputer 9 immediately terminates the subroutine of driving the focus in the direction of the closest focusing distance. If YES in step 214, the flow advances to step 215.

<Step 215> The microcomputer 9 controls the mounted lens 2 via the electrical contacts 6 so that the focus of the lens 2 is stopped.

<Step 216> The microcomputer 9 clears the flag indicating that the focus is being driven in the direction of the closest focusing distance, and completes the subroutine of driving the focus in the direction of the closest focusing distance.

Figure 8B:
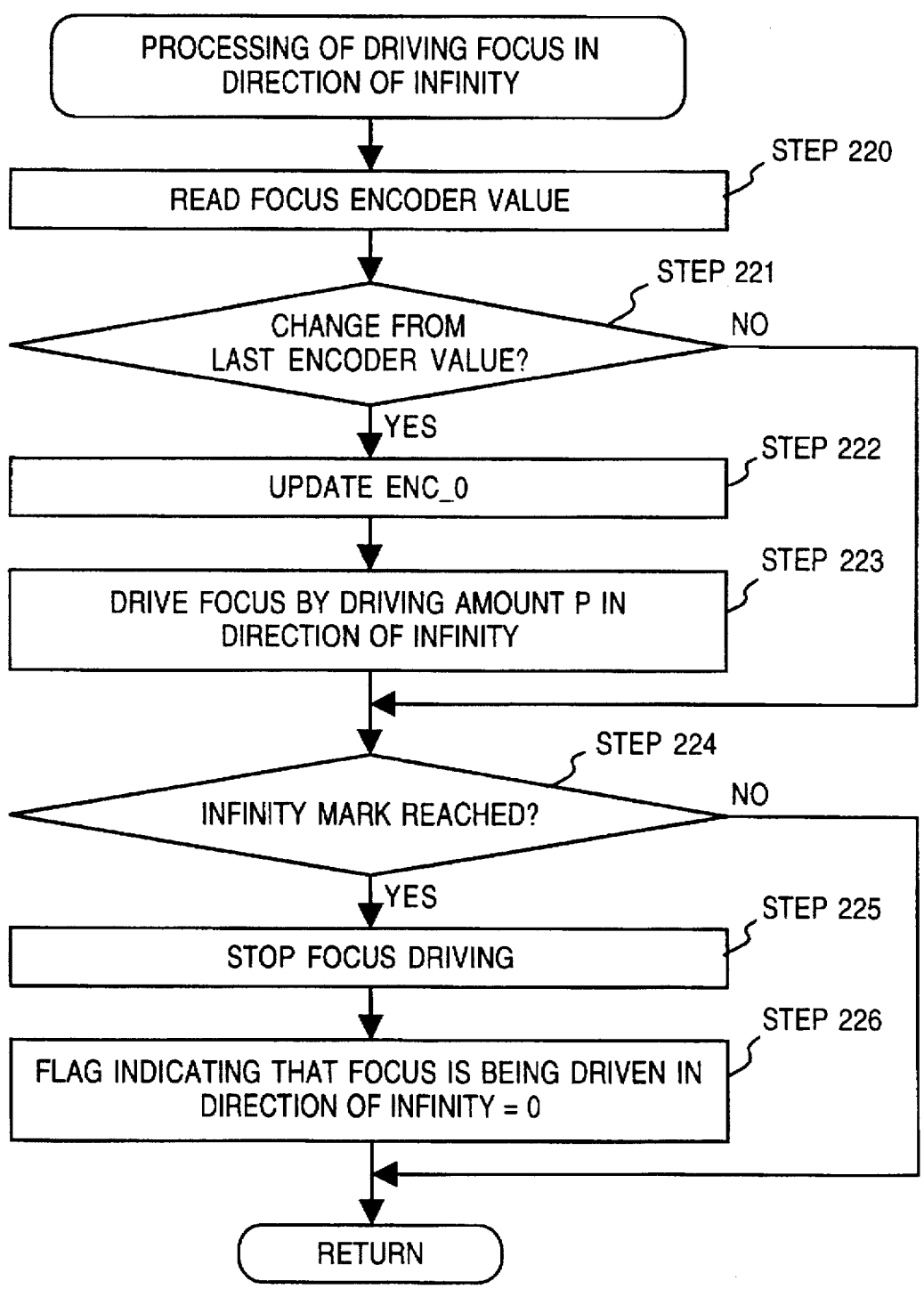

Steps 220 to 226 in FIG. 8B represent the subroutine of driving the focus in the direction of infinity in step 203, FIG. 4B.

<Step 220> The microcomputer 9 reads the focus encoder value from the lens 2 via the electrical contacts 6 and stores the value in the memory ENC__1 (not shown).

<Step 221> The microcomputer 9 compares the last focus encoder value ENC__0 with the current focus encoder value ENC__1. If the values are equal, the flow advances to step 224. If the values are different, the flow advances to step 222.

<Step 222> The micro computer 9 copies the contents of the current focus encoder value ENC__i in EMC__0, thereby updating ENC__0.

<Step 223> The microcomputer 9 controls the mounted lens 2 via the electrical contacts 6 so that the focus of the lens 2 is driven by the driving amount P in the direction of infinity.

<Step 224> The microcomputer 9 reads information indicating whether the focus has reached the infinity mark from the lens 2 via the electrical contacts 6. If NO in step 224, the microcomputer 9 immediately terminates the subroutine of driving the focus in the direction of infinity. If YES in step 224, the flow advances to step 225.

<Step 225> The microcomputer 9 controls the mounted lens 2 via the electrical contacts 6 so that the focus of the lens 2 is stopped.

<Step 226> The microcomputer 9 clears the flag indicating that the focus is being driven in the direction of infinity, and completes the subroutine of driving the focus in the direction of infinity.

Figure 9A:
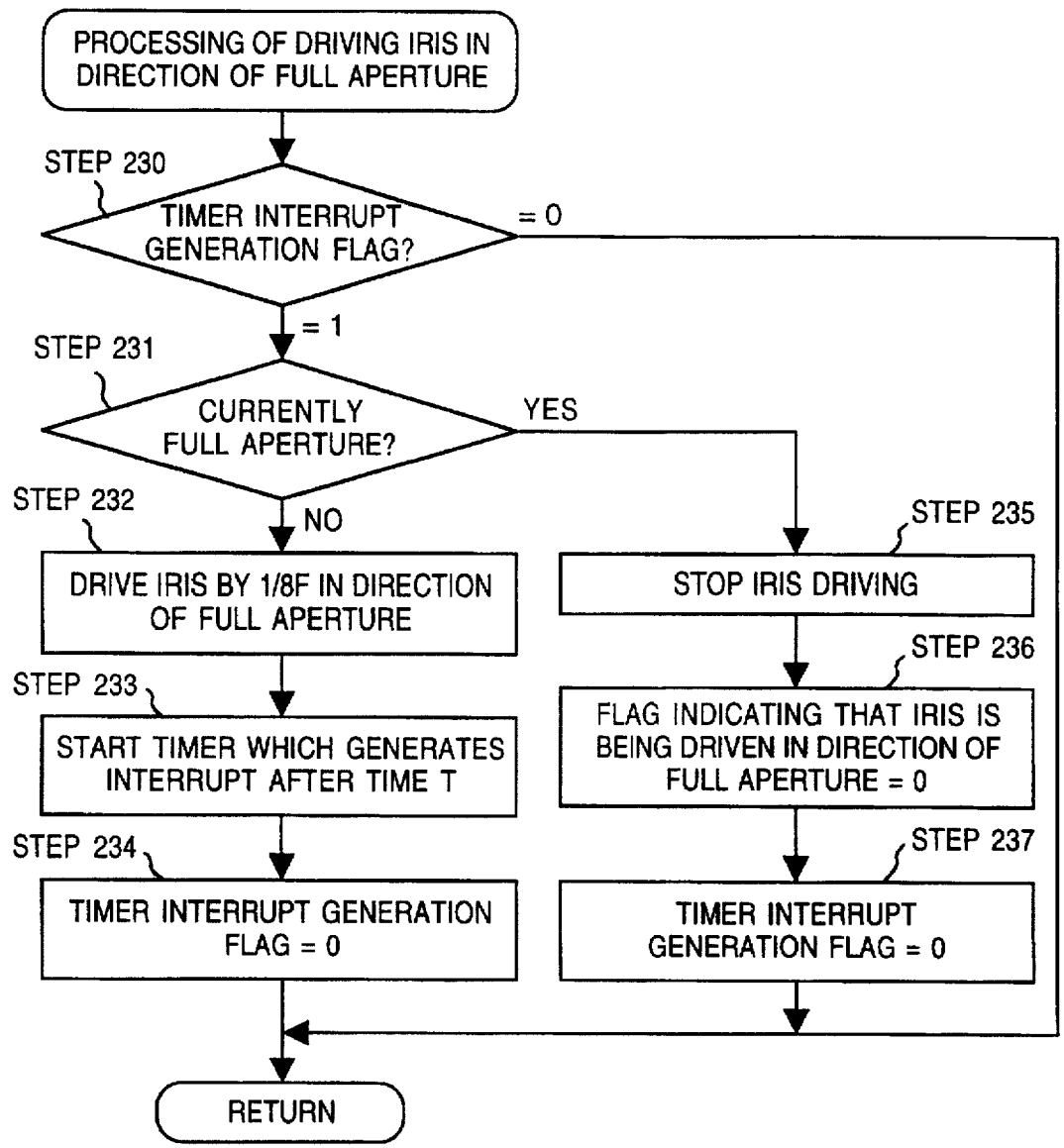
FIGS. 9A to 9C are flow charts showing the operation of the converting adapter according to the first embodiment of the present invention.

Steps 230 to 237 in FIG. 9A represent the subroutine of driving the IRIS in the direction of the full aperture in step 205, FIG. 4B.

<Step 230> If the timer interrupt generation flag is not set, this means that the time T has not elapsed from the last IRIS driving. Accordingly, the microcomputer 9 immediately terminates the subroutine of driving the IRIS in the direction of the full aperture. If the timer interrupt generation flag is set, the flow advances to step 231.

<Step 231> The microcomputer 9 reads information indicating whether the IRIS of the mounted lens 2 is at the full aperture via the electrical contacts 6. If YES in step 231, the IRIS need not be further driven in the direction of the full aperture, so the flow advances to step 235.

<Step 232> The microcomputer 9 controls the lens 2 via the electrical contacts 6 so that the IRIS of the lens 2 is driven by a ⅛ step in the direction of the full aperture.

<Step 233> The microcomputer 9 starts the timer so as to generate an interrupt after elapse of a time T.

<Step 234> The microcomputer 9 clears the timer interrupt generation flag and completes the subroutine of driving the IRIS in the direction of the full aperture.

<Step 235> The microcomputer 9 controls the mounted lens 2 via the electrical contacts 6 so that the IRIS driving of the lens 2 is stopped.

<Step 236> The microcomputer 9 clears the flag indicating that the IRIS is being driven in the direction of the full aperture.

<Step 237> The microcomputer 9 clears the timer interrupt generation flag and completes the subroutine of driving the IRIS in the direction of the full aperture.

Figure 9B:
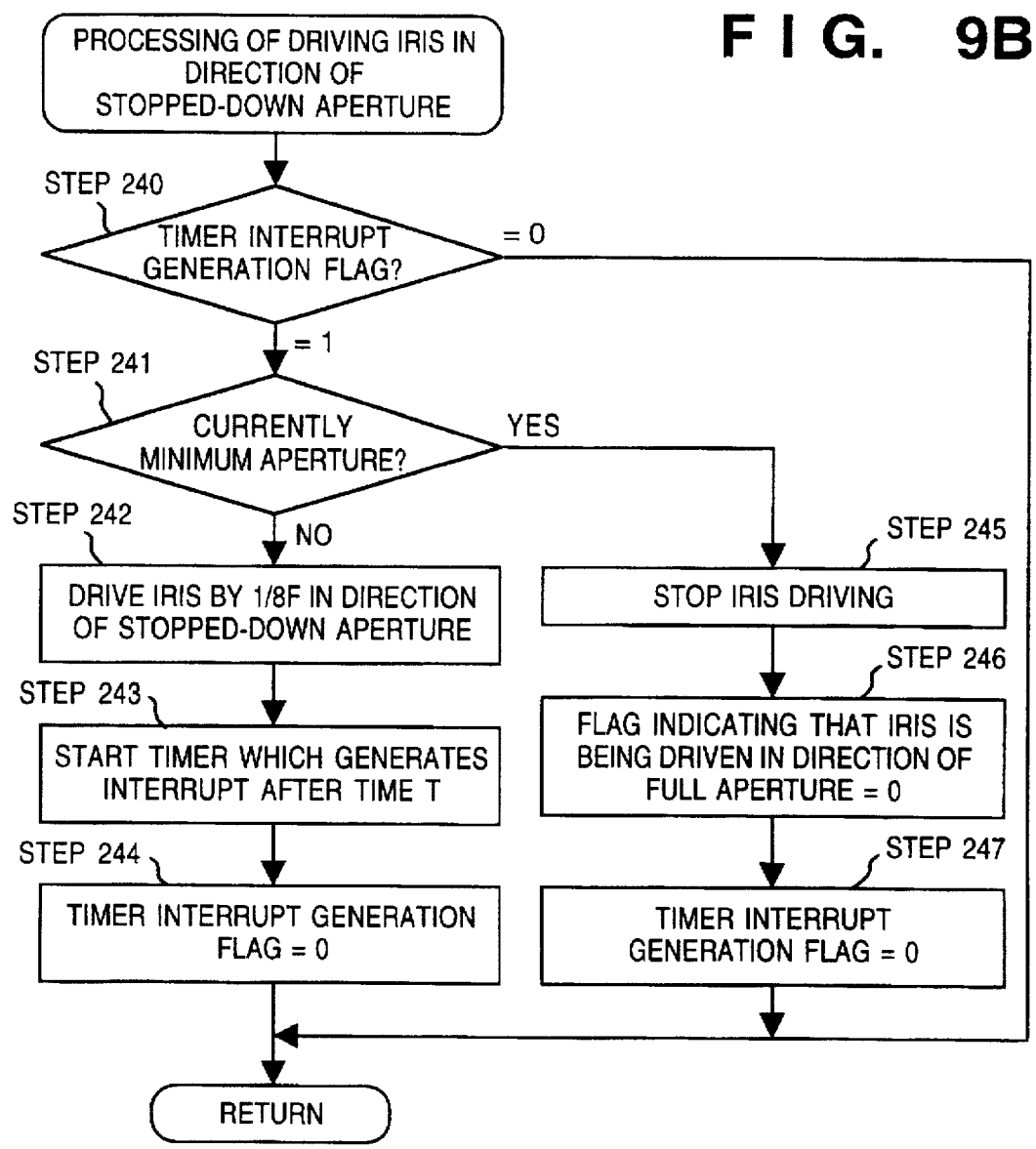

Steps 240 to 247 in FIG. 9B represent the subroutine of driving the IRIS in the direction of the stopped-down aperture in step 207, FIG. 4B.

<Step 240> If the timer interrupt generation flag is not set, this means that the time T has not elapsed from the last IRIS driving. Accordingly, the microcomputer 9 immediately terminates the subroutine of driving the IRIS in the direction of the stopped-down aperture. If the timer interrupt generation flag is set, the flow advances to step 241.

<Step 241> The microcomputer 9 reads information indicating whether the IRIS of the mounted lens 2 is at the minimum aperture via the electrical contacts 6. If YES in step 241, the IRIS cannot be further stopped down, so the flow advances to step 245.

<Step 242> The microcomputer 9 controls the lens 2 via the electrical contacts 6 so that the IRIS of the lens 2 is driven by a ⅛ step in the direction of the stopped-down aperture.

<Step 243> The microcomputer 9 starts the timer so as to generate an interrupt after elapse of a time T.

<Step 244> The microcomputer 9 clears the timer interrupt generation flag and completes the subroutine of driving the IRIS in the direction of the stopped-down aperture.

<Step 245> The microcomputer 9 controls the mounted lens 2 via the electrical contacts 6 so that the IRIS driving of the lens 2 is stopped.

<Step 246> The microcomputer 9 clears the flag indicating that the IRIS is being driven in the direction of the stopped-down aperture.

<Step 247> The microcomputer 9 clears the timer interrupt generation flag and completes the subroutine of driving the IRIS in the direction of the stopped-down aperture.

Figure 9C:
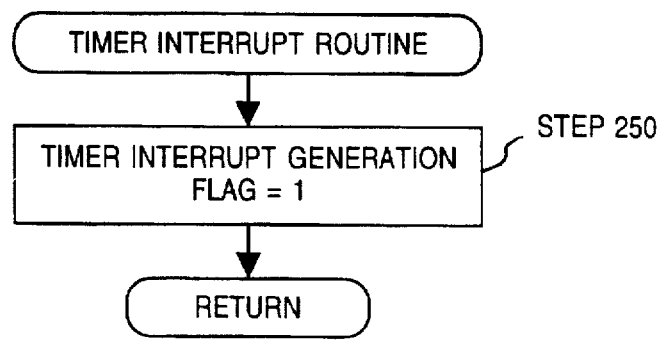

Step 250 in FIG. 9C represents the timer interrupt routine performed when a timer interrupt occurs.

<Step 250> The microcomputer 9 sets the timer interrupt generation flag for a timer interrupt after elapse of time T and completes the interrupt routine.

Figure 11:
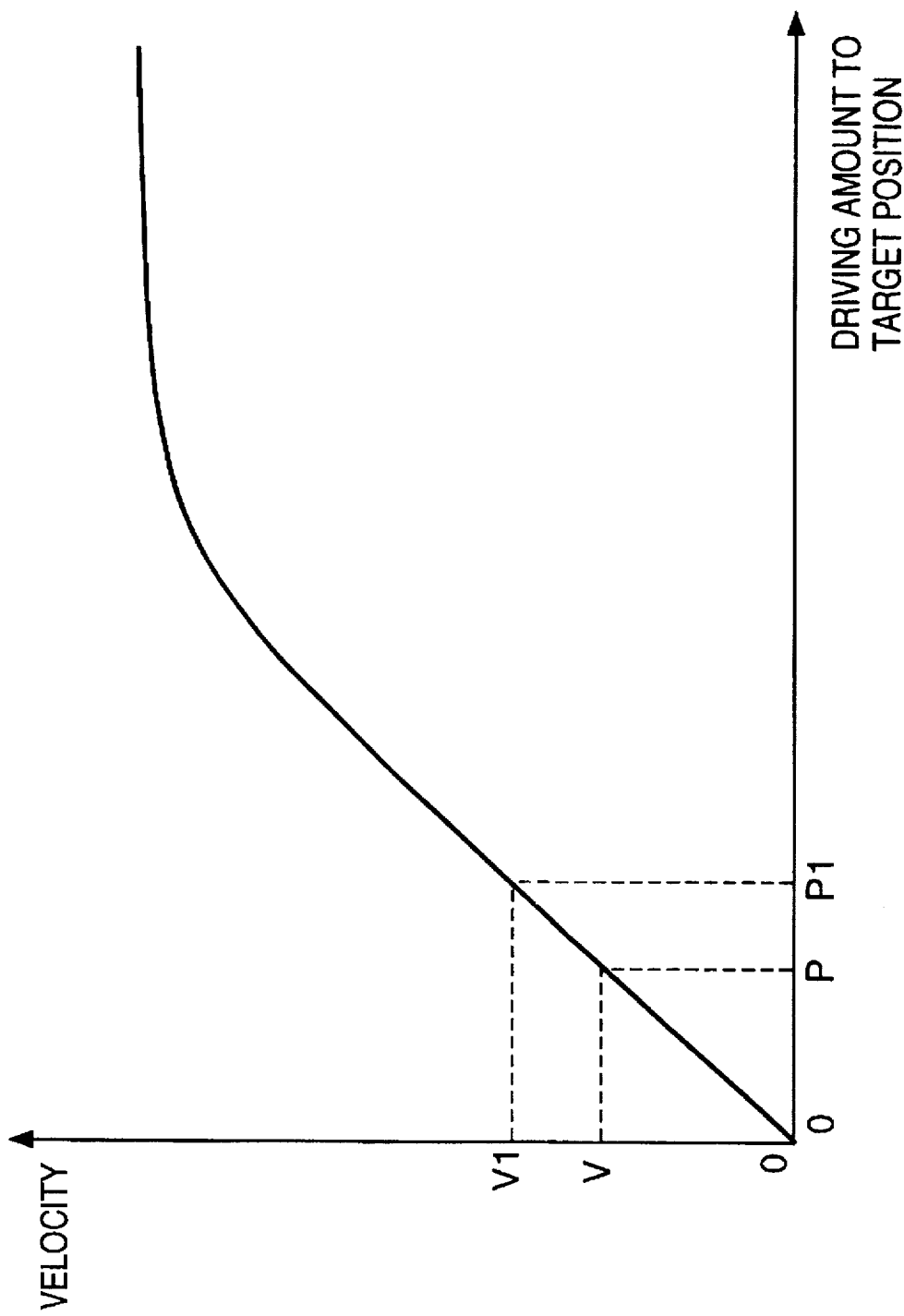
FIG. 11 is a graph showing the driving characteristic of an interchangeable lens assembly in the first embodiment of the present invention.

Generally, a speed servo method by which the rotation of a motor to be controlled is made follow the target speed is well known as the motor control method. In this speed servo method, as illustrated in FIG. 11, as the target stop position is approached the target speed is gradually decreased to increase the stop position accuracy. In the lens 2 mounted on this converting adapter, control for the focusing actuator is in many instances so programmed as to have the characteristic as shown in FIG. 11.

In this embodiment, the following method is used in manual focusing in which the stop position is not predetermined. That is, in order that the focus of the lens 2 having the focus driving characteristic as in FIG. 11 can be continuously driven at a given speed, a small driving amount P is repetitively set from the converting adapter 1 into the lens 2 at each predetermined time interval, thereby controlling driving of the lens. Since a velocity V is determined by the driving amount P to the target position, if the driving amount is P1 the velocity is kept at V1. On the other hand, in cases where the focus is to be driven to a prestored focus position such as in automatic focusing, the focus is driven to the target position at once by the first driving control without performing the driving control a number of times as described above. This makes driving control within the shortest time possible.

Figure 12:
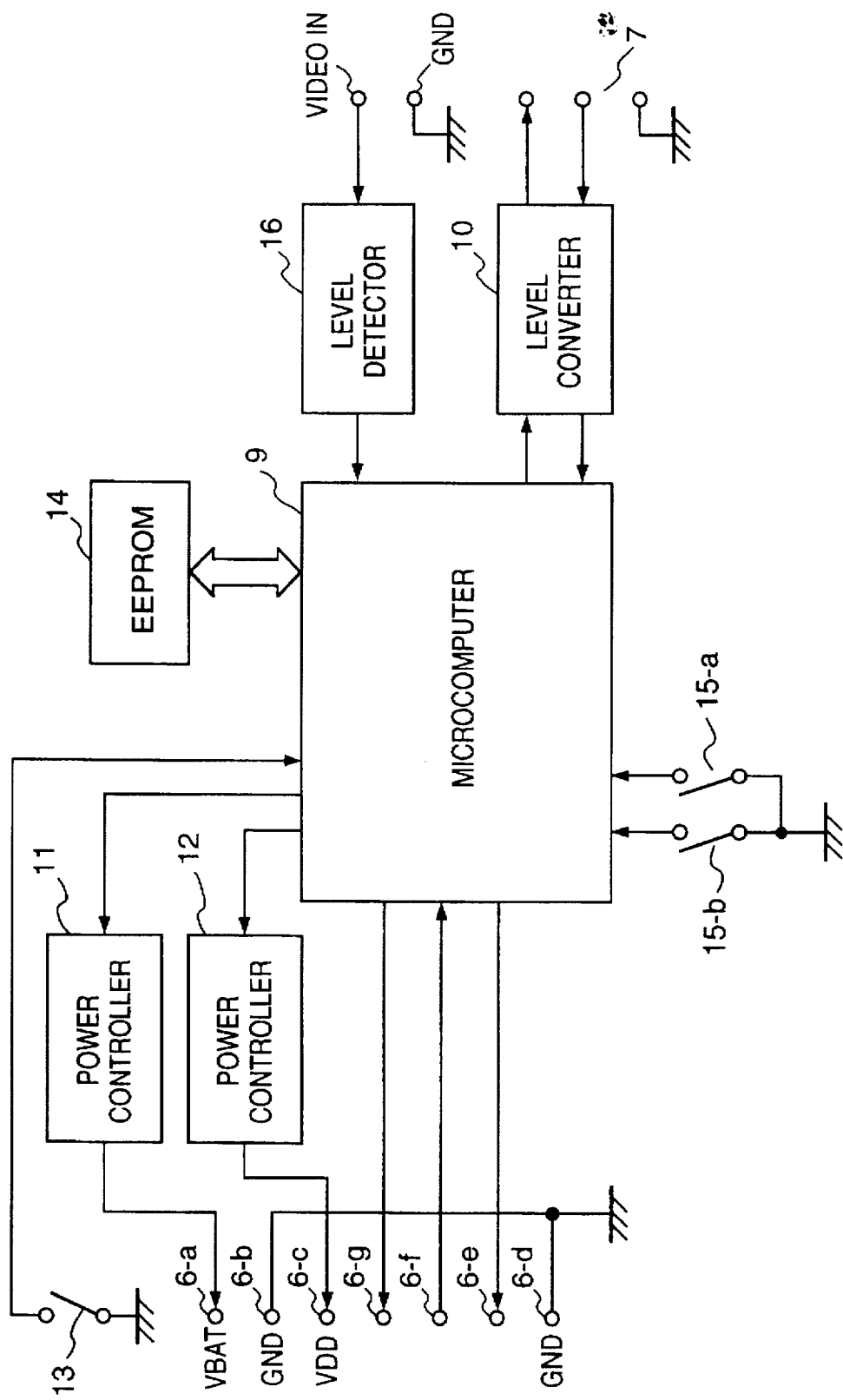
FIG. 12 is a circuit diagram showing a circuit configuration added with an automatic IRIS function as a modification of the first embodiment of the present invention.

As described above, in this embodiment the focus control and the IRIS control of the lens 2 have been explained. Although an RS232C interface is used as the interface between the computer 4 and the adapter 1, some other communication format also can be used. As illustrated in FIG. 12, it is also possible to add an auto IRIS function for controlling the IRIS by providing the converting adapter with an input terminal VIDEO IN for receiving a video signal from an external device and a level detector 16 for detecting the average level of the input video signal.

[Second Embodiment]

A converting adapter according to the second embodiment of the present invention will be described below. Note that a description of parts similar to those of the first embodiment described above will be omitted. Note also that the same reference numerals as in the figures of the first embodiment denote the same parts in the figures of the second embodiment.

Figure 13:
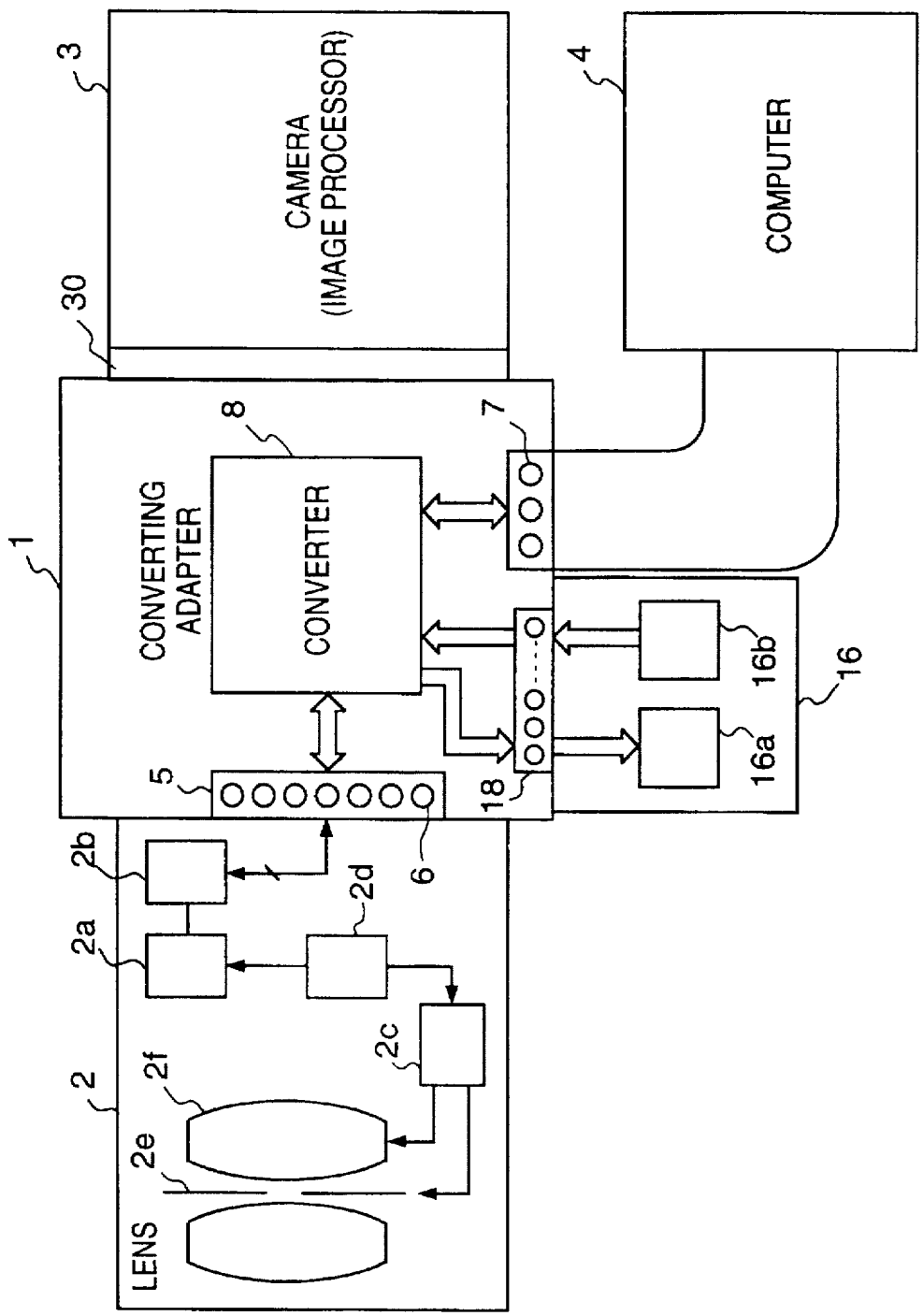
FIG. 13 is a block diagram showing the system configuration of a converting adapter according to the second embodiment of the present invention.

FIG. 13 shows a system using the converting adapter of the second embodiment of the present invention.

In FIG. 13, reference numeral 16 denotes a pan_head which supports a lens 2 and a camera 3 via the converting adapter, 1, and also determines the direction of these parts; 16a, a motor for rotating the panhead 16; and 16b, a position detector for detecting the rotating position of the panhead 16. A converter 8 converts a serial control signal from a computer 4 and thereby controls the lens 2 or the panhead 16. The rest of the arrangement is identical with that shown in FIG. 1, and the data transfer rate on the interface is the same as in FIG. 3.

With this system, an internal microcomputer 2a of the interchangeable lens 2 can be controlled by the computer 4 via an interface 2b and the converting adapter 1, and the panhead 16 also can be controlled by the computer 4.

The lens microcomputer 2a controls a lens actuator 2c via a controller 2d, thereby driving, e.g., a focusing lens 2f and a diaphragm 2e.

Figure 14:
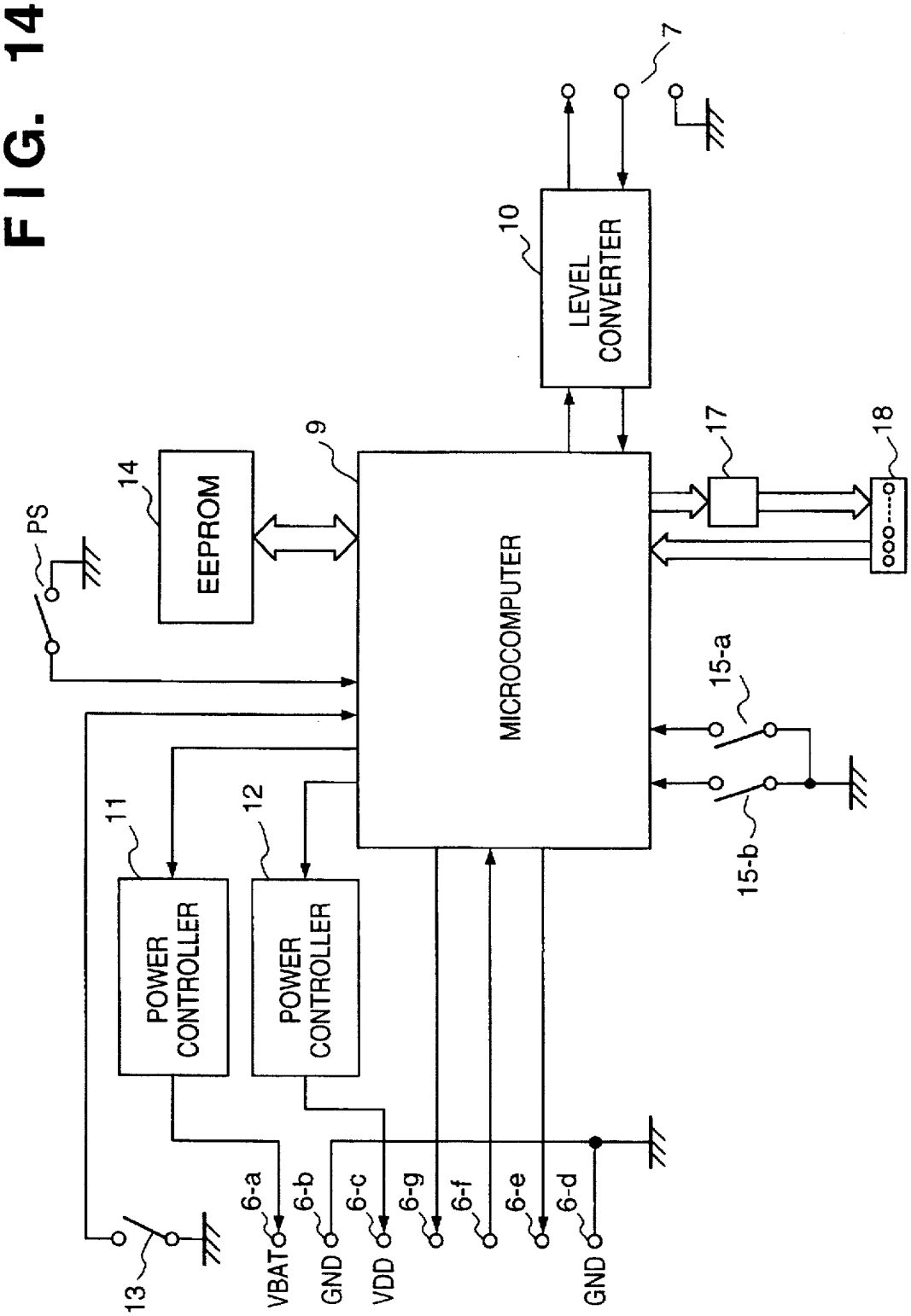
FIG. 14 is a circuit diagram showing the circuit configuration of the converting adapter according to the second embodiment of the present invention.

FIG. 14 is a circuit diagram for explaining the details of the adapter 1 in FIG. 13.

A motor driver 17 supplies a signal for driving the motor 16a of the panhead 16. Electrical contacts 18 are connected to the pan_head 16 attached to the adapter 1. The rest of the arrangement is identical with that shown in FIG. 2.

Figure 15A:
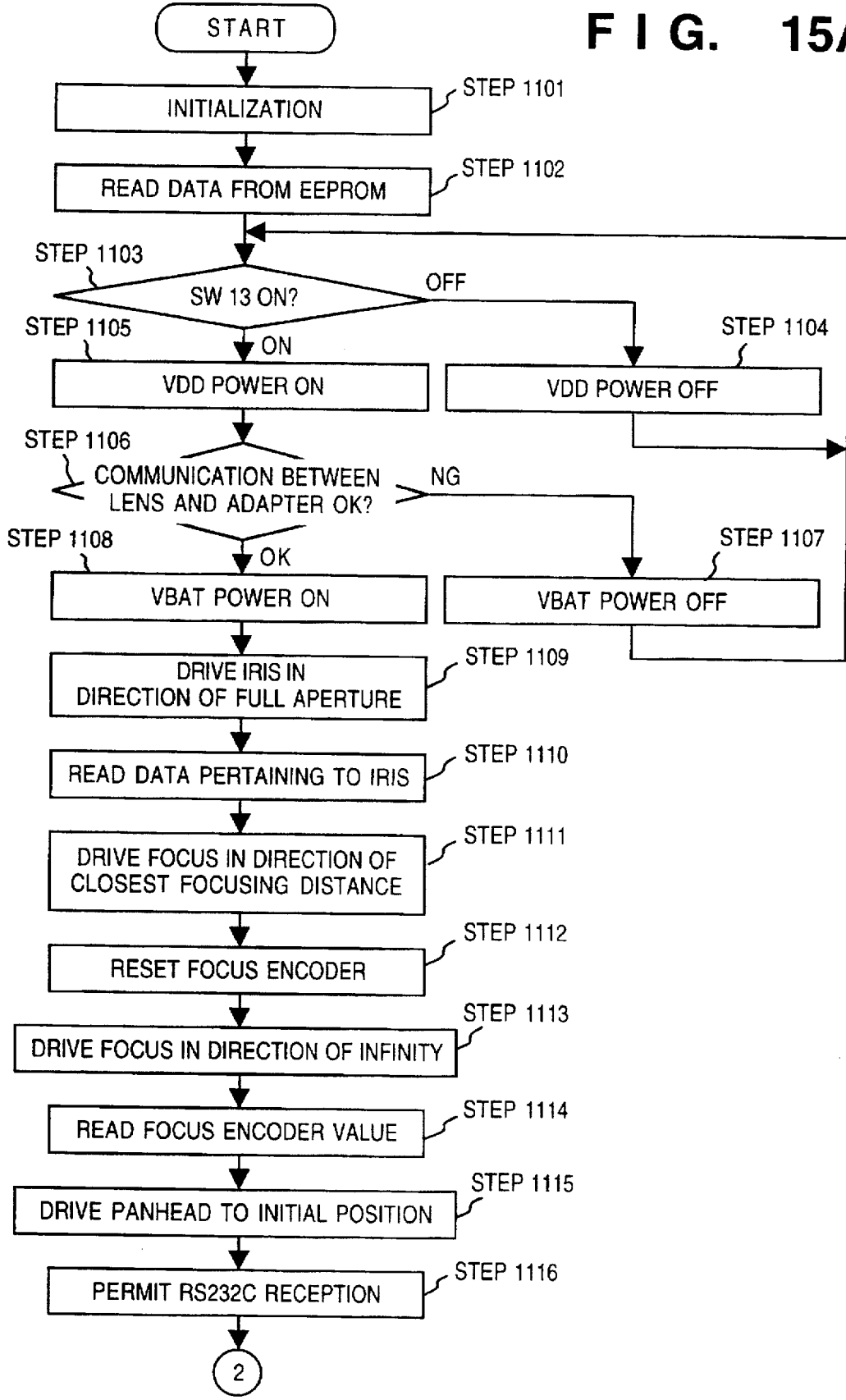
FIGS. 15A and 15B are main flow charts showing the operation of the converting adapter according to the second embodiment of the present invention.
Figure 15B:
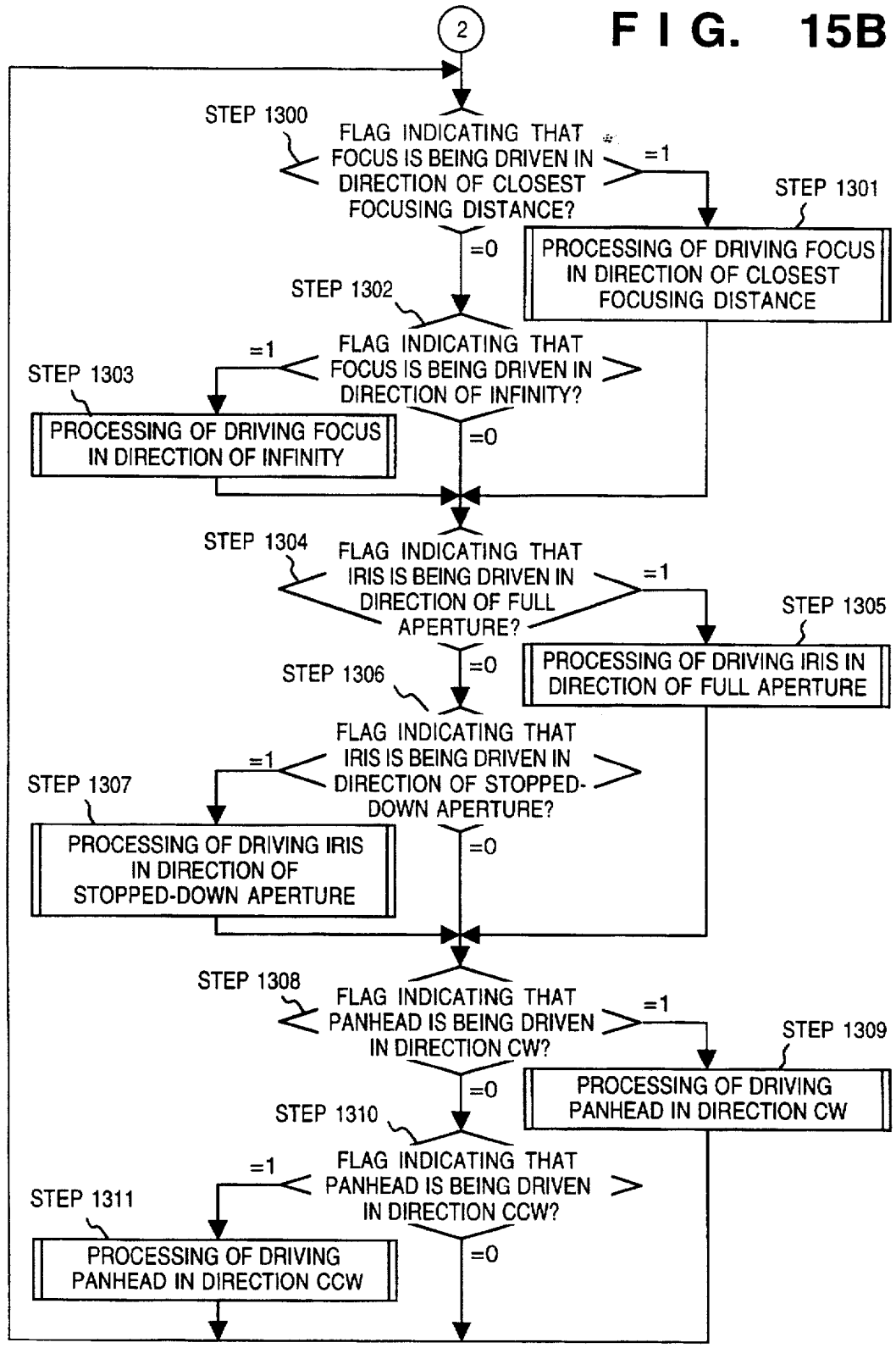

FIGS. 15A and 15B are flow charts for explaining the operation of a microcomputer 9. Individual steps of the flow charts in FIGS. 15A and 15B will be described below.

<Step 1101> When a main switch PS, FIG. 14, is turned on, the microcomputer 9 initializes the memories, the I/O ports, and the like components. At the same time, the microcomputer 9 sets the transfer rate of RS232C serial communication in accordance with the states of switches 15.

<Step 1102> The microcomputer 9 reads out the contents of a nonvolatile memory 14 and stores them in internal memories of the microcomputer 9. Note that data having the contents shown in FIG. 18 is stored in the nonvolatile memory 14. Referring to FIG. 18, F_MEMO0 to F_MEMO7 are focus position storage data which are set in a one-to-one correspondence with focus encoder values in the lens 2; U_MEMO0 to U_MEMO7 are panhead position storage data which are set in a one-to-one correspondence with output values from the position detector 16b; F_SPD0 to F_SPD3 are focus speed data which are set in a one-to-one correspondence with focus driving amounts in the lens 2; I_SPD0 to I_SPD3 are IRIS speed data which are set in a one-to-one correspondence with time intervals during which the diaphragm (IRIS) in the lens 2 is driven; and U_SPD0 to U_SPD3 are panhead speed data which are set in a one-to-one correspondence with the values of a voltage applied to the motor 16a.

Note that the data F_MEMO0 to F_MEMO7, U_MEMO0 to U_MEMO7, F_SPD0 to F_SPD3, I_SPD0 to I_SPD3, and U_SPD0 to U_SPD3 are stored in memories MF_MEMO0 to MF_MEMO7, MU_MEMO0 to MU_MEMO7, MF_SPD0 to MF_SPD3, MI_SPD0 to MI_SPD3, and MU_SPD0 to MU_SPD3 (neither of the memories is shown), respectively, of the microcomputer <Step 1103> The microcomputer 9 checks the state of a switch 13. If the switch 13 is ON, this means that the lens 2 is mounted, so the flow advances to step 1105. If the switch 13 is OFF, the flow advances to step 1104.

<Step 1104> Since the microprocessor 9 determines in step 1103 that the lens 2 is not mounted on the adapter 1, the microprocessor 9 so controls a power controller 12 that a power VDD is not supplied to a power terminal 6-c, and the flow returns to step 1103.

<Step 1105> Since the microcomputer 9 determines in step 1103 that the lens. 2 is mounted on the adapter 1, the microcomputer 9 so controls the power controller 12 that the power VDD is supplied to the power terminal 6-c, and the flow advances to step 1106. That is, in steps 1103 to 1105, the power VDD is not supplied while the lens 2 is mounted and is supplied when the lens 2 is mounted.

<Step 1106> Since the circuit power VDD is supplied to the lens 2 in step 1105, the microcomputer 9 performs bidirectional serial communication with the microcomputer 2a in the lens 2 via electrical contacts 6-e, 6-f, and 6-g. If this serial communication does not terminate normally, the flow advances to step 1107. If the serial communication terminates normally, the flow advances to step 1108.

<Step 1107> Since the communication with the microcomputer 2a in the lens 2 terminates abnormally, the microcomputer 9 controls a power controller 11 so that a power VBAT is not supplied to a power terminal 6-a, and the flow returns to step 1103.

<Step 1108> Since the communication with the microcomputer 2a in the lens 2 terminates normally, the microcomputer 9 controls the power controller 11 so that the power VBAT is supplied to the power terminal 6-a, and the flow advances to step 1109. In steps 1106 to 1108, the power VBAT is supplied only when the communication with the microcomputer 2a in the lens 2 terminates normally.

<Step 1109> The microcomputer 9 controls the mounted lens 2 via the electrical contacts 6 so that the IRIS of the lens 2 is driven in the direction of a full aperture.

<Step 1110> The microcomputer 9 reads information pertaining to the IRIS of the mounted lens 2, such as the full-aperture f-number and the minimum-aperture f-number, via the electrical contacts 6, and stores the information in memories AV_O and AV_MAX (not shown), respectively.

<Step 1111> The microcomputer 9 controls the mounted lens 2 via the electrical contacts 6 so that the focus of the lens 2 is driven in the direction of a closest focusing distance.

<Step 1112> The microcomputer 9 controls the mounted lens 2 via the electrical contacts 6 so that the focus encoder value is reset to 0.

<Step 1113> The microcomputer 9 controls the mounted lens 2 via the electrical contacts 6 so that the focus of the lens 2 is driven in the direction of infinity.

<Step 1114> The microcomputer 9 reads the focus encoder value of the mounted lens 2 via the electrical contacts 6 and stores the value in a memory ENC_MAX (not shown).

<Step 1115> The microcomputer 9 controls the motor driver 17 while monitoring the output from the position detector 16b so that the panhead is driven to the initial position.

In steps 1109 to 1115 described above, the microcomputer 9 drives the IRIS, the focus, and the panhead of the mounted lens 2 to their respective initial positions. Also, the microcomputer 9 reads, from the lens 2, the full-aperture f-number and the minimum-aperture f-number, as inherent data of the lens, and the focus encoder value at the infinity mark assuming the value at the closest focusing distance is 0, and stores these data in the memories, thereby reading the characteristics of the lens.

Accordingly, the microcomputer 9 can perform control with a high accuracy while taking account of deterioration of the mounted lens with time or variations between interchangeable lenses.

<Step 1116> The microcomputer 9 permits a communication via the RS232C interface. If a communication is received, the microcomputer 9 permits an interrupt to occur, and the flow advances to step 1300.

In this embodiment, the contents of the interrupt processing when the RS232C communication is received, the processing when a command for driving the focus in the direction of the closest focusing distance is received, the processing when a command for driving the focus in the direction of infinity is received, the processing when a command for stopping the focus is received, and the processing when a command for setting the focus speed is received, are identical with the contents in the first embodiment and those shown in FIGS. 5A to 5E.

Also, the contents of the processing when a command for storing the focus position is received and the processing when a command for driving the focus to the stored position is received, are identical with the contents in the first embodiment and those shown in FIGS. 6A and 6B.

Furthermore, the contents of the processing when a command for driving the IRIS in the direction of the full aperture is received, the processing when a command for driving the IRIS in the direction of the stopped-down aperture is received, and the processing when a command for stopping the IRIS driving is received, are identical with the contents in the first embodiment and those shown in FIGS. 7A to 7D.

Figure 16A:
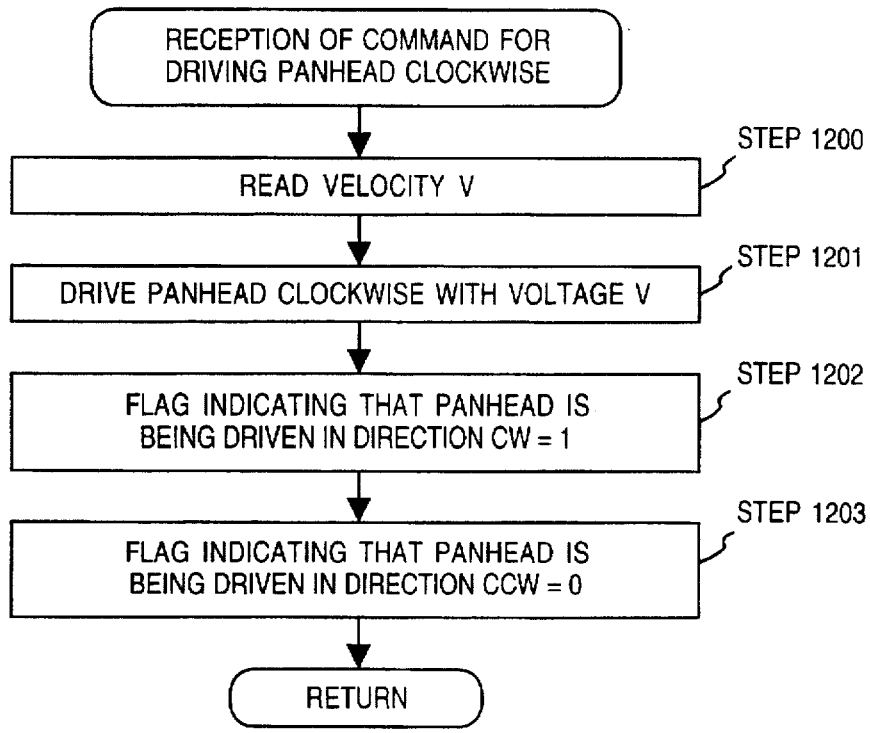
FIGS. 16A to 16F are flow charts showing the operation of the converting adapter according to the second embodiment of the present invention.

Steps 1200 to 1203 in FIG. 16A explain the processing when a command for rotating the panhead clockwise is received.

<Step 1200> The microcomputer 9 copies data of a currently set panhead speed number from the memories MU_SPD0 to MU_SPD3 (not shown) into a memory V (not shown).

<Step 1201> The microcomputer 9 so controls the motor driver 17 that the panhead is rotated clockwise (in a direction CW) with a voltage V.

<Step 1202> The microcomputer 9 sets a flag indicating that the panhead is being driven in the direction <Step 1203> The microcomputer 9 clears a flag indicating that the panhead is being rotated counterclockwise (in a direction CCW), and completes the communication interrupt routine.

Figure 16B:
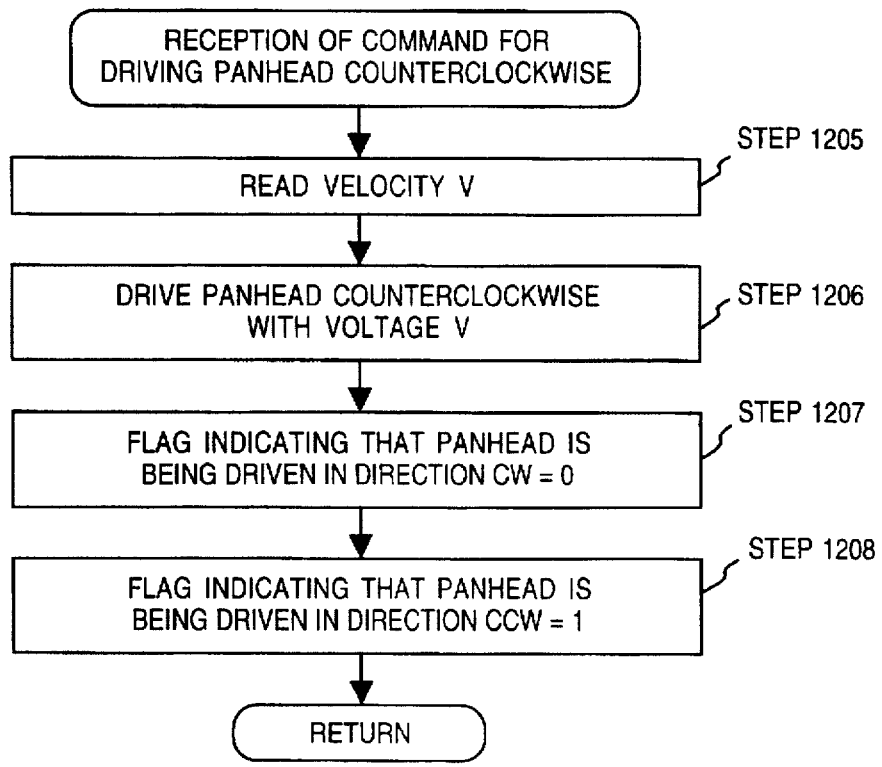

Steps 1205 to 1208 in FIG. 16B explain the processing when a command for rotating the panhead counterclockwise is received.

<Step 1205> The microcomputer 9 copies data of a currently set panhead speed number from the memories MU_SPD0 to MU_SPD3 (not shown) into the memory V (not shown).

<Step 1206> The microcomputer 9 so controls the motor driver 17 that the panhead is rotated counterclockwise (in the direction CCW) with the voltage V.

<Step 1207> The microcomputer 9 clears the flag indicating that the panhead is being driven in the direction CW.

<Step 1208> The microcomputer 9 sets the flag indicating that the panhead is being driven in the direction CCW, and completes the communication interrupt routine.

Figure 16C:
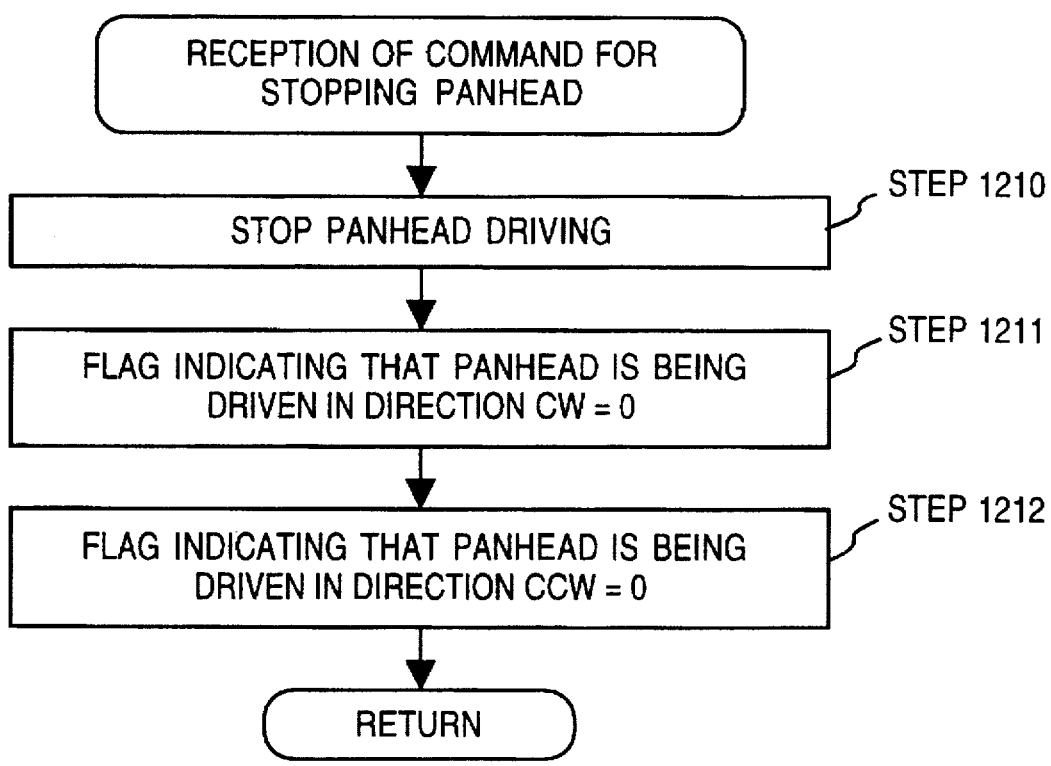

Steps 1210 to 1212 in FIG. 16C explain the processing when a command for stopping the rotation of the panhead is received.

<Step 1210> The microcomputer 9 so controls the motor driver 17 that the rotation of the panhead is stopped.

<Step 1211> The microcomputer 9 clears the flag indicating that the panhead is being driven in the direction CW.

<Step 1212> The microcomputer 9 clears the flag indicating that the panhead is being driven in the direction CCW.

Figure 16D:
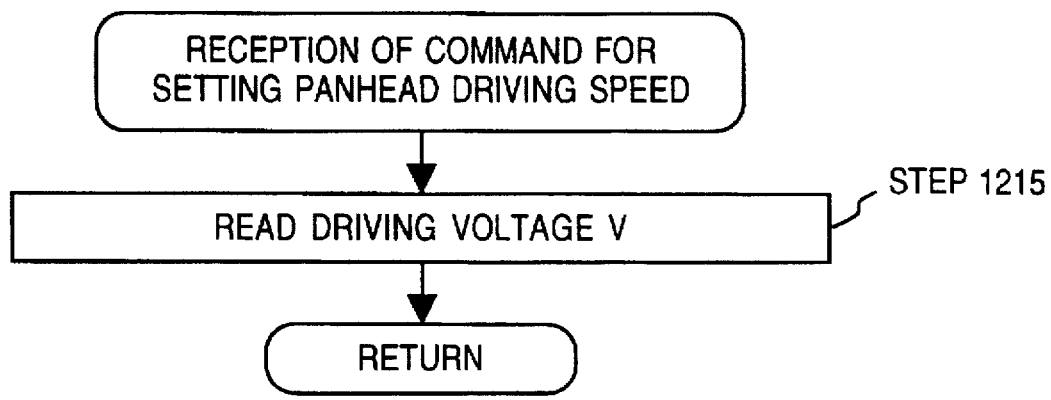

Step 1215 in FIG. 16D explains the processing when a command for setting the driving speed of the panhead is received.

<Step 1215> In accordance with the received panhead driving speed number, the microcomputer 9 copies the speed data from the memories MU_SPD0 to MU_SPD3 into the memory V and completes the communication interrupt routine.

Figure 16E:
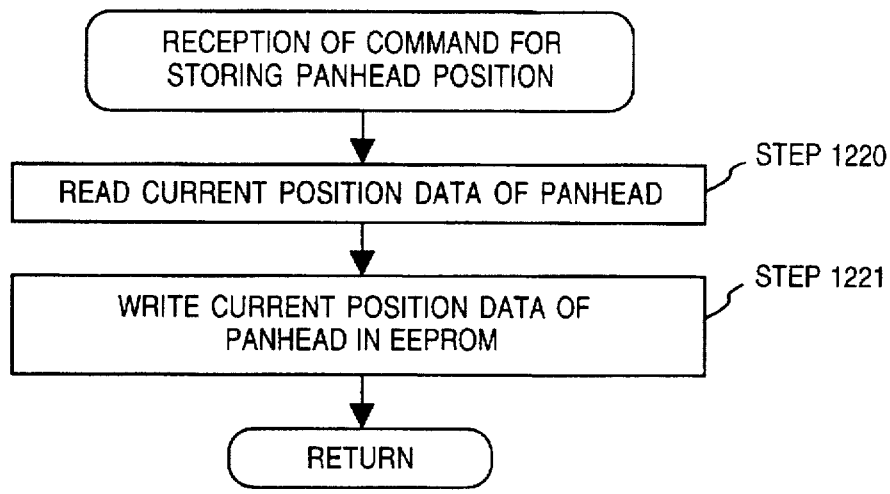

Steps 1220 and 1221 in FIG. 16E explain the processing when a commend for storing the panhead position is received.

<Step 1220> The microcomputer 9 reads current position data from the position detector 16b end stores the data in the memories MU_MEMO0 to MU_MEMO7 in accordance with the received storage number.

<Step 1221> The microcomputer 9 reads current position data from the position detector 16b, stores the data in the nonvolatile memories U_MEMO0 to U_MEMO7 in accordance with the received storage number, and completes the communication interrupt routine.

Figure 16F:
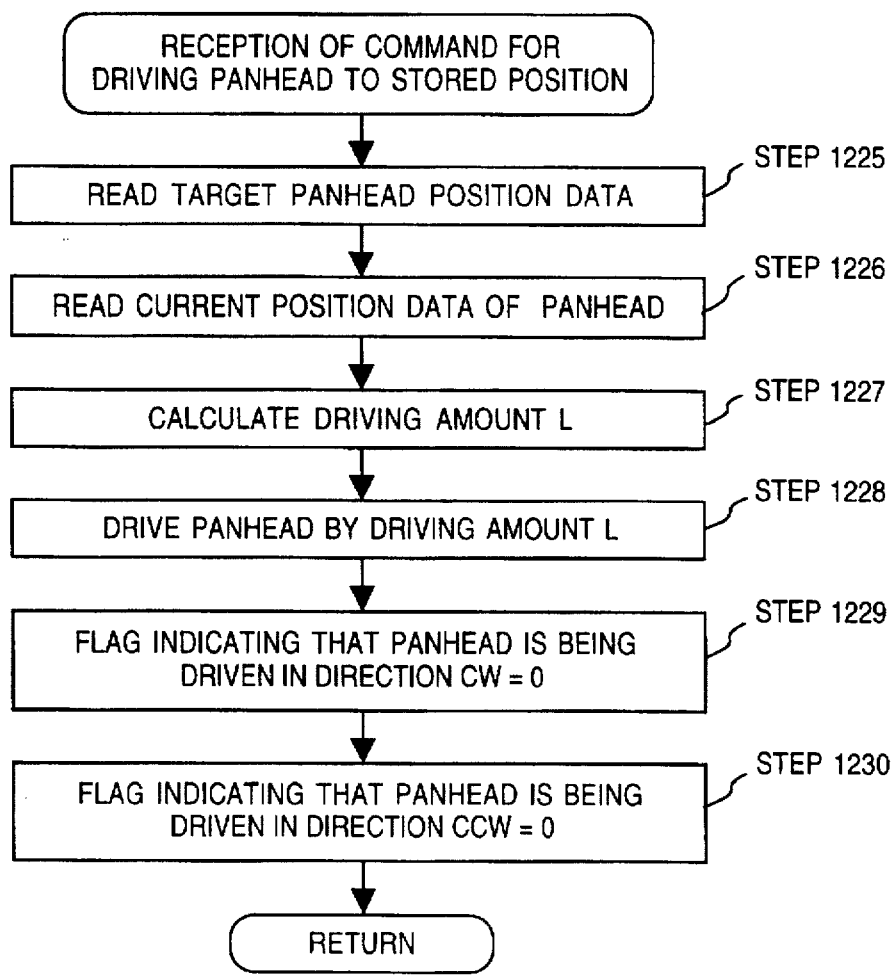

Steps 1225 to 1230 in FIG. 16F explain the processing when a command for driving the panhead to the stored position is received.

<Step 1225> In accordance with the received storage number, the microcomputer 9 stores the data from the memories MU_MEMO0 to MU_MEMO7 into a memory ENC_U (not shown). That is, the data stored in ENC_U2 indicates the target position to which the panhead is to be driven.

<Step 1226> The microcomputer 9 reads current panhead position data and stores the data in a memory ENC_U0 (not shown).

<Step 1227> The microcomputer 9 calculates a driving amount in accordance with the memories ENC_U0 and ENC_U2 and stores the calculated value in a memory L. Note that this calculation is represented by L=ENC_U2−ENC_U0.

<Step 1228> The microcomputer 9 so controls the motor driver 17 as to rotate the panhead by the driving amount L.

<Step 1229> The microcomputer 9 clears the flag indicating that the panhead is being driven in the direction CW.

<Step 1230> The microcomputer 9 clears the flag indicating that the panhead is being driven in the direction CCW, and completes the communication interrupt routine.

Referring back to FIGS. 15A and 15B, after step 1116 the microcomputer 9 must receive various commands and cause the lens 2 to perform the respective corresponding operations of the received commands, since the microcomputer 9 permits the RS232C communication in step 1116. In steps 1300 to 1307, the microcomputer 9 checks whether focus driving or IRIS driving needs to be performed, and executes each corresponding processing.

<Step 1300> If a flag indicating that the focus is being driven in the direction of the closest focusing distance is set, in step 1301 the microcomputer 9 performs processing of driving the focus in the direction of the closest focusing distance.

<Step 1302> If a flag indicating that the focus is being driven in the direction of infinity is set, in step 1303 the microcomputer 9 performs processing of driving the focus in the direction of infinity.

<Step 1304> If a flag indicating that the IRIS is being driven in the direction of the full aperture is set, in step 1305 the microcomputer 9 performs processing of driving the IRIS in the direction of the full aperture.

<Step 1306> If the flag indicating that the IRIS is being driven in the direction of a stopped-down aperture is set, in step 1307 the microcomputer 9 performs processing of driving in the direction of the stopped-down aperture.

<Step 1308> If the flag indicating that the panhead is being driven in the direction CW is set, in step 1309 the microcomputer 9 performs processing of rotating the panhead clockwise.

<Step 1310> If the flag indicating that the panhead is being driven in the direction CCW is set, in step 1311 the microcomputer 9 performs processing of rotating the panhead counterclockwise.

In this embodiment, the processing of driving the focus in the direction of the closest focusing distance and the processing of driving the focus in the direction of infinity are the same as in the first embodiment and in FIGS. 8A and 8B.

Also, the processing of driving the IRIS in the direction of the full aperture, the processing of driving the IRIS in the direction of the stopped-down aperture, and the timer interrupt processing are the same as in the first embodiment and in FIGS. 9A to 9C.

Figure 17A:
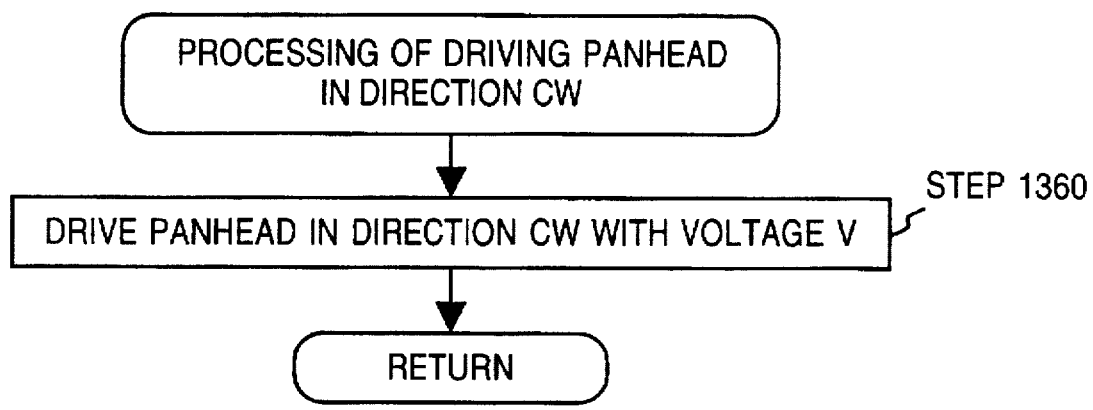
FIGS. 17A and 17B are flow charts showing the operation of the converting adapter according to the second embodiment of the present invention.

Step 1360 in FIG. 17A represents the subroutine of driving the panhead clockwise in step 1309, FIG. 15B.

<Step 1360>. The microcomputer 9 so controls the motor driver 17 that the panhead is rotated clockwise with the voltage V, and completes the subroutine.

Figure 17B:
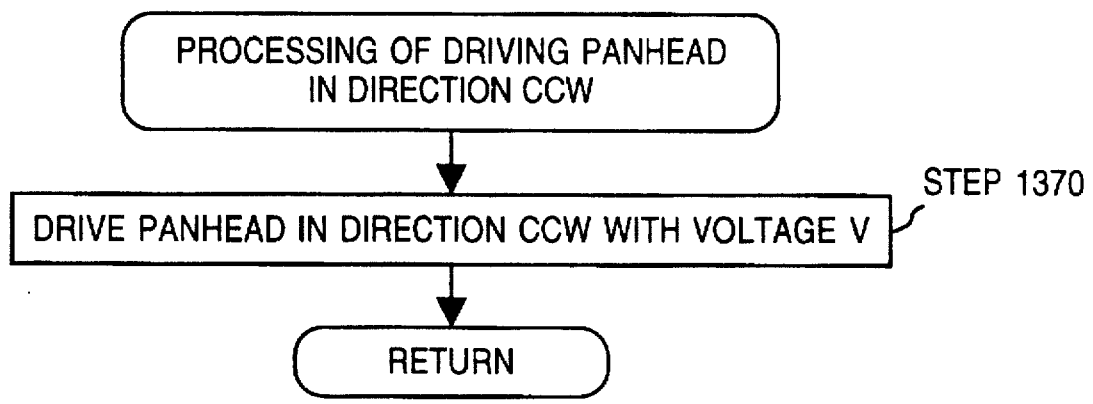

Step 1370 in FIG. 17B represents the subroutine of rotating the panhead counterclockwise in step 1311, FIG. 15B.

<Step 1370> The microcomputer 9 so controls the motor driver 17 that the panhead is rotated counterclockwise with the voltage V, and completes the subroutine.

As has been described above, in this embodiment the computer 4 can control the lens 2 via the electrical contacts 7 and 6 and also can control the panhead as an external peripheral device other than the adapter 1 via the electrical contacts 7 and 18.

Figure 20:
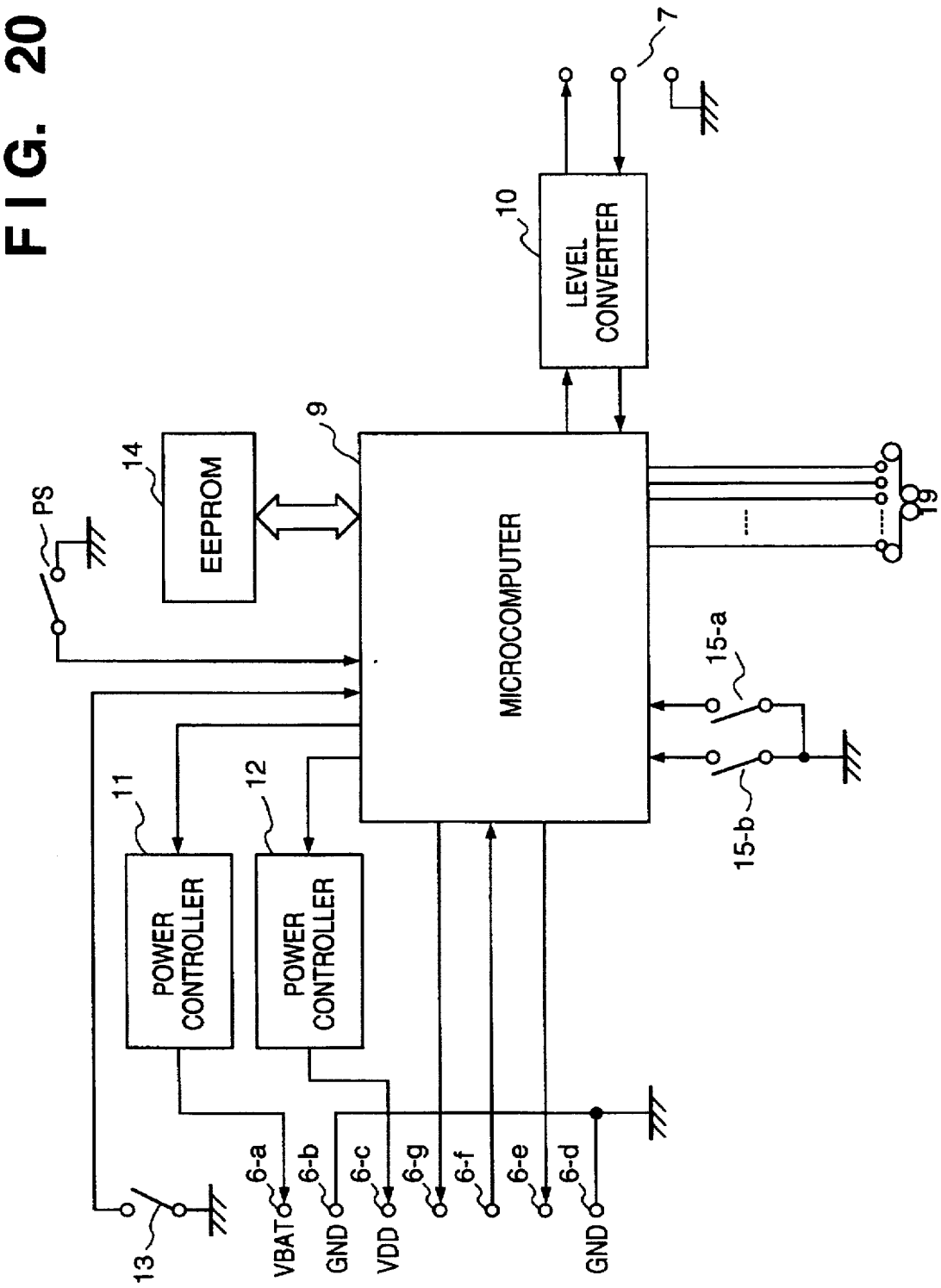
FIG. 20 is a circuit diagram showing the circuit configuration of the converting adapter as a modification of the second embodiment of the present invention.

FIG. 19 is a block diagram showing a system configuration using a converting adapter as a modification of the this embodiment. FIG. 20 is a circuit diagram for explaining the details of the configuration in FIG. 19. Note that the same reference numerals as in the first and second embodiments denote the same parts in FIGS. 19 and 20, and a detailed description thereof will be omitted.

In FIG. 19, reference numeral 19 denotes electrical terminals of an adapter 1; 20, an external peripheral device; and 20-a, a data input/output unit provided in the external peripheral device 20. The data input/output unit 20-a is connected to a microcomputer 9 via the electrical contacts 19.

The difference of FIG. 20 from FIG. 14 is that the electrical terminals 19 are provided instead of the electrical contacts 17 and 18.

FIGS. 4A-4B and FIGS. 21A-21B are flow charts for explaining the operation of the microcomputer 9, FIG. 20. The flow of the operations in FIGS. 4A and 4B are the same as that in the first embodiment, and so a detailed description thereof will be omitted.

Figure 21A:
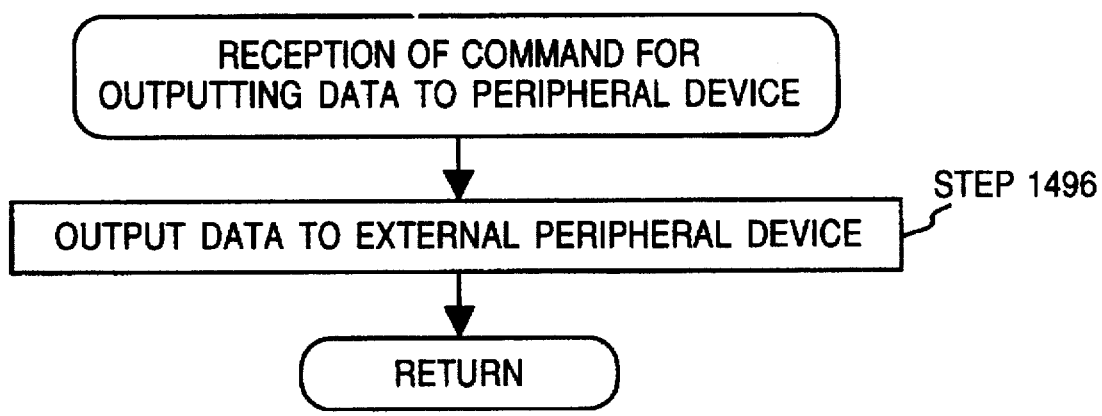
FIGS. 21A and 21B are flow charts showing the operation of the converting adapter in the modification of the second embodiment of the present invention.

Step 1496 in FIG. 21A explains the processing when a command for outputting data to an external peripheral circuit is received.

<Step 1496> The microcomputer 9 outputs the received data to the external circuit 20 via the electrical contacts 19 and completes the interrupt routine.

Figure 21B:
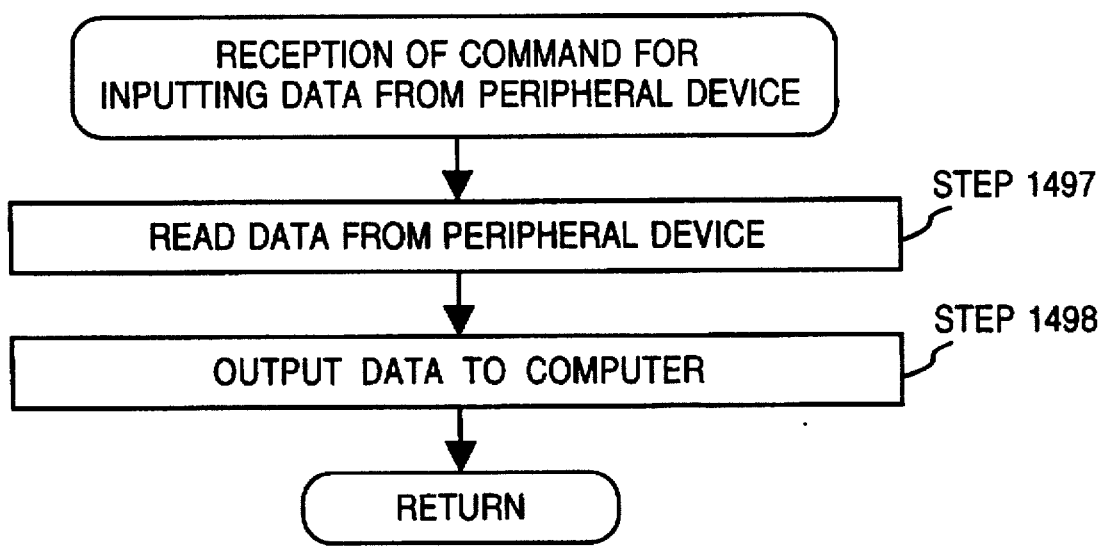

Steps 1497 and 1498 in FIG. 21B explain the processing when a command for inputting data from the external peripheral circuit is received.

<Step 1497> The microcomputer 9 reads data from the external peripheral circuit 20 via the electrical contacts 19.

<Step 1498> The microcomputer 9 outputs the data input from the external peripheral circuit 20 in step 1497 to the computer 4 and completes the interrupt routine.

In the second embodiment as has been described above, it is possible to control the lens 2 and the panhead 16 in accordance with RS232C communication commands, output data to the external peripheral device 20, and input data from the external peripheral device 20. This external peripheral device can be another converting adapter.

With the above arrangement, when a plurality of converting adapters explained in this embodiment are connected, a single computer can make a plurality of lenses perform the same operation or operate in association with each other.

[Third Embodiment]

A converting adapter according to the third embodiment of the present invention will be described below. Note that a description of parts similar to those of the first and second embodiments described above will be omitted. Note also that the same reference numerals as in the figures of the first and second embodiments denote the same parts in the figures of the third embodiment.

Figure 22:
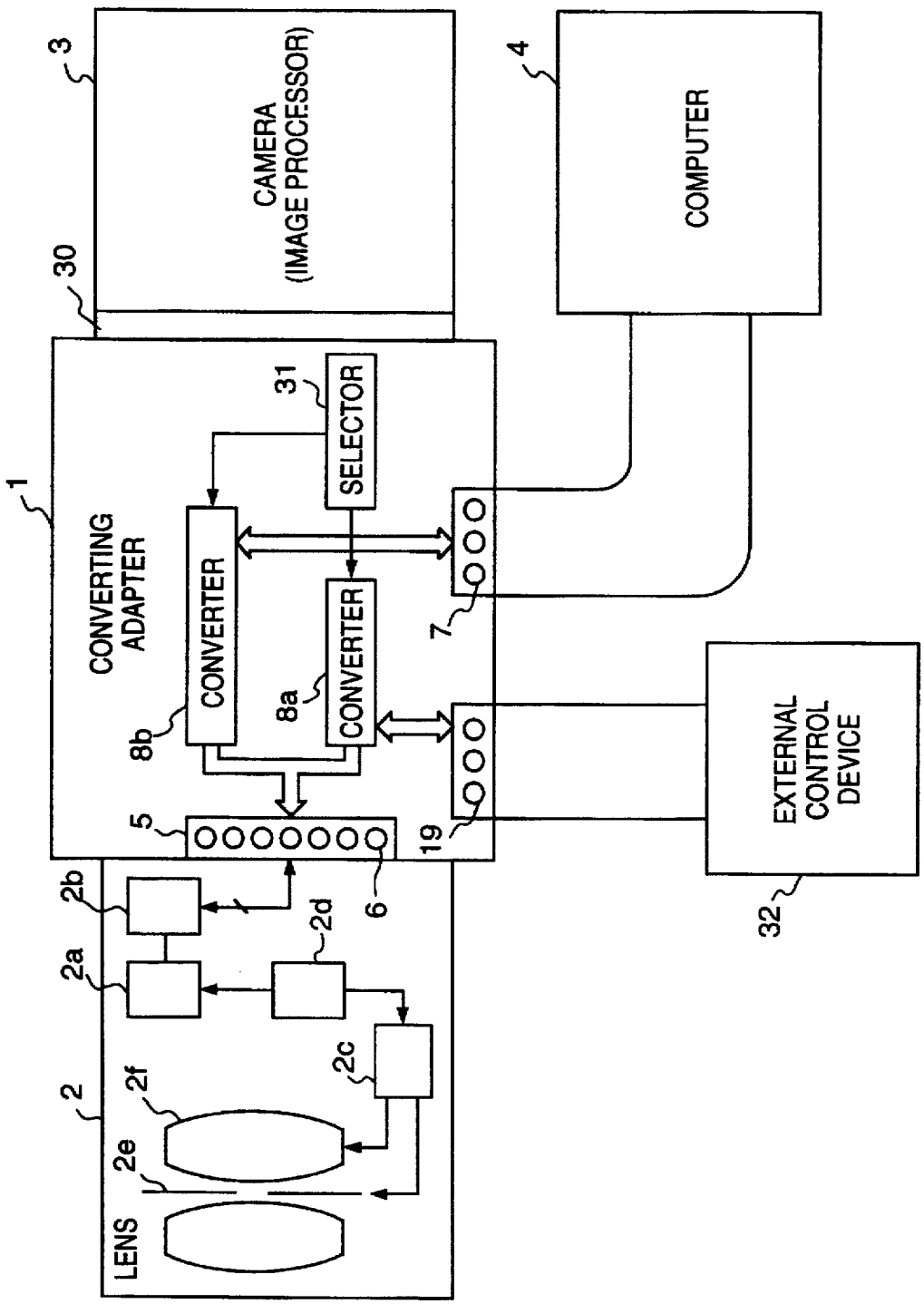
FIG. 22 is a block diagram showing the system configuration of a converting adapter according to the third embodiment of the present invention.

FIG. 22 shows a system using the converting adapter according to the third embodiment of the present invention.

In FIG. 22, reference numeral 19 denotes a third electrical terminal for inputting a control signal from an external control device 32. A converter 8b as a first converting means converts a serial control signal from a computer 4 into a control signal recognizable by a lens 2 and also converts a signal from the lens 2 into a serial signal recognizable by the computer 4. A converter 8a as a second converting means converts a control signal from the external control device 32 into a control signal receivable by the lens 2. A selector 31 selects one of the converters 8a and 8b. In this system with the above arrangement, an internal microcomputer 2a of the interchangeable lens 2 for a single-lens reflex camera can be controlled by the computer 4 or the external control device 32 via an interface 2b and a converting adapter 1. The lens microcomputer 2a controls a lens actuator 2c via a controller 2d, thereby driving, e.g., a focusing lens 2f and a diaphragm 2e. The rest of the arrangement is the same as in FIG. 1.

The circuit configuration of the adapter 1 of this embodiment is identical with that shown in FIG. 20, and the data transfer rate of the interface is the same as in FIG. 3.

Note that in this embodiment, signals are converted by using software, instead of using the converters 8a and 8b in FIG. 1, in a microcomputer 9.

Figure 23:
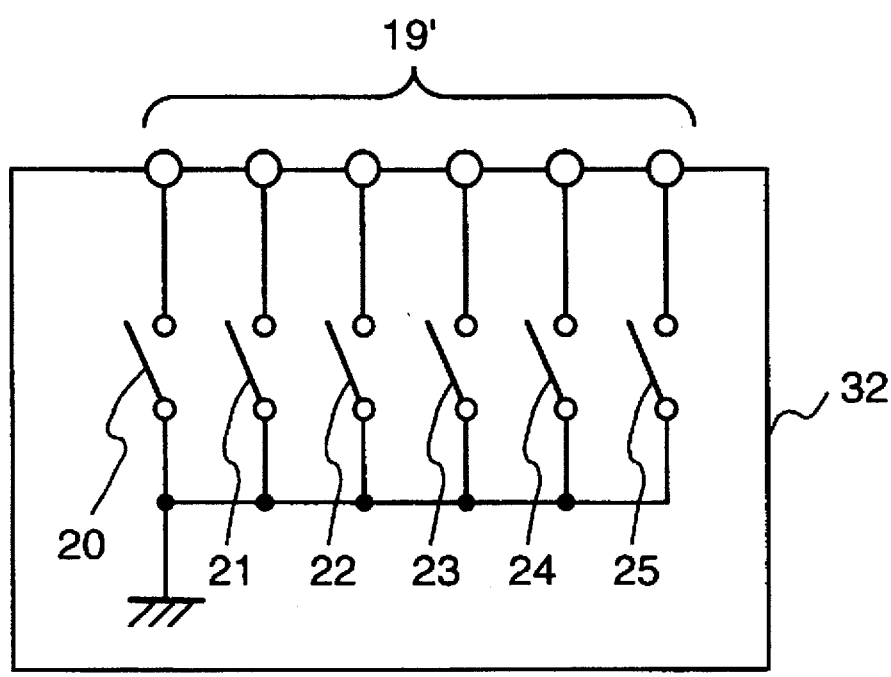
FIG. 23 is a circuit diagram showing the configuration of an external control device in the third embodiment of the present invention.

FIG. 23 is a view for explaining a practical example of the external control device 32 according to this embodiment. In this embodiment the external control device 32 is, for example, a manual remote control unit.

Of switches 20 to 25, the switch 20 is used to drive the focus in the direction of infinity. While the switch 20 is ON the focus is driven in the direction of infinity. The switch 21 is used to drive the focus in the direction of a closest focusing distance. While the switch 21 is ON the focus is driven in the direction of the closest focusing distance.

The switch 22 is used to drive the diaphragm in the direction of a full aperture; while the switch 22 is ON the diaphragm is driven in the direction of the full aperture.

The switch 23 is used to drive the diaphragm in the direction of a stopped-down aperture; while the switch 23 is ON the diaphragm is driven in the direction of the stopped-down aperture.

The switch 24 is used to switch the focus speeds; the focus speed is high when the switch 24 is ON and is low when the switch 24 is OFF.

The switch 25 is used to switch the IRIS speeds; the IRIS speed is high when the switch 25 is ON and is low when the switch 25 is OFF.

Figure 24B:
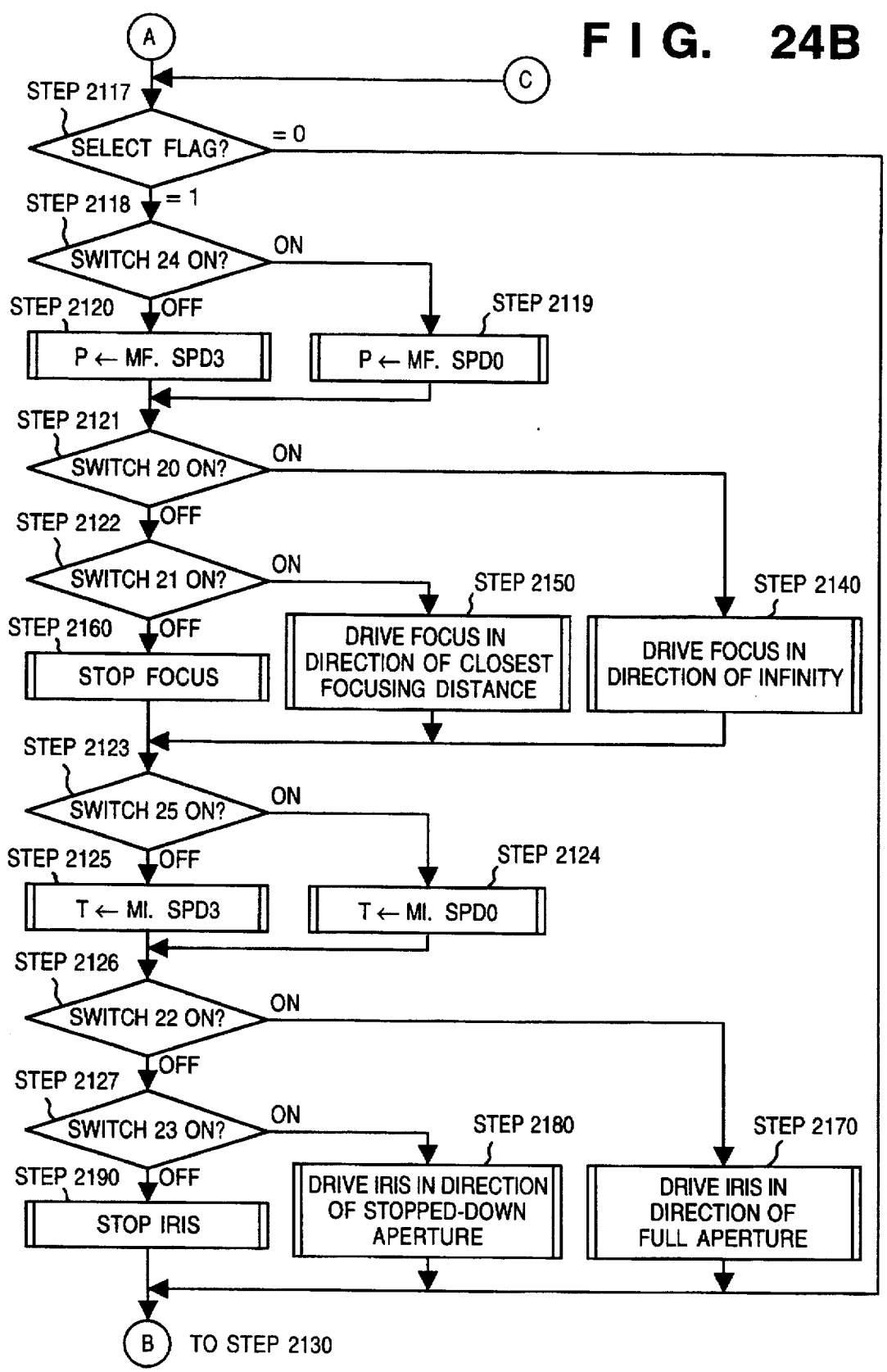

FIGS. 24A and 24B are flow charts for explaining the operation of a microcomputer 9. Individual steps of the flow charts in FIGS. 24A and 24B will be described below.

<Step 2101> When a main switch PS, FIG. 20, is turned on, the microcomputer 9 initializes the memories, the I/O ports, and the like components. At the same time, the microcomputer 9 sets the transfer rate of RS232C serial communication in accordance with the states of the switches 20 to 25.

<Step 2102> The microcomputer 9 reads out the contents of a nonvolatile memory 14 and stores them in internal memories (RAMs) of the microcomputer 9. Note that data having the contents shown in FIG. 10 is stored in the nonvolatile memory 14. Referring to FIG. 10, F_MEM00 to F_MEM07 are focus position storage data which are set in a one-to-one correspondence with focus encoder values in the lens 2; F_SPD0 to F_SPD3 are focus speed data which are set in a one-to-one correspondence with focus driving amounts in the lens 2; and I_SPD0 to I_SPD3 are IRIS speed data which are set in a one-to-one correspondence with time intervals during which the diaphragm (IRIS) in the lens 2 is driven. Note that the data F_MEM00 to F_MEM07, F_SPD0 to F_SPD3, and I_SPD0 to I_SPD3 are stored in memories MF_MEM00 to MF_MEM07, MF_SPD0 to MF_SPD3, and MI_SPD0 to MI_SPD3 (neither of the memories is shown), respectively, of the microcomputer 9.

<Step 2103> The microcomputer 9 checks the state of a lens mount switch 17. If the switch 17 is ON, this means that the lens 2 is mounted, so the flow advances to step 2105. If the switch 17 is OFF, the flow advances to step 2104.

<Step 2104> Since the microprocessor 9 determines in step 2103 that the lens 2 is not mounted on the adapter 1, the microprocessor 9 so controls a power controller 12 that a power VDD is not supplied to a power terminal 6-c, and the flow returns to step 2103.

<Step 2105> Since the microcomputer 9 determines in step 2103 that the lens 2 is mounted on the adapter 1, the microcomputer 9 so controls the power controller 12 that the power VDD is supplied to the power terminal 6-c, and the flow advances to step 2106. That is, in steps 2103 to 2105, the power VDD is not supplied while the lens 2 is mounted and is supplied when the lens 2 is mounted.

<Step 2106> Since the circuit power VDD is supplied to the lens 2 in step 2105, the microcomputer 9 performs bidirectional serial communication with the microcomputer 2a in the lens 2 via electrical contacts 6-e, 6-f, and 6-g. If this serial communication is not normally executed, the flow advances to step 2107. If the serial communication terminates normally, the flow advances to step 2108.

<Step 2107> Since the communication with the microcomputer 2a in the lens 2 terminates abnormally, the microcomputer 9 controls a power controller 11 so that a power VBAT is not supplied to a power terminal 6-a, and the flow returns to step 2103.

<Step 2108> Since the communication with the microcomputer 2a in the lens 2 terminates normally, the microcomputer 9 controls the power controller 11 so that the power VBAT is supplied to the power terminal 6-a, and the flow advances to step 2109. In steps 2106 to 2108, the power VBAT is supplied only when the communication with the microcomputer 2a in the lens 2 terminates normally.

<Step 2109> The microcomputer 9 controls the mounted lens 2 via the electrical contacts 6 so that the IRIS of the lens 2 is driven in the direction of the full aperture.

<Step 2110> The microcomputer 9 reads information indicating the full-aperture f-number and the minimum-aperture f-number of the mounted lens 2 via the electrical terminals 6, and stores the information in memories AV_O and AV_MAX (not shown), respectively.

<Step 2111> The microcomputer 9 controls the mounted lens 2 via the electrical terminals 6 so that the focus of the lens 2 is driven in the direction of the closest focusing distance.

<Step 2112> The microcomputer 9 controls the mounted lens 2 via the electrical terminals 6 so that the value of a focus encoder (not shown) is reset to 0.

<Step 2113> The microcomputer 9 controls the mounted lens 2 via the electrical terminals 6 so that the focus of the lens 2 is driven in the direction of infinity.

<Step 2114> The microcomputer 9 reads the focus encoder value of the mounted lens 2 via the electrical terminals 6 and stores the value in a memory ENC_MAX (not shown).

In steps 2109 to 2114 described above, the microcomputer 9 drives the IRIS and the focus of the mounted lens 2 to their respective initial positions. Also, the microcomputer 9 reads, from the lens 2, the full-aperture f-number and the minimum-aperture f-number, as inherent data of the lens, and the focus encoder value at the infinity mark assuming the value at the closest focusing distance is 0, and stores these data in the memories, thereby reading the characteristics of the lens.

<Step 2115> The microcomputer 9 sets a SELECT flag to permit control from the external control device 32.

<Step 2116> The microcomputer 9 permits an interrupt which occurs when a communication done through the RS232C interface is received. If an interrupt occurs, the flow advances to an RS232C communication interrupt routine starting from step 2200 in FIG. 26A.

<Step 2117> If the SELECT flag is set, this means that control from the external control device 32 is effective, and so the flow advances to step 2118. If the SELECT flag is cleared, the flow advances to step 2130 in FIG. 28 to inhibit control from the external control device 32.

<Step 2118> The microcomputer 9 detects the state of the switch 24, FIG. 23, for switching the focus speeds. If the switch 24 is ON, the flow advances to step 2119. If the switch 24 is OFF, the flow advances to step 2120.

<Step 2119> In accordance with the determination result in step 2118, the microcomputer 9 performs high-speed focus driving. For this purpose, the microcomputer 9 copies the focus speed data set in the memory MF_SPD3 (not shown) into a memory P (not shown), and the flow advances to step 2121.

<Step 2120> Since the microcomputer 9 determines in step 2118 that low-speed focus driving is to be performed, the microcomputer 9 copies the focus speed data set in the memory MF_SPD0 (not shown) into the memory P (not shown), and the flow advances to step 2121. Note that the contents in the memories MF_SPD0 and MF_SPD3 satisfy MF_SPD0<MF_SPD3.

<Step 2121> The microcomputer 9 detects the state of the switch 20. If the switch 20 is ON, the microcomputer 9 drives the focus in the direction of infinity. For this purpose, in step 2140 the microcomputer 9 executes a subroutine of driving the focus in the direction of infinity, and the flow advances to step 2123.

<Step 2122> The microcomputer 9 detects the state of the switch 21. If the switch 21 is ON, the microcomputer 9 drives the focus in the direction of the closest focusing distance. For this purpose, in step 2150 the microcomputer 9 executes a subroutine of driving the focus in the direction of the closest focusing distance, and the flow advances to step 2123. If the switch 21 is OFF, in step 2160 the microcomputer 9 executes a subroutine of stopping the focus, and the flow advances to step 2123.

<Step 2123> The microcomputer 9 detects the state of the switch 25 for switching the IRIS speeds. If the switch 25 is ON, the flow advances to step 2124. If the switch 25 is OFF, the flow advances to step 2125.

<Step 2124> The microcomputer 9 determines in step 2123 that high-speed IRIS driving is to be performed. For this purpose, the microcomputer 9 copies the IRIS speed data set in the memory MI_SPD3 (not shown) into a memory T (not shown), and the flow advances to step 2126.

<Step 2125> The microcomputer 9 determines in step 2123 that low-speed IRIS driving is to be performed. For this purpose, the microcomputer 9 copies the IRIS speed data set in the memory MI_SPD0 (not shown) into the memory T (not shown), and the flow advances to step 2126.

<Step 2126> The microcomputer 9 detects the state of the switch 22. If the switch 22 is ON, the microcomputer 9 drives the IRIS in the direction of the full aperture. For this purpose, in step 2170 the microcomputer 9 executes a subroutine of driving the IRIS in the direction of the full aperture, and the flow advances to step 2130.

<Step 2127> The microcomputer 9 detects the state of the switch 23. If the switch 23 is ON, the microcomputer 9 drives the IRIS in the direction of the stopped-down aperture. For this purpose, in step 2180 the microcomputer 9 executes a subroutine of driving the IRIS in the direction of the stopped-down aperture, and the flow advances to step 2130. If the switch 23 is OFF, in step 2190 the microcomputer 9 executes a subroutine of stopping the focus, and the flow advances to step 2130.

The subroutines in steps 2140, 2150, 2160, 2170, 2180, and 2190 will be described below.

Figure 25A:
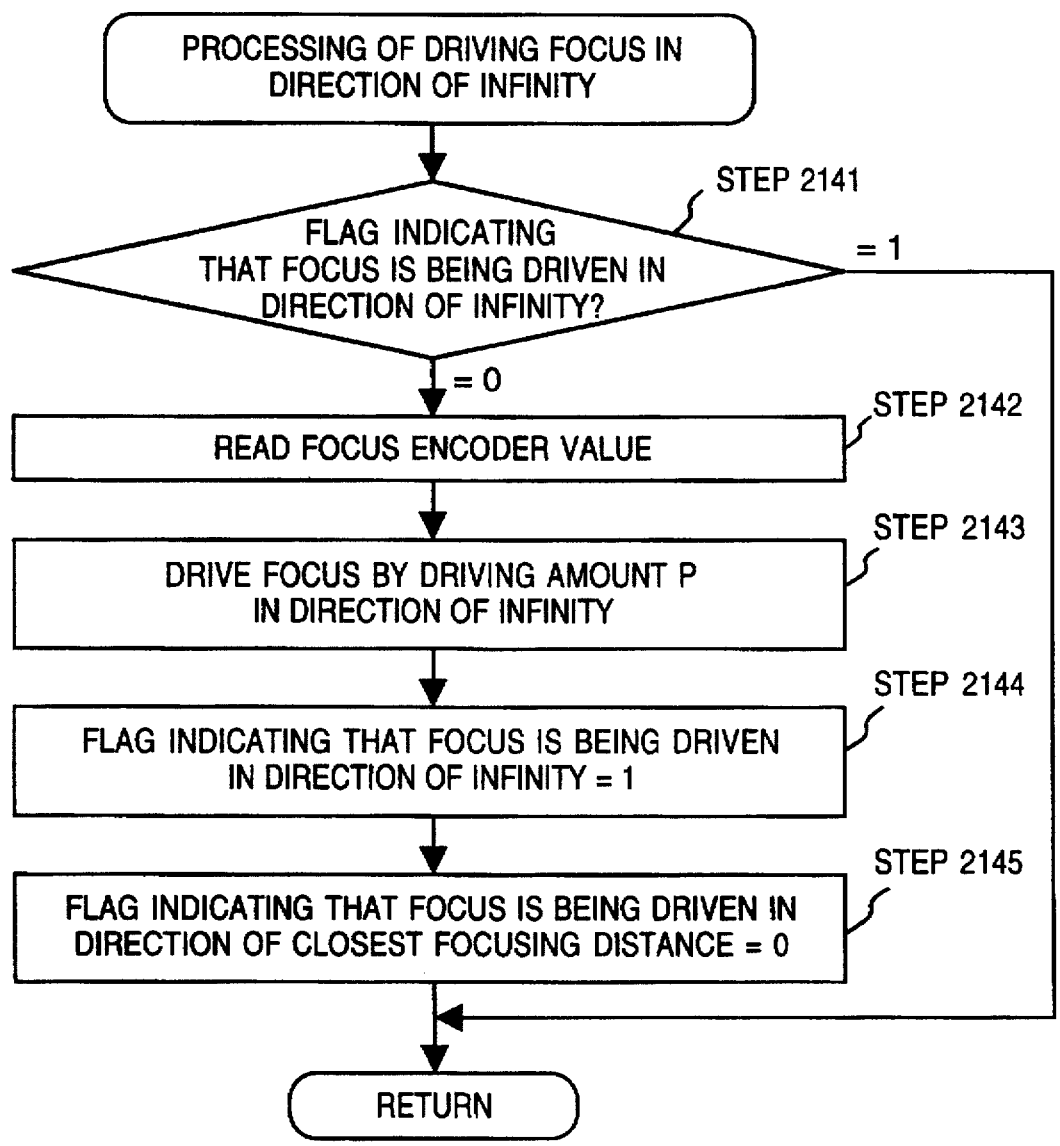
FIGS. 25A to 25F are flow charts showing the operation of the converting adapter according to the third embodiment of the present invention.

First, the subroutine of driving the focus in the direction of infinity in step 2140, FIG. 24B will be described below with reference to steps 2141 to 2145 in FIG. 25A.

<Step 2141> If a flag indicating that the focus is being driven in the direction of infinity is set, this means that the focus is already being driven in the direction of infinity. Accordingly, the microcomputer 9 terminates the subroutine without performing any processing.

<Step 2142> The microcomputer 9 reads a focus encoder value immediately before the focus is driven via the electrical terminals 6 and stores the value in a memory ENC_0 (not shown).

<Step 2143> The microcomputer 9 controls the mounted lens 2 via the electrical terminals 6 so that the focus of the lens 2 is driven by a driving amount P in the direction of infinity.

<Step 2144> The microcomputer 9 sets the flag indicating that the focus is being driven in the direction of infinity.

<Step 2145> The microcomputer 9 clears a flag indicating that the focus is being driven in the direction of the closest focusing distance, and completes the subroutine.

Figure 25B:
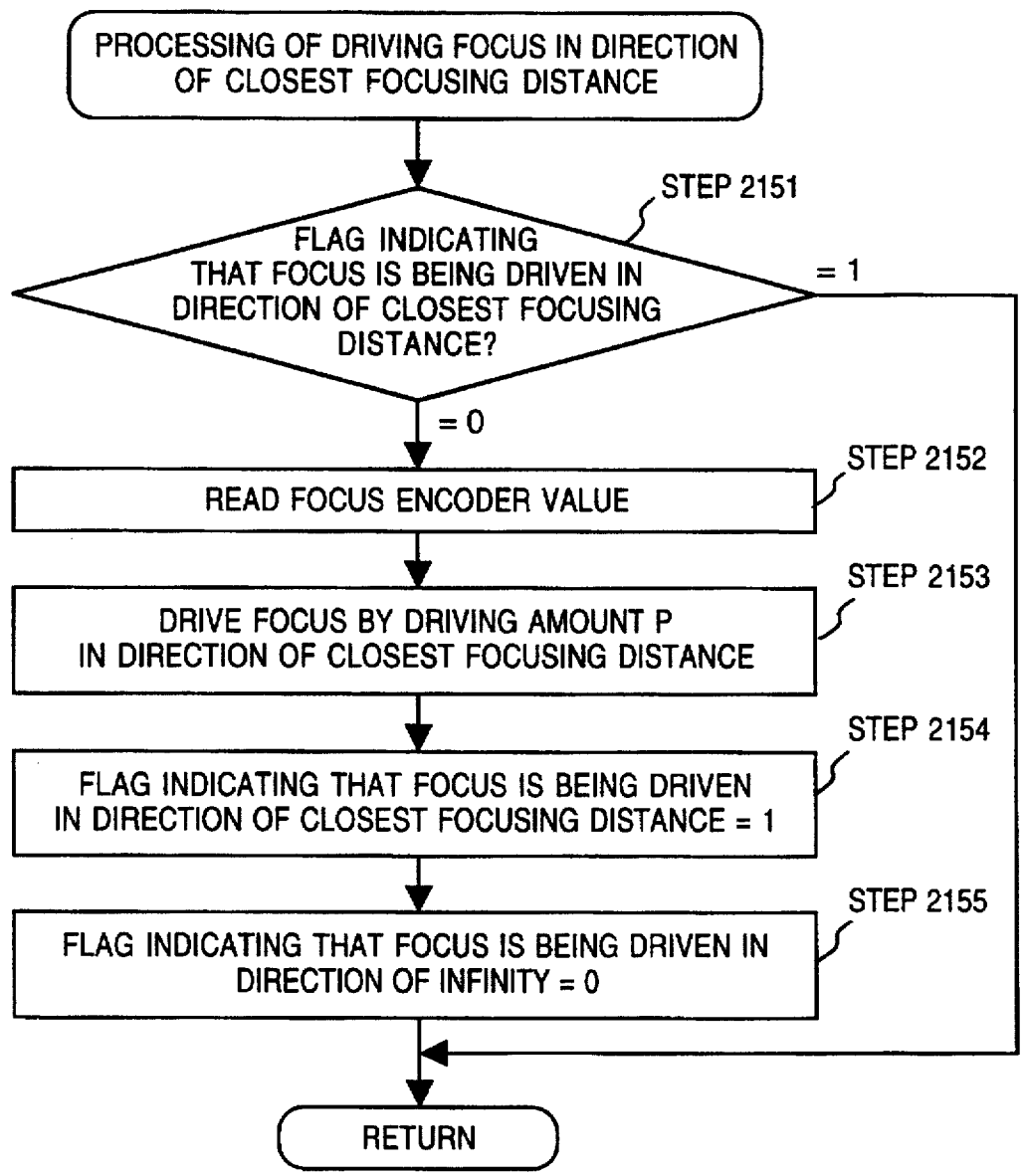

The subroutine of driving the focus in the direction of the closest focusing distance in step 2150, FIG. 24B will be described below with reference to steps 2151 to 2155 in FIG. 25B.

<Step 2151> If the flag indicating that the focus is being driven in the direction of the closest focusing distance is set, this means that the focus is already being driven in the direction of the closest focusing distance. Accordingly, the microcomputer 9 terminates the subroutine without performing any processing.

<Step 2152> The microcomputer 9 reads a focus encoder value immediately before the focus is driven via the electrical terminals 6 and stores the value in the memory ENC_0 (not shown).

<Step 2153> The microcomputer 9 controls the mounted lens 2 via the electrical terminals 6 so that the focus of the lens 2 is driven by the driving amount P in the direction of the closest focusing distance.

<Step 2154> The microcomputer 9 sets the flag indicating that the focus is being driven in the direction of the closest focusing distance.

<Step 2155> The microcomputer 9 clears the flag indicating that the focus is being driven in the direction of infinity, and completes the subroutine.

Figure 25C:
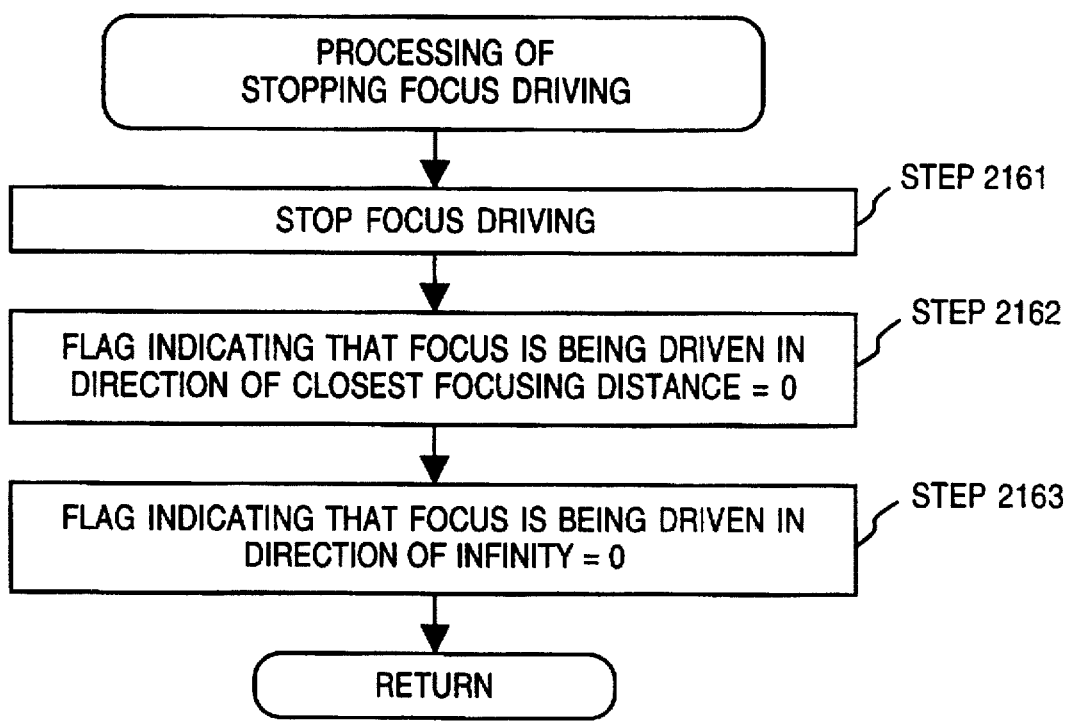

The subroutine of stopping the focus in step 2160, FIG. 24B will be described below with reference to steps 2161 to 2163 in FIG. 25C.

<Step 2161> The microcomputer 9 controls the mounted lens 2 via the electrical terminals 6 so that the focus of the lens 2 is stopped.

<Step 2162> The microcomputer 9 clears the flag indicating that the focus is being driven in the direction of the closest focusing distance.

<Step 2163> The microcomputer 9 clears the flag indicating that the focus is being driven in the direction of infinity, and completes the subroutine.

Figure 25D:
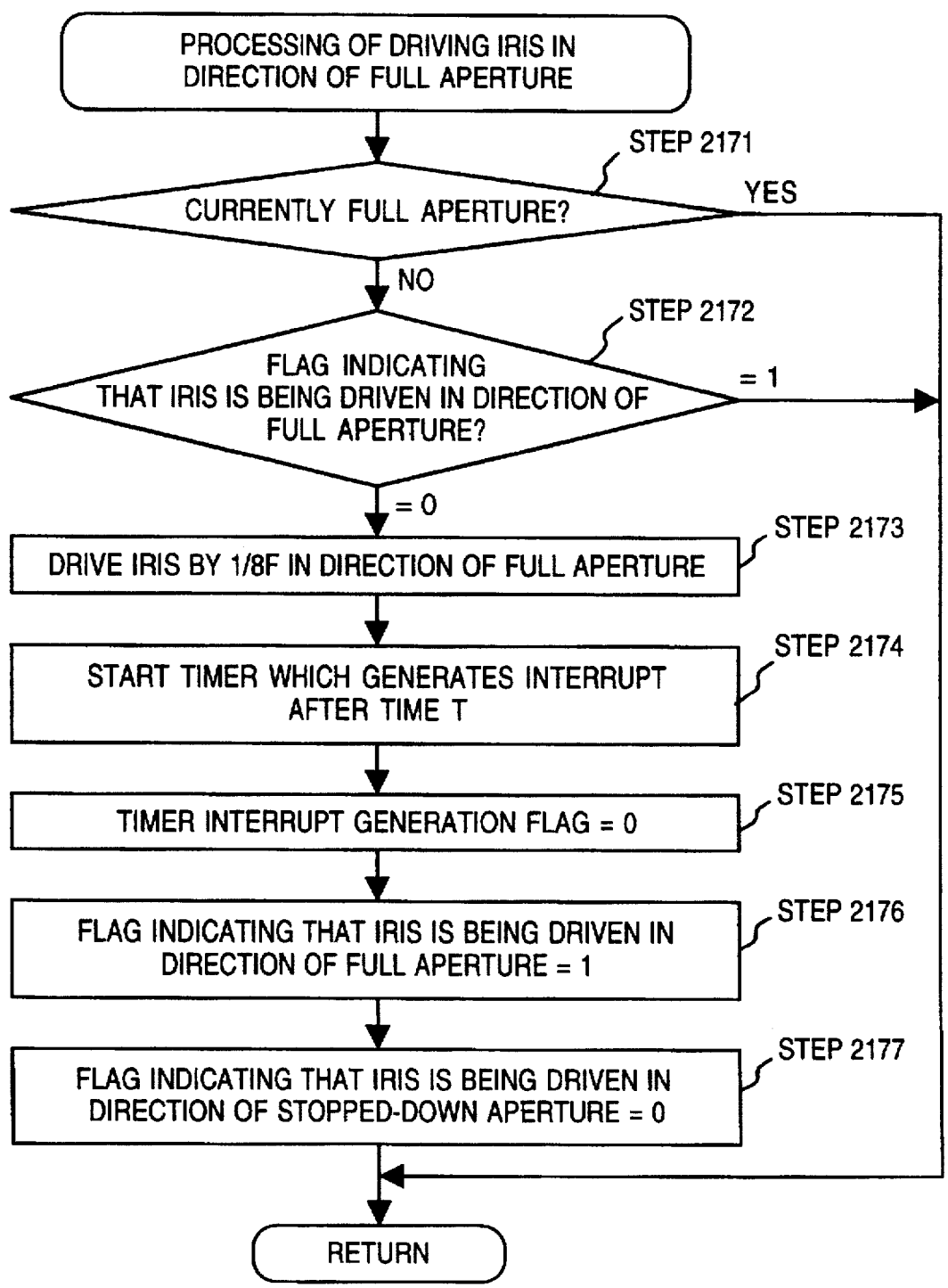

The subroutine of driving the IRIS in the direction of the full aperture in step 2170, FIG. 24B will be described below with reference to steps 2171 to 2177 in FIG. 25D.

<Step 2171> The microcomputer 9 reads information indicating whether the IRIS is currently at the full aperture from the lens 2 via the electrical terminals 6. If YES in step 2171, the IRIS cannot be further driven in the direction of the full aperture, so the microcomputer 9 immediately terminates the subroutine. If NO in step 2171, the flow advances to step 2172.

<Step 2172> If a flag indicating that the IRIS is being driven in the direction of the full aperture is set, this means that the IRIS is already being driven in the direction of the full aperture. Accordingly, the microcomputer 9 terminates the subroutine without performing any processing.

<Step 2173> The microcomputer 9 controls the mounted lens 2 via the electrical terminals 6 so that the IRIS of the lens 2 is driven by a ⅛ step in the direction of the full aperture.

<Step 2174> The microcomputer 9 starts a timer so as to generate an interrupt after elapse of a time T.

<Step 2175> The microcomputer 9 clears a timer interrupt generation flag.

<Step 2176> The microcomputer 9 sets the flag indicating that the IRIS is being driven in the direction of the full aperture.

<Step 2177> The microcomputer 9 clears a flag indicating that the IRIS is being driven in the direction of the stopped-down aperture, and completes the subroutine.

Figure 25E:
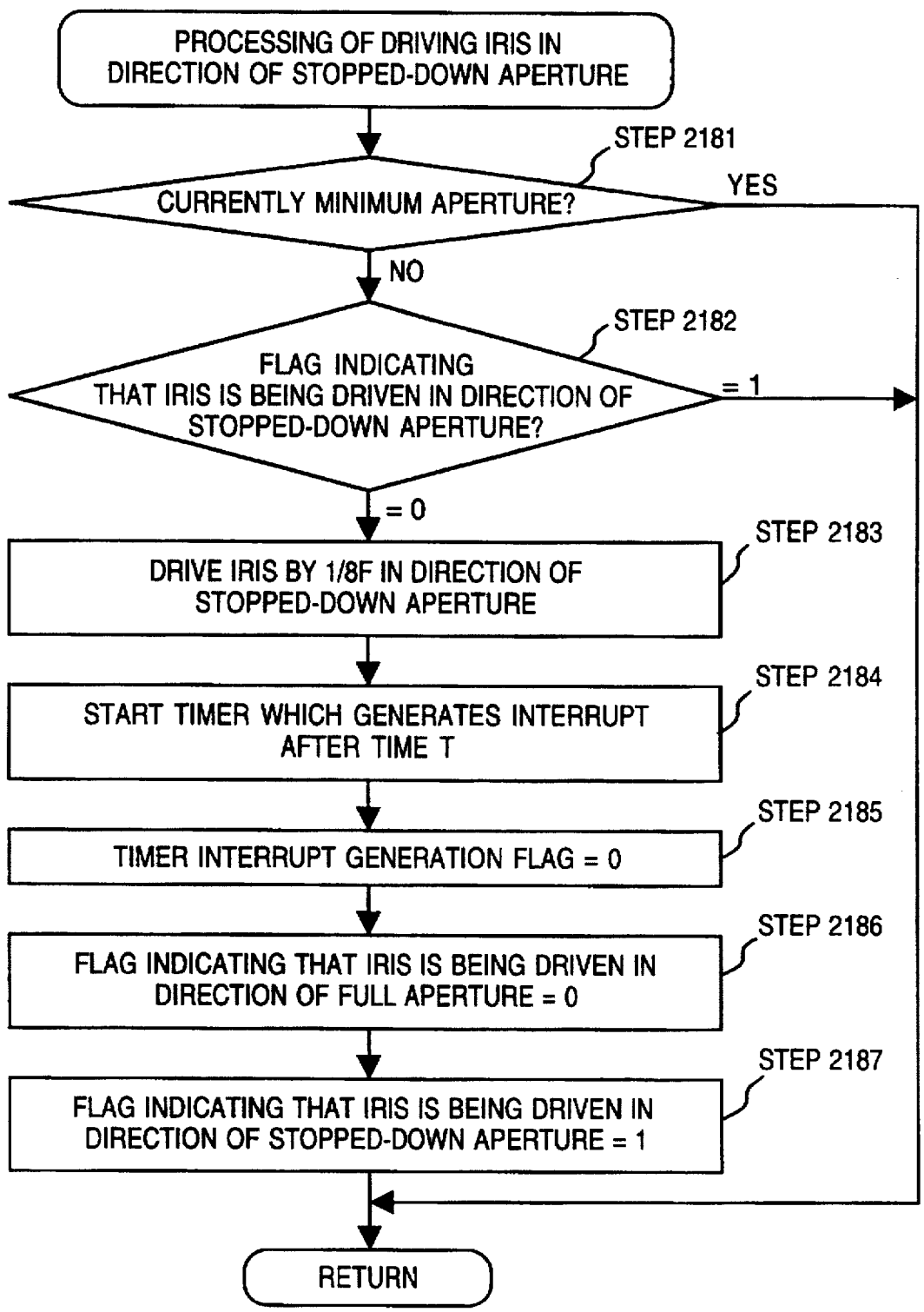

The subroutine of driving the IRIS in the direction of the stopped-down aperture in step 2180, FIG. 24B will be described below with reference to steps 2181 to 2187 in FIG. 25E.

<Step 2181> The microcomputer 9 reads information indicating whether the IRIS is currently at the minimum aperture from the lens 2 via the electrical terminals. If YES in step 2181, the IRIS cannot be further driven in the direction of the stopped-down aperture, so the microcomputer 9 immediately terminates the subroutine. If NO in step 2181, the flow advances to step 2182.

<Step 2182> If a flag indicating that the IRIS is being driven in the direction of the stopped-down aperture is set, this means that the IRIS is already being driven in the direction of the stopped-down aperture. Accordingly, the microcomputer 9 terminates the subroutine without performing any processing.

<Step 2183> The microcomputer 9 controls the mounted lens 2 via the electrical terminals 6 so that the IRIS of the lens 2 is driven by a ⅛ step in the direction of the stopped-down aperture.

<Step 2184> The microcomputer 9 starts the timer so as to generate an interrupt after elapse of a time T.

<Step 2185> The microcomputer 9 clears the timer interrupt generation flag.

<Step 2186> The microcomputer 9 clears the flag indicating that the IRIS is being driven in the direction of the full aperture.

<Step 2187> The microcomputer 9 sets the flag indicating that the IRIS is being driven in the direction of the stopped-down aperture, and completes the subroutine.

Figure 25F:
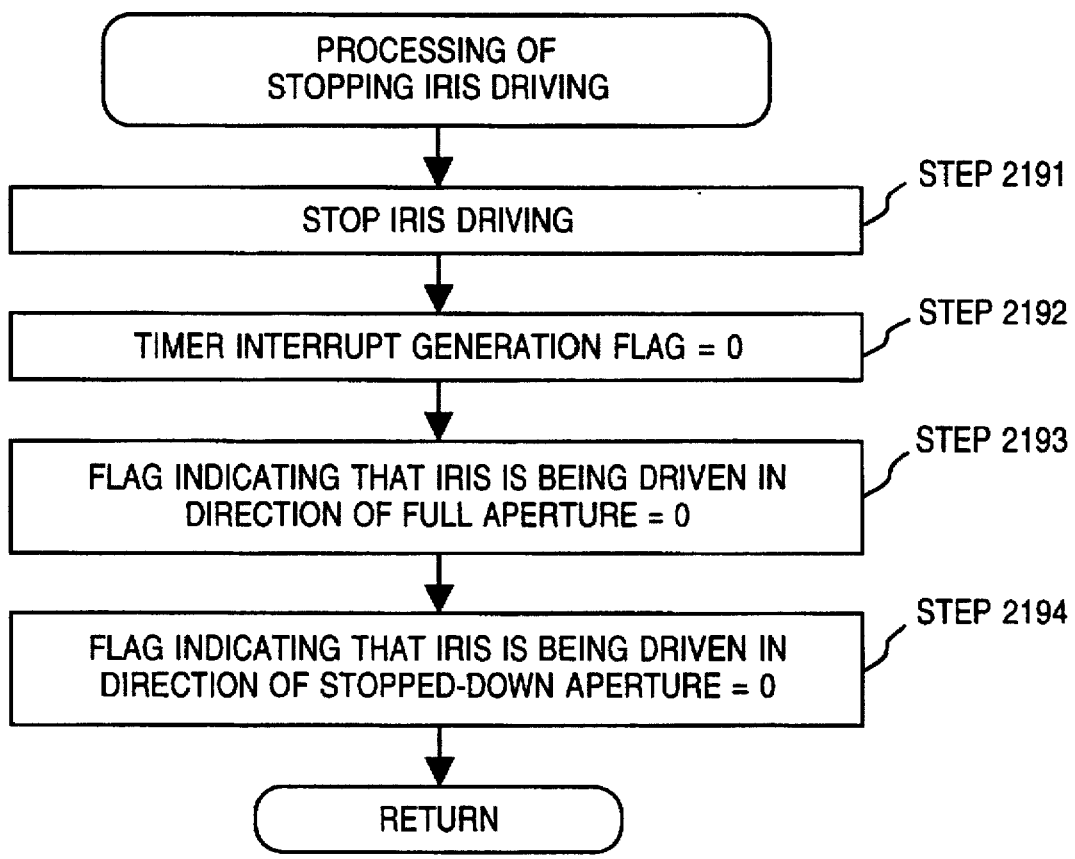

The subroutine of stopping the IRIS in step 2190, FIG. 24B will be described below with reference to steps 2191 to 2193 in FIG. 25F.

<Step 2191> The microcomputer 9 controls the mounted lens 2 via the electrical terminals 6 so that IRIS driving of the lens 2 is stopped.

<Step 2192> The microcomputer 9 clears the timer interrupt generation flag.

<Step 2193> The microcomputer 9 clears the flag indicating that the IRIS is being driven in the direction of the full aperture.

<Step 2194> The microcomputer 9 clears the flag indicating that the IRIS is being driven in the direction of the stopped-down aperture, and completes the subroutine.

In steps 2118 to 2127 described above, the microcomputer 9 drives and stops the focus and the IRIS on the basis of the signals from the external control device 32, i.e., in this embodiment the signals corresponding to the states of the switches. Note that in this embodiment, the control routines only for the focus and the IRIS have been described above. However, it is also possible to perform these control routines from an external control device by providing, in a lens, a zoom actuator or some other optical actuator, e.g., an optical means for optically compensating for a camera shake or an optical means for obtaining a high resolution by optically shifting an image.

Figure 26:
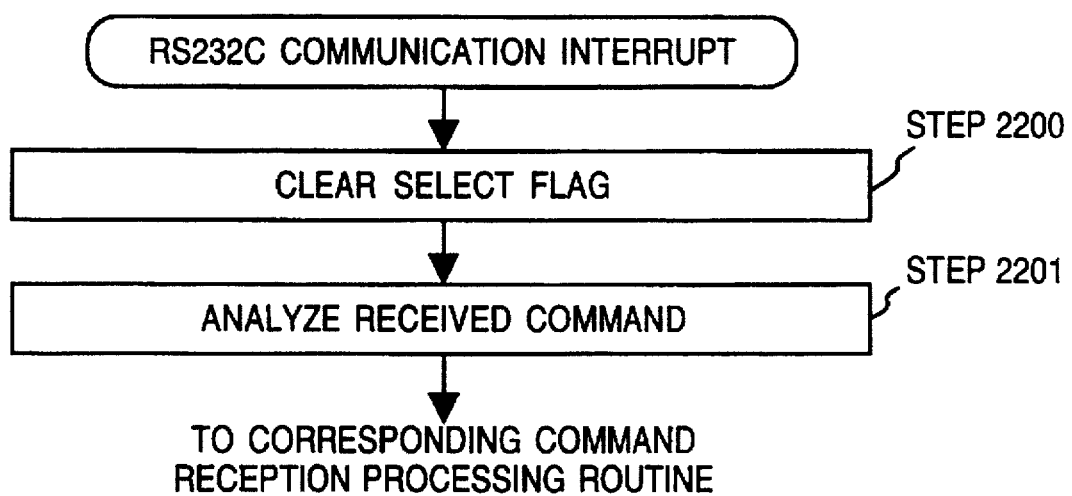
FIG. 26 is a flow chart showing the operation of the converting adapter according to the third embodiment of the present invention.

Steps 2200 and 2201 in FIG. 26 explain the interrupt operation when an RS232C communication is received.

<Step 2200> The microcomputer 9 clears the SELECT flag to inhibit control from the external control device 32. That is, the microcomputer 9 allows only control from an external computer via the RS232C interface.

<Step 2201> The microcomputer 9 analyzes the received command, and the flow advances to a corresponding command reception processing routine.

In this embodiment, the processing when a command for driving the focus in the direction of the closest focusing distance is received, the processing when a command for driving the focus in the direction of infinity is received, the processing when a command for stopping the focus driving is received, and the processing when a command for setting the focus driving speed is received, are identical with those shown in FIGS. 5A to 5E described previously.

Also, the processing when a command for storing the focus position is received and the processing when a command for driving the focus to the stored position is received are identical with those shown in FIGS. 6A and 6B described previously.

Furthermore, the processing when a command for driving the IRIS in the direction of the full aperture is received, the processing when a command for driving the IRIS in the direction of the stopped-down aperture is received, the processing when a command for stopping the IRIS driving is received, and the processing when a command for setting the IRIS driving speed is received, are identical with those shown in FIGS. 7A to 7D described previously.

Figure 27:
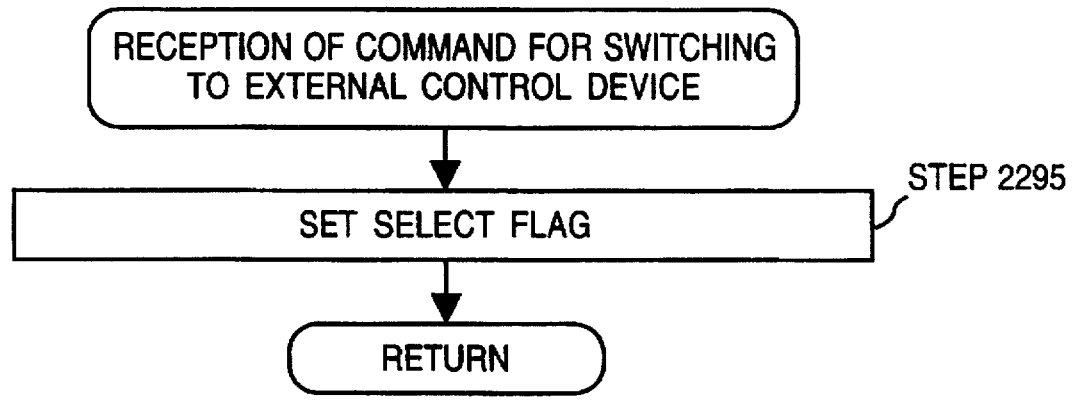
FIG. 27 is a flow chart showing the operation of the converting adapter according to the third embodiment of the present invention.

Step 2295 in FIG. 27 allows the external control device 32 to control the lens 2.

<Step 2295> The microcomputer 9 sets the SELECT flag to permit control from the external control device 32 until the next control through the RS232C interface, and completes the communication interrupt routine.

Figure 28:
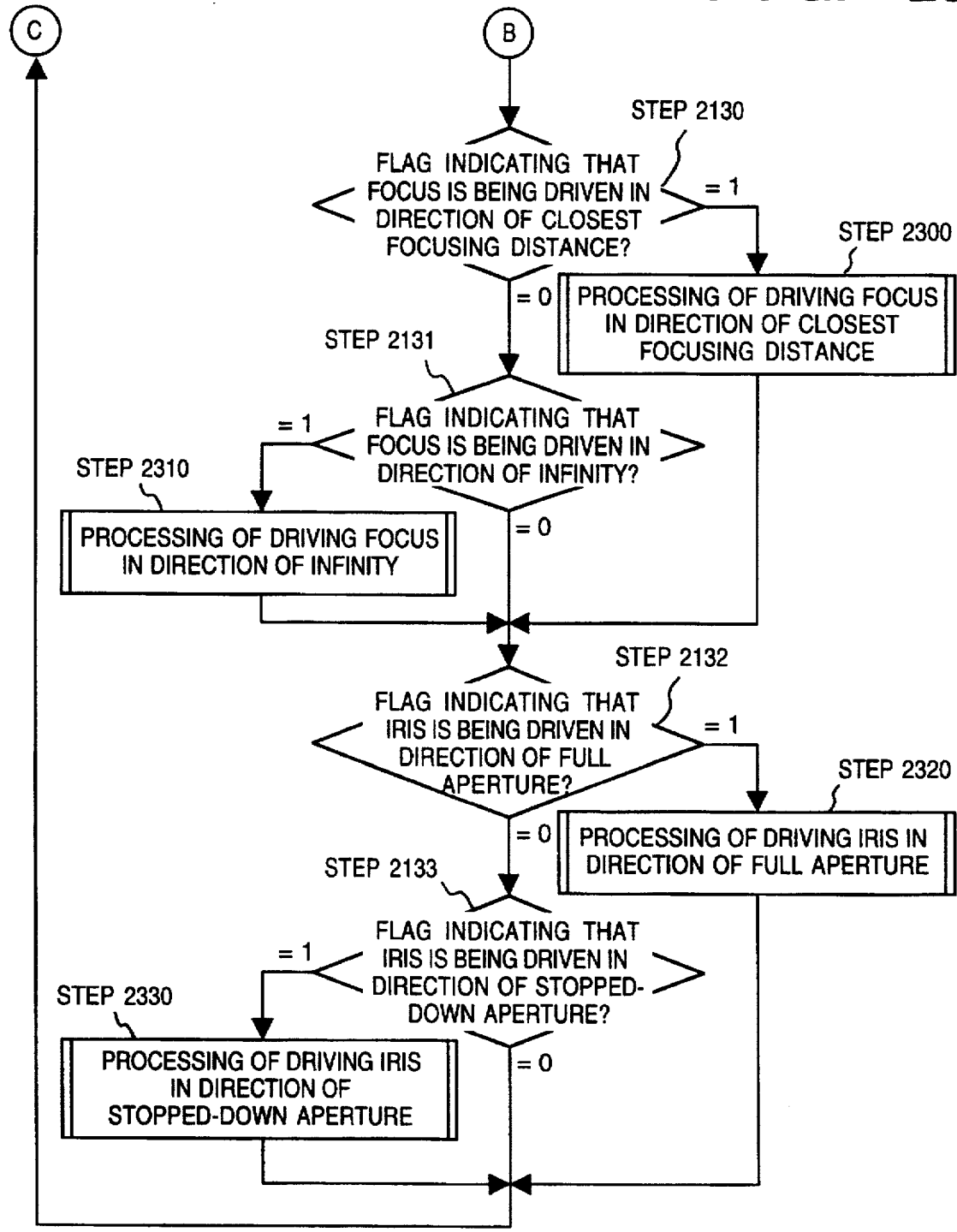
FIG. 28 is a flow chart showing the operation of the converting adapter according to the third embodiment of the present invention.

FIG. 28 is a flow chart representing processing of making the lens 2 perform various operations in accordance with control signals from the external control device 32 or commands from the computer 4 via the RS232C interface. In steps 2130 to 2133, the microcomputer 9 determines whether the focus or the IRIS is to be driven, and performs each corresponding processing.

<Step 2130> If the flag indicating that the focus is being driven in the direction of infinity is set, in step 2300 the microcomputer 9 performs processing of driving the focus in the direction of infinity, and the flow advances to step 2132.

<Step 2131> If the flag indicating that the focus is being driven in the direction of the closest focusing distance is set, in step 2310 the microcomputer 9 performs processing of driving the focus in the direction of the closest focusing distance, and the flow advances to step 2132.

<Step 2132> If the flag indicating that the IRIS is being driven in the direction of the full aperture is set, in step 2320 the microcomputer 9 performs processing of driving the IRIS in the direction of the full aperture, and the flow returns to step 2117.

<Step 2133> If the flag indicating that the IRIS is being driven in the direction of the stopped-down aperture is set, in step 2330 the microcomputer 9 performs processing of driving the. IRIS in the direction of the stopped-down aperture, and the flow returns to step 2117.

In this embodiment, the processing of driving the focus in the direction of the closest focusing distance and the processing of driving the focus in the direction of infinity are the same as in FIGS. 8A and 8B described earlier.

Also, the processing of driving the IRIS in the direction of the full aperture, the processing of driving the IRIS in the direction of the stopped-down aperture, and the timer interrupt processing are the same as in FIGS. 9A to 9C described earlier.

In this embodiment as described, immediately after the main switch PS is turned on the lens 2 can be controlled by both the control signals from the external control device 32 and the computer 4 via the RS232C interface. However, once the control from the computer 4 via the RS232C interface is executed, the control from the external control device 32 is inhibited until a specific command from the computer is received.

(First Modification of Third Embodiment)

Figure 29:
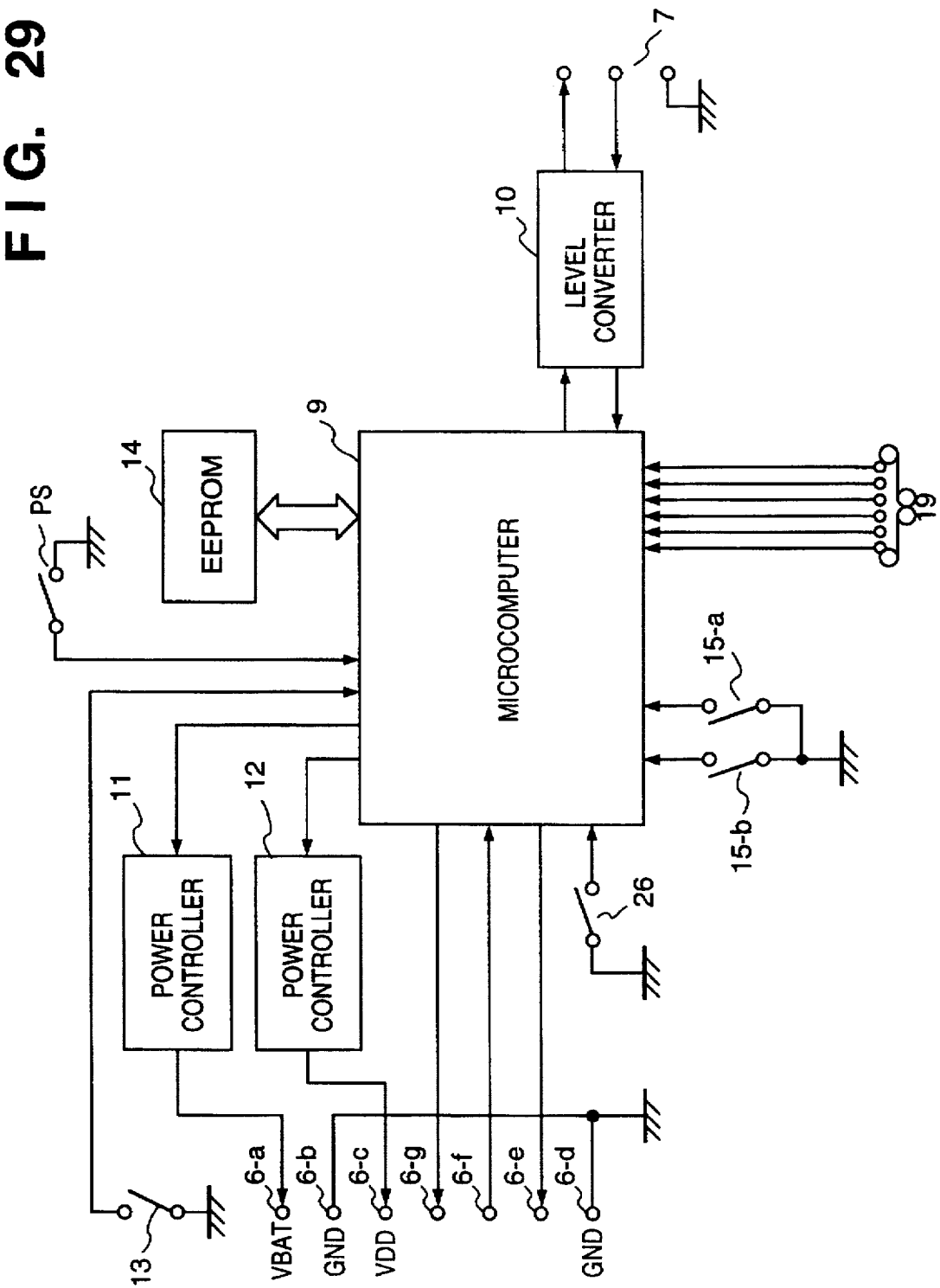
FIG. 29 is a circuit diagram showing the circuit configuration of a converting adapter as the first modification of the third embodiment of the present invention.

FIG. 29 is a circuit diagram for explaining an adapter 1 and an external control device 32 as a modification of this embodiment. The same reference numerals as in each of the above embodiments denote the same parts in FIG. 29, and a detailed description thereof will be omitted.

Referring to FIG. 29, control from a computer 4 through an RS232C interface is chosen when a switch 26 is ON, and control from the external control device 32 is chosen when the switch 26 is OFF.

Figure 30A:
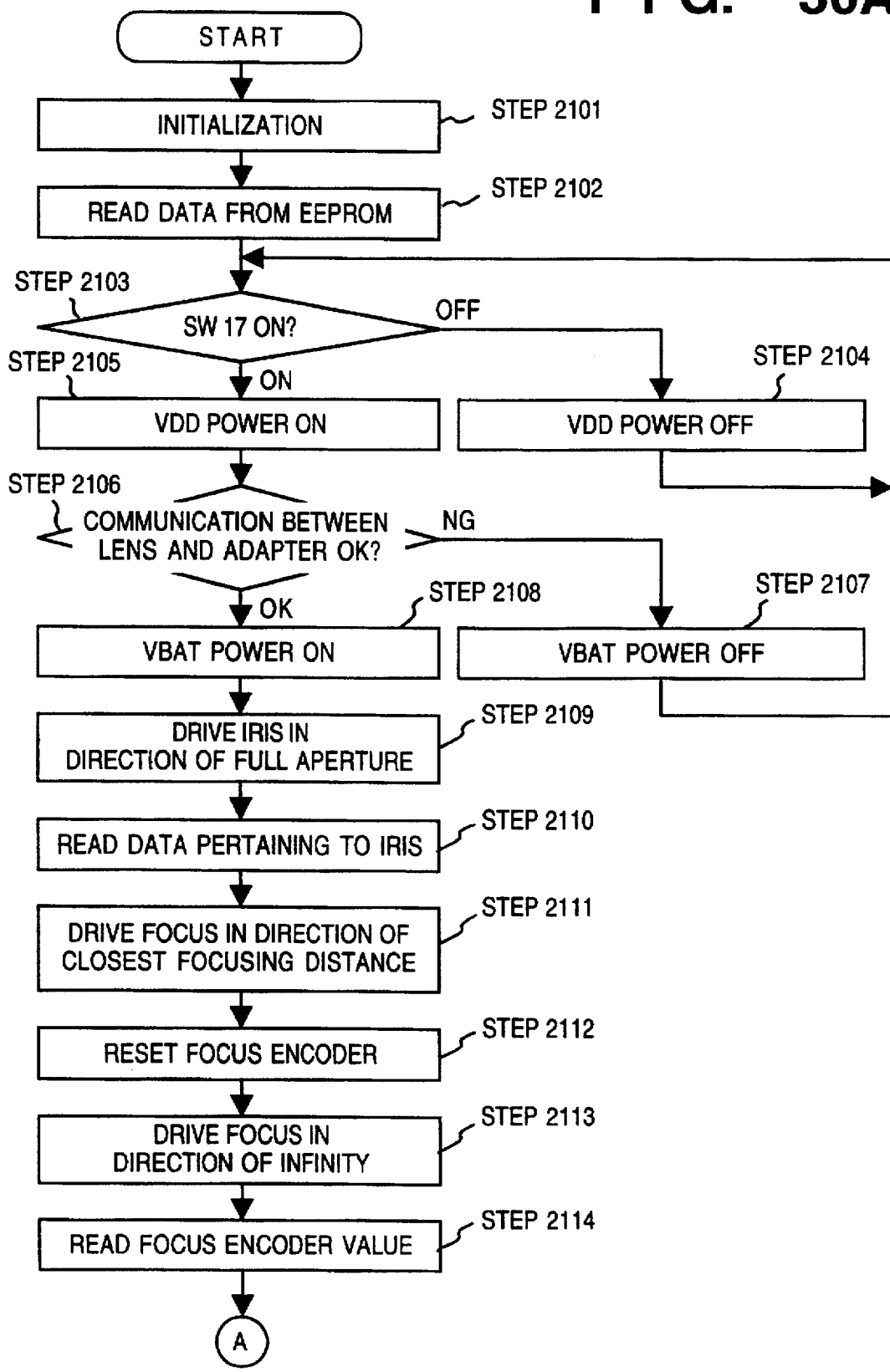
FIGS. 30A and 30B are main flow charts showing the operation of the converting adapter as the first modification of the third embodiment of the present invention.
Figure 30B:
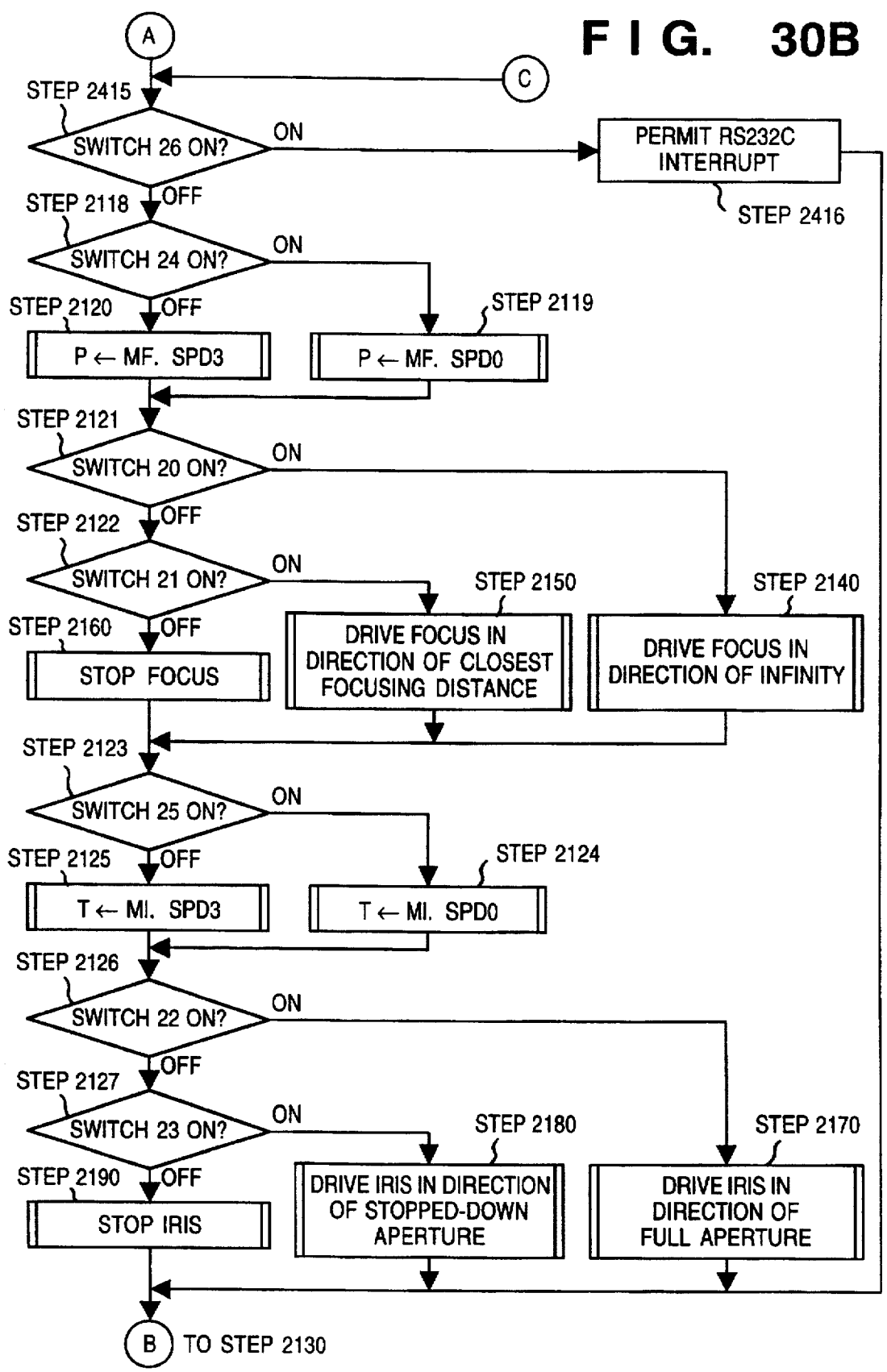

FIGS. 30A and 30B are flow charts for explaining the operation of a microcomputer 9 in this modification. The same step numbers as in the flow charts of FIGS. 24A and 24B denote the same steps in FIGS. 30A and 30B, and a description of the contents thereof will be omitted.

<Step 2415> The microcomputer 9 reads the state of the switch 26, FIG. 29. If the switch 26 is ON, the flow advances to step 2416. If the switch 26 is OFF, the flow advances to step 2118.

<Step 2416> The microcomputer 9 permits an interrupt which occurs when a communication via the RS232C interface is received, and the flow advances to step 2130. The subsequent steps until step 2133 and steps 2300, 2310, 2320, and 2330 are the same as in FIG. 28. If an interrupt occurs, the flow advances to an RS232C communication interrupt routine starting from step 2500 in FIG. 31.

Figure 31:
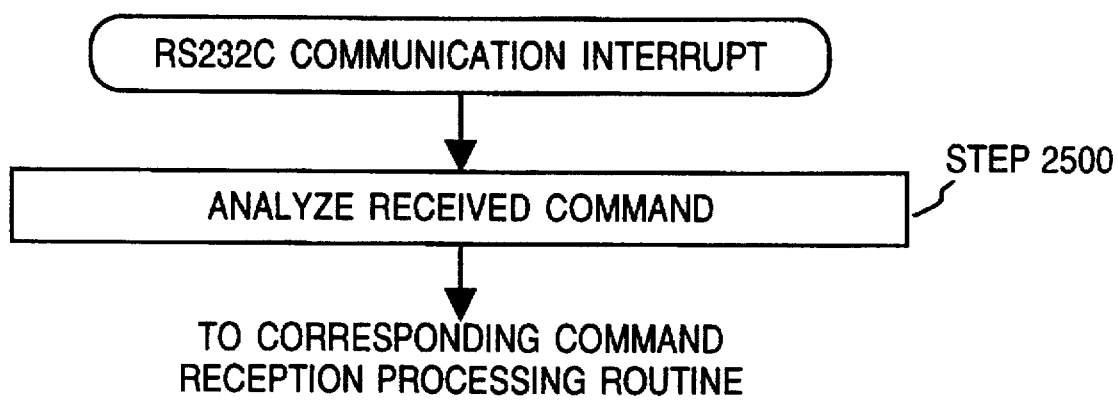
FIG. 31 is a flow chart showing the operation of the converting adapter as the first modification of the third embodiment of the present invention.

Step 2500 in FIG. 31 explains the interrupt resulting from reception of the RS232C communication.

<Step 2500> The microcomputer 9 analyzes the received command, and the flow advances to a corresponding one of the command reception processing routines described previously.

In the first modification of this embodiment as described above, in accordance with the state of the switch 26 it is possible to choose one of control by control signals from the external control device 32 and control from the computer 4 via the RS232C interface.

(Second Modification of the Third Embodiment)

A circuit diagram for explaining an adapter 1 and an external control device 32 according to the second modification of this embodiment is identical with FIG. 20. The same reference numerals as in each of the above embodiments denote the same parts in this modification, and a detailed description thereof will be omitted.

Figure 32A:
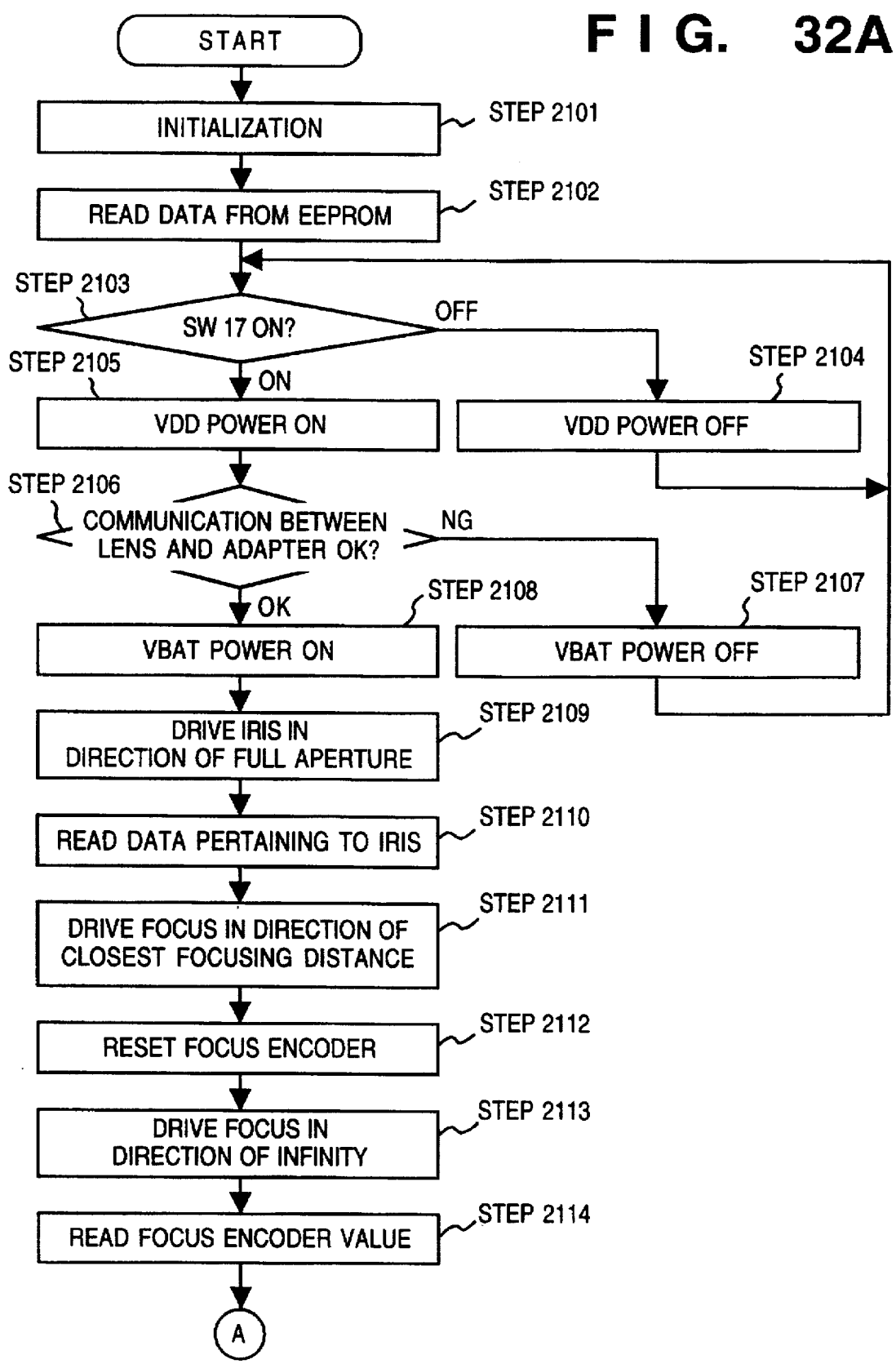
FIGS. 32A and 32B are main flow charts showing the operation of a converting adapter as the second modification of the third embodiment of the present invention.
Figure 32B:
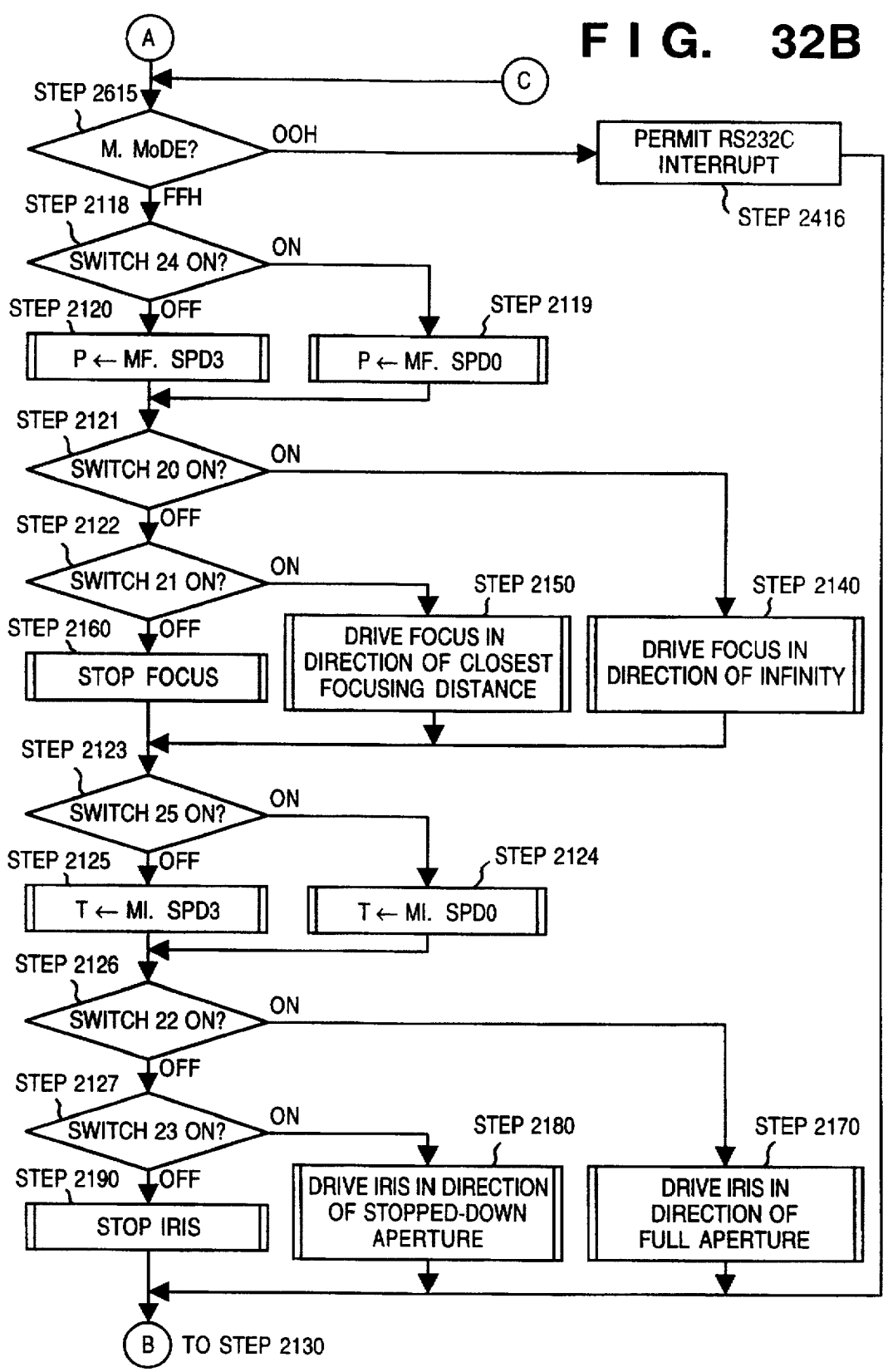

FIG. 32A and 32B are flow charts for explaining the operation of a microcomputer 9 in this modification. The same step numbers as in FIG. 24A and 24B denote the same steps in FIGS. 32A and 32B, and a detailed description thereof will be omitted.

In this modification, in step 2102 the microcomputer 9 reads out the contents of a nonvolatile memory 14 and stores them in internal memories of the microcomputer 9. Note that data having the contents shown in FIG. 33 is stored in the nonvolatile memory 14. Referring to FIG. 33, F_MEMO0 to F_MEMO7 are focus position storage data set by values from an internal focus encoder (not shown) of a lens 2; F_SPD0 to F_SPD3 are focus speed data set by focus driving amounts in the lens 2; and I_SPD0 to I_SPD3 are IRIS speed data set by time intervals during which a diaphragm (IRIS) in the lens 2 is driven. MODE is data for selecting control: if 00H is written in MODE, control from a computer 4 via an RS232C interface is selected; if FFH is written in MODE, control from the external control device 32 is selected. Note that the data F_MEMO0 to F_MEMO7, F_SPD0 to F_SPD3, and I_SPD0 to I_SPD3, are stored in memories FIF_MEMO0 to MP_MEMO7, MF_SPD0 to MF_SPD3, and MI_SPD0 to MI_SPD3 (none of the memories is shown), respectively, of the microcomputer 9. Analogously, MODE is stored in a memory M_MODE (not shown).

<Step 2615> If the contents of the memory M_MODE are 00H, the flow advances to step 2416. If the contents are FFH, the flow advances to step 2118.

<Step 2416> The microcomputer 9 permits an interrupt which occurs when an RS232C communication is received, and the flow advances to step 2130. If an interrupt occurs, the flow advances to the RS232C communication interrupt routine starting from step 2500 in FIG. 31.

The interrupt processing routine when the RS232C communication is received is similar to the subroutine described previously, so a description thereof will be omitted.

In this modification as described above, in accordance with the contents written in MODE of the nonvolatile memory 14 it is possible to select one of control by control signals from the external control device 32 and control from the computer 4 via the RS232C interface.

As many apparently widely different embodiments of the present invention can be made without departing from the spirit and scope of thereof, it is to be understood that the invention is not limited to the specific embodiments thereof except as defined in the appended claims.

What is claimed is:

1. A converting adapter for adapting an interchangeable lens assembly to an optical device for sensing an object by means of said interchangeable lens assembly via said adapter, comprising:

control signal receiving means to communicate with an external control device which outputs a control signal to said adapter for controlling said interchangeable lens assembly; and signal converting means for converting the input control signal received via said control signal receiving means into a predetermined control signal which is suitable for said interchangeable lens assembly in accordance with the input control signal, and outputting the predetermined control signal to said interchangeable lens assembly.

2. The adapter according to claim 1, wherein the output predetermined control signal to said interchangeable lens assembly is serial data.

3. The adapter according to claim 2, wherein the input control signal from said external control device is serial data.

4. The adapter according to claim 1, wherein said signal converting means controls driving of a lens of said interchangeable lens assembly.

5. The adapter according to claim 4, wherein in order to control said lens at a speed within a predetermined speed range, said signal converting means outputs the predetermined control signal, as a control amount corresponding to the speed, to said interchangeable lens assembly at each predetermined control period.

6. A converting adapter for adapting an interchangeable lens assembly to an optical device for sensing an object by means of said interchangeable lens assembly via said adapter, comprising:

a control signal interface to communicate with an external control device which outputs a control signal which is inputted to said adapter for controlling said interchangeable lens assembly;

signal convening means for convening the input control signal received via said control signal interface into a predetermined control signal which is suitable for said interchangeable lens assembly in accordance with the input control signal, and outputting the predetermined control signal to said interchangeable lens assembly; and driving control means having a low-speed mode in which a lens of said interchangeable lens assembly is driven at a low speed and a high-speed mode in which said lens is driven at a high speed.

7. The adapter according to claim 6, wherein the output predetermined control signal to said interchangeable lens assembly is serial data.

8. The adapter according to claim 7, wherein the input control signal from said external control device is serial data.

9. The adapter according to claim 6, wherein in order to control said lens at a speed within a predetermined speed range, said driving control means outputs the predetermined control signal, as a control mount corresponding to the speed, to said interchangeable lens assembly at each predetermined control period.

10. A converting adapter for adapting an interchangeable lens assembly to an optical device for sensing an object by means of said interchangeable lens assembly via said adapter, comprising:

a control signal interface to communicate with an external control device which outputs a control signal to said adapter for controlling said interchangeable lens assembly; and lens characteristic detecting means for detecting a characteristic of said interchangeable lens assembly by causing said interchangeable lens assembly to perform a predetermined operation.

11. A converting adapter for adapting an interchangeable lens assembly to an optical device for sensing an object by means of said interchangeable lens assembly via said adapter, comprising:

a control signal interface to communicate with an external control device which outputs a control signal which is inputted to said adapter for controlling said interchangeable lens assembly; and a signal converting circuit for converting the input control signal received via said control signal interface into a predetermined control signal which is suitable for said interchangeable lens assembly in accordance with the input control signal, and outputting the predetermined control signal to said interchangeable lens assembly.

12. A converting adapter for adapting an interchangeable lens assembly to an optical device for sensing an object by means of said interchangeable lens assembly via said adapter, comprising:

control signal communication means to communicate with an external control device which outputs a control signal which is inputted to said adapter for controlling said interchangeable lens assembly; and signal converting means for converting the input control signal received via said control signal communication means into a predetermined control signal which is suitable for said interchangeable lens assembly in accordance with the input control signal, and outputting the predetermined control signal to said interchangeable lens assembly.

13. The adapter according to claim 12, further comprising signal selecting means, where the adapter includes a plurality of signal converting means to communicate with each of multiple external control devices, for selecting one or more of the signal converting means.

14. The adapter according to claim 13, wherein said signal selecting means is controlled by a switch.

15. The adapter according to claim 13, wherein said signal selecting means is controlled by data stored in a readable/writable nonvolatile memory.

16. The adapter according to claim 13, wherein after a power switch is turned on, said signal selecting means selects one of said signal converting means until an electrical signal is input from one of said external control device, and selects another of said signal converting means when the electrical signal is input.

17. The adapter according to claim 13, wherein said signal selecting means switches from one of said signal converting means to another of said signal converting means on the basis of an input electrical signal from one of said external control device.

18. A converting adapter for adapting a lens assembly to an optical device for sensing an object by means of said lens assembly via said adapter, comprising:

control signal input means to communicate with an external control device which outputs a control signal which is inputted to said adapter for controlling said lens assembly; and signal converting means for converting the input control signal received via said control signal input means into a predetermined lens control signal which is suitable for said lens assembly in accordance with the input control signal, and outputting the predetermined lens control signal to said lens assembly.

19. The adapter according to claim 18, wherein said lens assembly is interchangeable.

20. The adapter according to claim 18, wherein said control signal input means includes signal terminals.

21. A converting adapter for adapting a lens unit to an optical device for receiving an image of an object by means of said lens unit via said adapter, comprising:

control signal interface means to communicate with an external control device different from said optical device, which outputs a control signal which is inputted to said adapter for controlling said lens unit; and signal converting means for converting the input control signal received via said control signal interface means into a predetermined lens control signal which is suitable for said lens unit in accordance with the input control signal, and outputting the predetermined lens control signal to said lens unit.

22. The adapter according to claim 21, wherein said signal converting means converts input serial data as the control signal from said external control device into parallel data as the predetermined lens control signal and outputs the parallel data to said external device.

23. A converting adapter for adapting an interchangeable lens assembly to an optical device for sensing an object by means of said interchangeable lens assembly via said adapter, comprising:

a first control signal terminal to communicate with an external control device which outputs a first control signal to said adapter for controlling said interchangeable lens assembly and a second control signal to control an external device;

a second control signal terminal to communicate with said external device which is controlled by said external control device via said adapter;

signal converting means for converting said first control signal received via said first control signal terminal into a predetermined lens control signal which is suitable for said interchangeable lens assembly in accordance with said first control signal, and outputting the predetermined lens control signal to said interchangeable lens assembly;

signal relay means for outputting said second control signal from said external control device received via said first control signal terminal to said second control signal terminal; and signal selecting means for selecting one or both of said signal converting means and said signal relay means.

* * * * *

UNITED STATES PATENT AND TRADEMARK OFFICE
CERTIFICATE OF CORRECTION

PATENT NO.    : 5,731,920
DATED         : March 24, 1998
INVENTOR(S)   : Mitsuhiro Katsuragawa It is certified that errors appear in the above-identified patent and that said Letters Patent is hereby corrected as shown below:

Column 1, line 16,  change "ad" to -- and --

Column 1, line 20,  change "moat" to -- mount --

Column 6, line 20,  change "F_MEMM00" to -- F_MEMO0 --

Column 8, line 15,  change "drive" to -- driven --

Column 9, line 44,  change "stopped-dom" to -- stopped-down --

Column 11, line 30, change "ENC_i" to -- ENC_1 --

Column 13, line 28, change "pan_head" to -- panhead --

Column 13, line 49, change "pan_head" to -- panhead --

Column 14, line 17, change "microcomputer" to -- microcomputer 9. --

Column 15, line 60, change "direction" to -- direction CW. --

Column 26, line 2,  change "FIF_MEMO0" to -- MF_MEMO0 --

Column 26, line 3,  change "MP_MEMO7" to -- MF_MEMO7 --

Column 26, line 34, change "signal" to -- signal which is inputted --

Column 26, line 66, change "signal convening" to -- signal converting --

Column 26, line 66, change "for convening" to -- for converting --

UNITED STATES PATENT AND TRADEMARK OFFICE
CERTIFICATE OF CORRECTION

PATENT NO. : 5,731,920
DATED : March 24, 1998
INVENTOR(S) : Mitsuhiro Katsuragawa It is certified that error appears in the above-indentified patent and that said Letters Patent is hereby corrected as shown below:

Column 27, line 18, change "mount" to -- amount --

Signed and Sealed this

Eleventh Day of August 1998

Attest:

BRUCE LEHMAN

Attesting Officer

Commissioner of Patents and Trademarks